(12) United States Patent
Ritter et al.

(10) Patent No.: US 7,463,474 B2
(45) Date of Patent: Dec. 9, 2008

(54) SYSTEM AND METHOD OF PLATING BALL GRID ARRAY AND ISOLATION FEATURES FOR ELECTRONIC COMPONENTS

(75) Inventors: Andrew P. Ritter, Surfside Beach, SC (US); John L. Galvagni, Surfside Beach, SC (US); Raymond T. Galasco, Myrtle Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 0 days.

(21) Appl. No.: 11/641,546

(22) Filed: Dec. 19, 2006

(65) Prior Publication Data

US 2007/0133147 A1    Jun. 14, 2007

Related U.S. Application Data

(60) Continuation-in-part of application No. 11/503,402, filed on Aug. 10, 2006, which is a continuation-in-part of application No. 11/066,575, filed on Feb. 25, 2005, which is a division of application No. 10/818,951, filed on Apr. 6, 2004, now Pat. No. 7,177,137, which is a continuation-in-part of application No. 10/632,514, filed on Aug. 1, 2003, now Pat. No. 6,960,366, which is a continuation-in-part of application No. 10/409,023, filed on Apr. 8, 2003, now Pat. No. 7,152,291.

(60) Provisional application No. 60/372,673, filed on Apr. 15, 2002.

(51) Int. Cl.
*H01G 4/228* (2006.01)

(52) U.S. Cl. .............. 361/306.1; 361/306.3; 361/301.4; 361/308.1; 361/321.2; 361/311; 361/313

(58) Field of Classification Search .............. 361/306.1, 361/306.2, 306.3, 311–313, 308.1, 321.1, 361/321.2, 301.4, 303, 305, 309
See application file for complete search history.

(56) References Cited

U.S. PATENT DOCUMENTS 369,545 A    9/1887    Monroe et al.

(Continued)

FOREIGN PATENT DOCUMENTS

EP    0351343    1/1990

(Continued)

OTHER PUBLICATIONS

Translated Abstract of Japanese Patent No. 10313804 cited above.

(Continued)

*Primary Examiner*—Nguyen T. Ha
(74) *Attorney, Agent, or Firm*—Dority & Manning, P.A.

(57) ABSTRACT

A multilayer electronic component includes a plurality of dielectric layers interleaved with a plurality of first and second polarity electrode layers. Internal and/or external anchor tabs may also be selectively interleaved with the dielectric layers. Portions of the electrodes and anchor tabs are exposed along the periphery of the electronic component in respective groups and thin-film plated deposition is formed thereon by electroless and/or electrolytic plating techniques. A solder dam layer is provided over a given component surface and formed to expose predetermined areas where solder barrier and flash materials may be deposited before attaching solder preforms. Some embodiments include plated terminations substantially covering selected component surfaces to facilitate with heat dissipation and signal isolation for the electronic components.

27 Claims, 29 Drawing Sheets

U.S. PATENT DOCUMENTS

| | | | |
|---|---|---|---|
| 437,011 | A | 9/1890 | Bentley |
| 3,258,898 | A | 7/1966 | Garibotti |
| 3,448,355 | A | 6/1969 | Ahearn, Jr. et al. |
| 3,612,963 | A | 10/1971 | Piper et al. |
| 3,665,267 | A | 5/1972 | Acello |
| 3,809,973 | A | 5/1974 | Hurley |
| 3,898,541 | A | 8/1975 | Weller |
| 3,988,498 | A | 10/1976 | Maher |
| 3,992,761 | A | 11/1976 | McElroy et al. |
| 4,241,378 | A | 12/1980 | Dorrian |
| 4,266,265 | A | 5/1981 | Maher |
| 4,574,329 | A | 3/1986 | Eijkelenkamp et al. |
| 4,661,884 | A | 4/1987 | Seaman |
| 4,729,058 | A | 3/1988 | Gupta et al. |
| 4,811,162 | A | 3/1989 | Maher et al. |
| 4,811,164 | A | 3/1989 | Ling et al. |
| 4,819,128 | A | 4/1989 | Florian et al. |
| 4,831,494 | A | 5/1989 | Arnold et al. |
| 4,852,227 | A | 8/1989 | Burks |
| 4,919,076 | A | 4/1990 | Lutz et al. |
| 5,021,921 | A | 6/1991 | Sano et al. |
| 5,159,300 | A | 10/1992 | Nakamura et al. |
| 5,196,822 | A | 3/1993 | Gallusser et al. |
| 5,226,382 | A | 7/1993 | Braden |
| 5,251,094 | A | 10/1993 | Amano et al. |
| 5,311,651 | A | 5/1994 | Kim et al. |
| 5,369,545 | A | 11/1994 | Bhattacharyya et al. |
| 5,412,357 | A | 5/1995 | Nakamura et al. |
| 5,493,266 | A | 2/1996 | Sasaki et al. |
| 5,550,705 | A | 8/1996 | Moncrieff |
| 5,576,053 | A | 11/1996 | Senda et al. |
| 5,635,894 | A | 6/1997 | Morant |
| 5,753,299 | A | 5/1998 | Garcia et al. |
| 5,770,476 | A | 6/1998 | Stone |
| 5,863,331 | A | 1/1999 | Braden et al. |
| 5,870,273 | A | 2/1999 | Sogabe et al. |
| 5,880,011 | A | 3/1999 | Zablotny et al. |
| 5,880,925 | A | 3/1999 | DuPré et al. |
| 5,944,897 | A | 8/1999 | Braden |
| 5,985,414 | A | 11/1999 | Fukuda et al. |
| 5,990,778 | A | 11/1999 | Strumpler et al. |
| 6,040,755 | A | 3/2000 | Abe et al. |
| 6,141,846 | A | 11/2000 | Miki |
| 6,151,204 | A | 11/2000 | Shigemoto et al. |
| 6,159,768 | A | 12/2000 | Ahn |
| 6,181,544 | B1 * | 1/2001 | Nakagawa et al. ....... 361/321.1 |
| 6,188,565 | B1 | 2/2001 | Naito et al. |
| 6,191,932 | B1 | 2/2001 | Kuroda et al. |
| 6,191,933 | B1 * | 2/2001 | Ishigaki et al. .............. 361/309 |
| 6,201,683 | B1 * | 3/2001 | Yamada et al. ........... 361/308.1 |
| 6,214,685 | B1 | 4/2001 | Clinton et al. |
| 6,232,144 | B1 | 5/2001 | McLoughlin |
| 6,243,253 | B1 | 6/2001 | DuPré et al. |
| 6,266,229 | B1 | 7/2001 | Naito et al. |
| 6,288,887 | B1 * | 9/2001 | Yoshida et al. ........... 361/306.1 |
| 6,292,351 | B1 | 9/2001 | Ahiko et al. |
| 6,310,757 | B1 | 10/2001 | Tuzuki et al. |
| 6,311,390 | B1 | 11/2001 | Abe et al. |
| 6,362,723 | B1 | 3/2002 | Kawase |
| 6,370,010 | B1 | 4/2002 | Kuroda et al. |
| 6,380,619 | B2 | 4/2002 | Ahiko et al. |
| 6,407,906 | B1 | 6/2002 | Ahiko et al. |
| 6,433,992 | B2 * | 8/2002 | Nakagawa et al. ....... 361/301.4 |
| 6,496,355 | B1 | 12/2002 | Galvagni et al. |
| 6,525,395 | B1 | 2/2003 | Kawase |
| 6,594,136 | B2 | 7/2003 | Kuroda et al. |
| 6,621,682 | B1 | 9/2003 | Takakuwa et al. |
| 6,661,638 | B2 | 12/2003 | Jackson et al. |
| 6,661,639 | B1 | 12/2003 | Devoe et al. |
| 6,729,003 | B2 | 5/2004 | Yokoyama et al. |
| 6,743,479 | B2 | 6/2004 | Kanoh et al. |
| 6,765,781 | B2 | 7/2004 | Togashi |
| 6,819,543 | B2 | 11/2004 | Vieweg et al. |
| 6,822,847 | B2 | 11/2004 | Devoe et al. |
| 6,922,329 | B2 | 7/2005 | Togashi |
| 6,969,647 | B2 | 11/2005 | Devoe et al. |
| 2003/0011963 | A1 | 1/2003 | Ahiko et al. |
| 2003/0071245 | A1 | 4/2003 | Harris, IV |

FOREIGN PATENT DOCUMENTS

| | | |
|---|---|---|
| EP | 0379066 A3 | 7/1990 |
| GB | 1535662 A | 12/1978 |
| GB | 1540403 | 2/1979 |
| GB | 2326976 A | 1/1999 |
| GB | 2334377 A | 8/1999 |
| GB | 2389708 A | 12/2003 |
| JP | 1201902 | 8/1989 |
| JP | 01313804 | 12/1989 |
| JP | 6168845 | 6/1994 |
| JP | 129477 | 5/1997 |
| JP | 023862 A | 1/2001 |
| JP | 2164257 | 6/2002 |
| WO | PCT/WO0203405 A1 | 1/2002 |

OTHER PUBLICATIONS

Translated Abstract of Japanese Patent No. 6168845 cited above.
Translated Abstract of Japanese Patent No. 2164257 cited above.
English language abstract of Japanese Patent No. 08264372 published Oct. 11, 1996.
English language abstract of Japanese Patent No. 10251837 published Sep. 22, 1998.
Hung Van Trinh, "An Electrodeposition Method for Terminals of Multilayer Ceramic Capacitors," Mar. 23, 2002 (a thesis submitted in partial satisfaction of the requirements for the degree Master of Science in Materials Science and Engineering, University of California-San Diego).
European Search Report for Application No. GB0308656.8 dated May 6, 2004.
European Search Report for Application No. GB0405993.7 dated Jul. 26, 2004.
Hung Van Trinh and Jan. B. Talbot, "An Electrodeposition Method for Terminals of Multilayer Ceramic Capacitors" CARTS 2003: 23rd Capacitor and Resistor Technology Symposium Mar. 31-Apr. 3, 2003.
Hung Van Trinh and Jan. B. Talbot, "Electrodeposition Method for Terminals of Multilayer Ceramic Capacitors," Jun. 2003, vol. 86, No. 6, Journal of the American Ceramic Society.
Search Report under Section 17 for Application No. GB0425963.6, dated Jan. 26, 2005, Examiner: Tyrone Moore.
Search Report under Section 17 for Application No. GB0425961.0, dated Jan. 27, 2005, Examiner: Tyrone Moore.
European Search Report for Application No. GB0308656.8 dated Sep. 8, 2005.

* cited by examiner

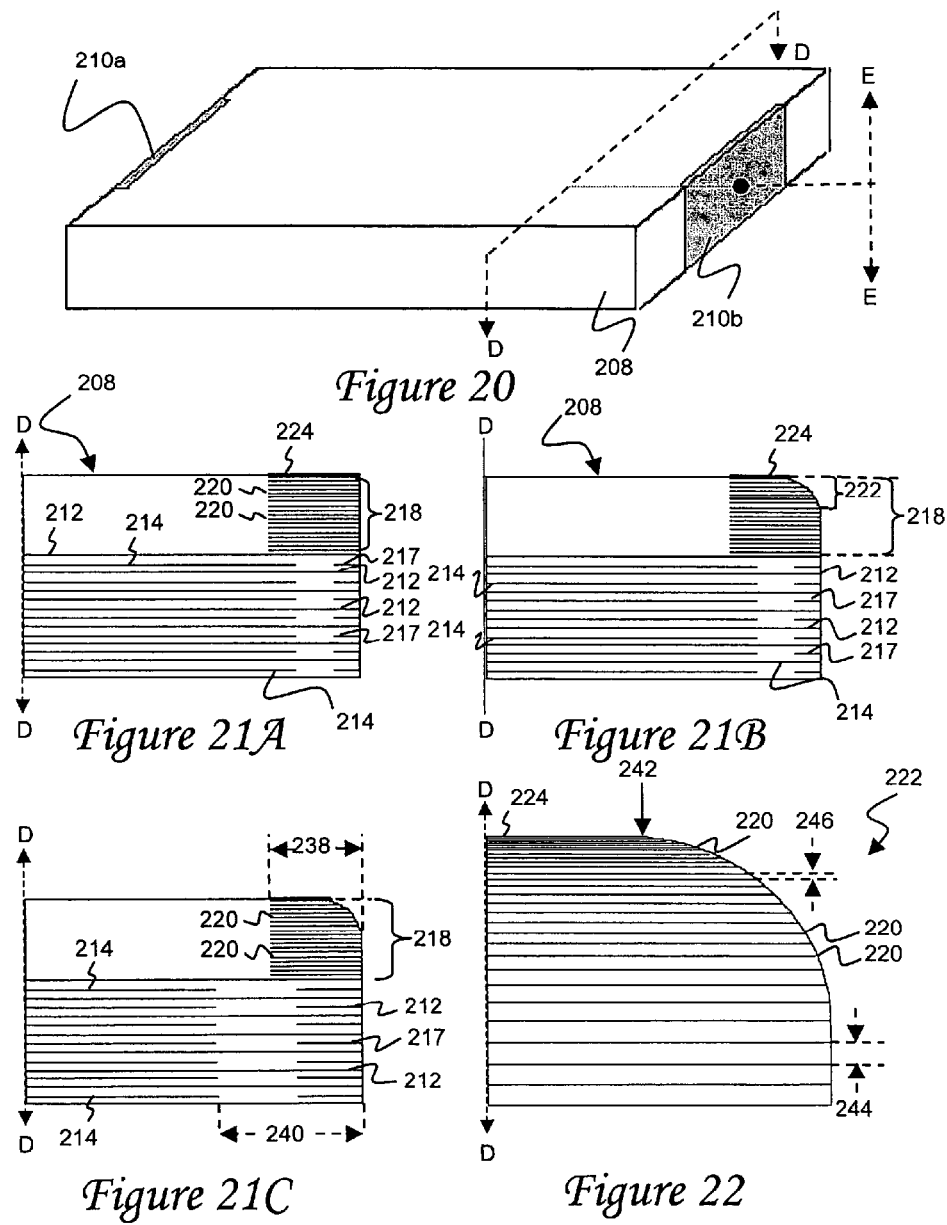

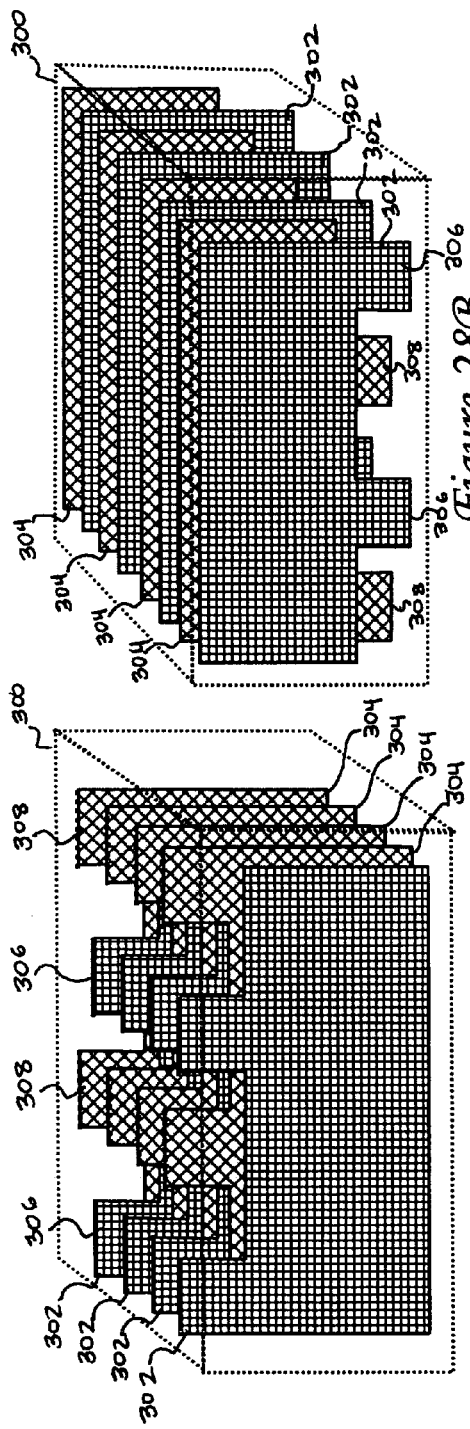
Figure 28A
PRIOR ART
Figure 28B
PRIOR ART
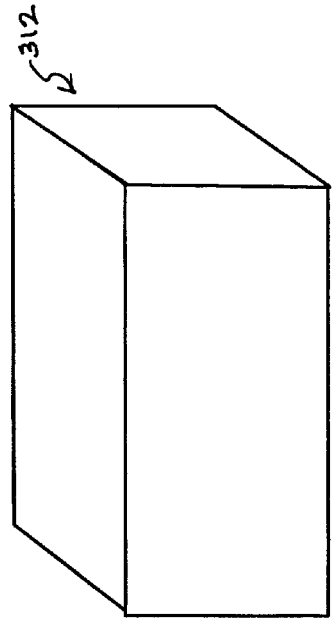
Figure 28D
PRIOR ART
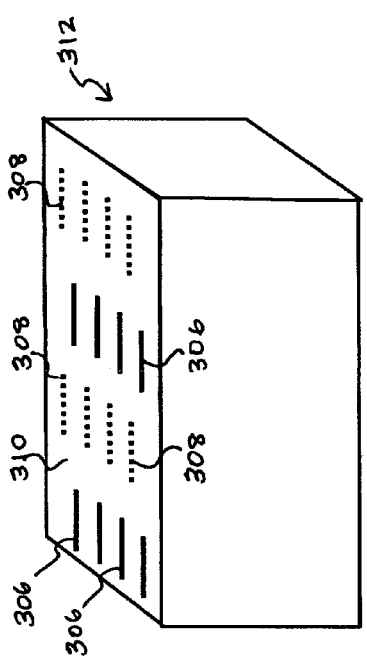
Figure 28C
PRIOR ART

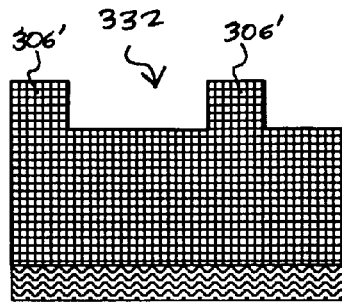
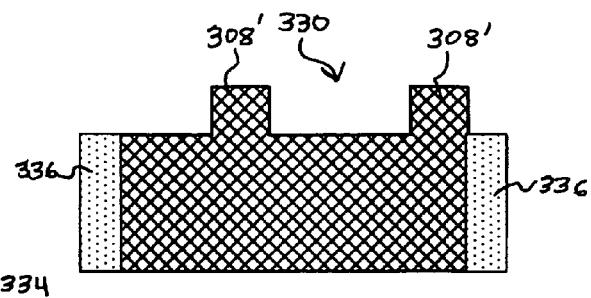
Figure 29A    Figure 29B
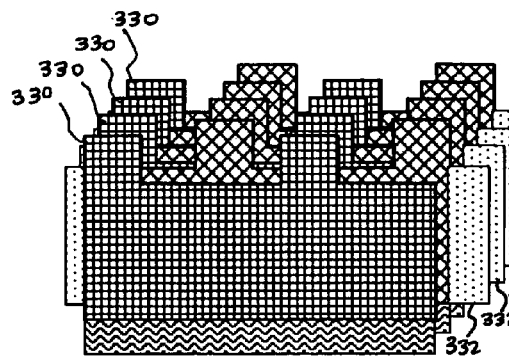
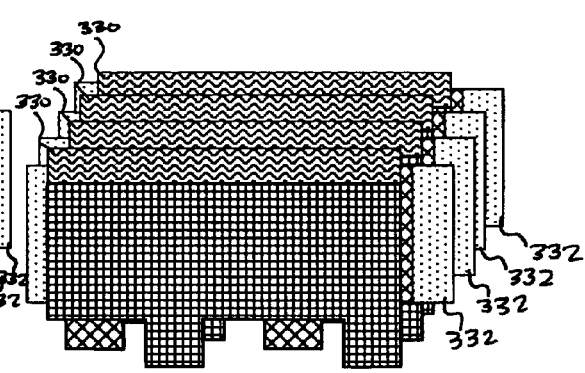
Figure 29C    Figure 29D
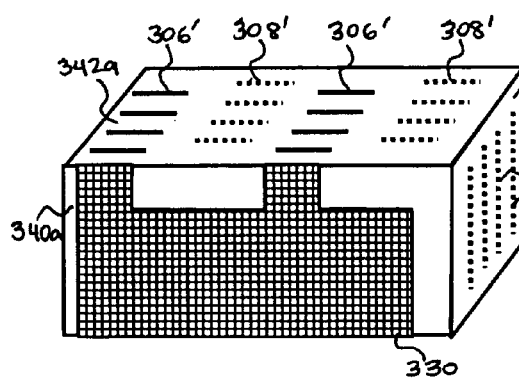
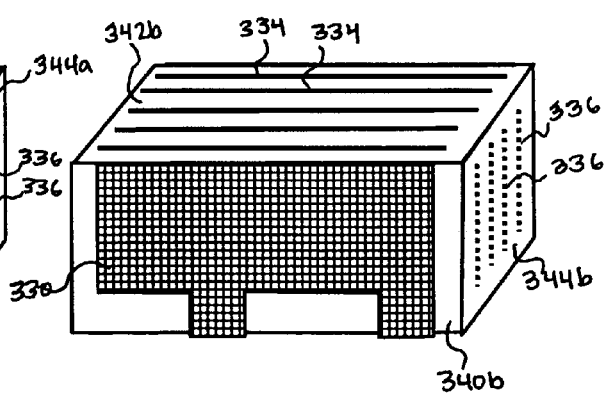
Figure 29E    Figure 29F

SYSTEM AND METHOD OF PLATING BALL GRID ARRAY AND ISOLATION FEATURES FOR ELECTRONIC COMPONENTS

PRIORITY CLAIMS

This application claims the benefit of priority as a continuation-in-part application of previously filed U.S. Utility patent application entitled "PLATED TERMINATIONS AND METHOD OF FORMING USING ELECTROLYTIC PLATING", filed Aug. 10, 2006 and assigned U.S. Ser. No. 11/503,402, which in turn is a continuation-in-part of previously filed U.S. Utility patent application entitled "PLATED TERMINATIONS", filed Feb. 25, 2005 and assigned U.S. Ser. No. 11/066,575, which in turn is a divisional application of previously filed U.S. Utility patent application entitled "PLATED TERMINATIONS", filed Apr. 6, 2004 and assigned U.S. Ser. No. 10/818,951 now U.S. Pat. No. 7,177,137, which in turn is a continuation-in-part application of previously filed U.S. Utility patent application entitled "PLATED TERMINATIONS", filed Aug. 1, 2003 and assigned U.S. Ser. No. 10/632,514, now U.S. Pat. No. 6,960,366, which in turn is a continuation-in-part application of previously filed U.S. Utility patent application entitled "PLATED TERMINATIONS" filed Apr. 8, 2003 and assigned U.S. Ser. No. 10/409,023 now U.S. Pat. No. 7,152,291, which application claims priority to U.S. Provisional Patent Application entitled "PLATED TERMINATIONS," filed Apr. 15, 2002 and assigned U.S. Ser. No. 60/372,673. The complete disclosures of all of the foregoing applications are fully incorporated herein by reference for all purposes. Priority is claimed to all of the above-referenced applications.

BACKGROUND OF THE INVENTION

The present subject matter generally concerns improved termination features for multilayer electronic components, and more particularly relates to plated terminations for multilayer electronic components, such as capacitors, resistors, inductors, etc. or for integrated passive components. The subject termination designs utilize selective arrangements of internal and/or external electrode tabs to facilitate the formation of plated electrical connections. The external connections are preferably made whereby the provision of typical thick film termination stripes is eliminated or greatly simplified.

Many modern electronic components are packaged as monolithic devices, and may comprise a single component or multiple components within a single chip package. One specific example of such a monolithic device is a multilayer capacitor or capacitor array, and of particular interest with respect to the disclosed technology are multilayer capacitors with interdigitated internal electrode layers and corresponding electrode tabs. Examples of multilayer capacitors that include features of interdigitated capacitor (IDC) technology can be found in U.S. Pat. No. 5,880,925 (DuPré et al.) and U.S. Pat. No. 6,243,253 B1 (DuPré et al.). Other monolithic electronic components correspond to devices that integrate multiple passive components into a single chip structure. Such an integrated passive component may provide a selected combination of resistors, capacitors, inductors and/or other passive components that are formed in a multilayered configuration and packaged as a monolithic electronic device.

Selective terminations are often required to form electrical connections for various monolithic electronic components. Multiple terminations are needed to provide electrical connections to the different electronic components of an integrated monolithic device. Multiple terminations are also often used in conjunction with IDC's and other multilayer arrays in order to reduce undesirable inductance levels. One exemplary way that multiple terminations have been formed in multilayer components is by drilling vias through selected areas of a chip structure and filling the vias with conductive material such that an electrical connection is formed among selected electrode portions of the device.

Another way of forming external terminations for the subject devices is to apply a thick film stripe of silver or copper in a glass matrix to exposed portions of internal electrode layers, and subsequently plating additional layers of metal over the termination stripes such that a part is solderable to a substrate. An example of an electronic component with external electrodes formed by fired terminations and metal films plated thereon is disclosed in U.S. Pat. No. 5,021,921 (Sano et al.). The application of terminations is often hard to control and can become problematic with reduction in chip sizes. U.S. Pat. No. 6,232,144 B1 (McLoughlin) and U.S. Pat. No. 6,214,685 B1 (Clinton et al.) concern methods for forming terminations on selected regions of an electronic device.

The ever-shrinking size of electronic components makes it quite difficult to print termination stripes in a predetermined area with required precision. Thick film termination stripes are typically applied with a machine that grabs a chip and applies selective terminations with specially designed and/or engraved wheels. U.S. Pat. No. 5,944,897 (Braden), U.S. Pat. No. 5,863,331 (Braden et al.), U.S. Pat. No. 5,753,299 (Garcia et al.), and U.S. Pat. No. 5,226,382 (Braden) disclose mechanical features and steps related to the application of termination stripes to a chip structure. Reduced component size or an increased number of termination contacts for an electronic chip device may cause the resolution limits of typical termination machines to become maxed out.

Other problems that can arise when trying to apply selective terminations include shifting of the termination lands, mispositioning of terminations such that internal electrode tabs are exposed or missed entirely, and missing wrap-around termination portions. Yet further problems may be caused when too thin a coating of the paint-like termination material is applied or when one portion of termination coating smears into another causing shorted termination lands. These and other concerns surrounding the provision of electrical termination for monolithic devices create a need to provide inexpensive and effective termination features for electronic chip components.

In light of component miniaturization and concerns with providing terminations that do not short together, especially when positioning multiple components in proximity on a circuit board, U.S. Pat. No. 6,380,619 (Ahiko et al.) provides a chip type electronic component having external electrodes that are spaced at predetermined distances from side surfaces of a ceramic substrate. More particularly, electronic components having three-sided terminations as opposed to more conventional five-sided terminations are disclosed. Such components with three-sided terminations are more easily provided in an adjacent relationship with one another without shorting together distinct component terminations. Some embodiments disclosed in Ahiko et al. include electroplated films applied to the exposed portions of individual electrodes.

Yet another known option related to termination application involves aligning a plurality of individual substrate components to a shadow mask. Parts can be loaded into a particularly designed fixture, such as that disclosed in U.S. Pat. No. 4,919,076 (Lutz et al.), and then sputtered through a mask element. This is typically a very expensive manufacturing process, and thus other effective yet more cost efficient termination provisions may be desirable.

U.S. Pat. No. 5,880,011 (Zablotny et al.), U.S. Pat. No. 5,770,476 (Stone), U.S. Pat. No. 6,141,846 (Miki), and U.S. Pat. No. 3,258,898 (Garibotti), respectively deal with aspects of the formation of terminations for various electronic components.

Additional background references that address methodology for forming multilayer ceramic devices include U.S. Pat. No. 4,811,164 (Ling et al.), U.S. Pat. No. 4,266,265 (Maher), U.S. Pat. No. 4,241,378 (Dorrian), and U.S. Pat. No. 3,988,498 (Maher).

While various aspects and alternative features are known in the field of electronic components and terminations therefor, no one design has emerged that generally addresses all of the issues as discussed herein. The disclosures of all the foregoing United States patents are hereby fully incorporated into this application by reference thereto.

BRIEF SUMMARY OF THE INVENTION

The present subject matter recognizes and addresses various of the foregoing shortcomings, and others concerning certain aspects of electrical terminations and related technology. Thus, broadly speaking, a principal object of the presently disclosed technology is improved termination features for electronic components. More particularly, the disclosed termination features are plated and designed to eliminate or greatly simplify thick-film stripes that are typically printed along portions of a monolithic device for termination purposes.

Another principal object of the presently disclosed technology is to offer a way to guide the formation of plated terminations through the provision of internal electrode elements and the optional placement of additional anchor tabs. Both internal electrode elements and additional anchor tabs can facilitate the formation of secure and reliable external plating. Anchor tabs, which typically provide no internal electrical connections, may be provided for enhanced external termination connectivity, better mechanical integrity and deposition of plating materials. The location of exposed internal conductive elements (including electrodes and anchor tabs) enables the deposition and formation of plated termination structures in a "self-determining" process.

Yet another principal object of the present subject matter is to provide termination features for electronic components whereby typical thick-film termination stripes are eliminated or simplified, and only plated terminations are needed to effect many of the external electrode connections for a given component. Plated materials in accordance with the disclosed technology may comprise metallic conductors, resistive materials, and/or semi-conductive materials.

A still further principal object of the subject termination technology is that termination features can be used in accordance with a variety of multilayer monolithic devices, including, for example, low inductance ceramic capacitors and capacitor arrays, multilayer ceramic capacitors and capacitor arrays, and integrated passive components. Integrated passive components may include a select combination of resistors, capacitors, varistors, inductors, baluns, couplers, and/or other passive components.

A resultant advantage of the disclosed subject matter is that termination features for electronic components can be effected without the need for application by termination machinery, thus providing an ability to yield external terminations with resolution levels that may otherwise be unattainable. Such improved termination resolution also enables the provision of more terminations within a given component area and terminations with a much finer pitch, thus reducing over ESL values associated with such terminations.

A general object of the present technology is to provide termination features that enable an effective solder base with reduced susceptibility to solder leaching and also lowered insulation resistance. Another general object of this technology is to provide termination features that enable an effective metal base for wirebonding. Stated another way, with the present ability to electroplate certain materials (for example, such as nickel or gold), a present object is to make it possible to provide a termination for wirebonding. Configuration of exposed electrode portions and anchor tab portions is designed such that selected adjacent exposed tab portions are decorated and joined with plated termination material without undesired bridging among distinct termination locations or nodes.

Yet another object of the present subject matter is that the disclosed technology can be utilized in accordance with a myriad of different termination configurations, including varied numbers and placement of external terminations. Plated terminations can be formed in accordance with a variety of different plating techniques as disclosed herein at locations that are self-determined by the provision of exposed conductive elements on the periphery of an electronic component.

A still further object of the subject plated termination technology is to facilitate the production of more inexpensive and effective electronic components in an expedient and reliable manner. One key reason why this is accomplished is that the subject termination plating process uses "batch" processing instead of individual termination.

Further advantages of the subject technology include formation of thin-film termination structures for electronic components that are selectively formed in self-determined locations with precise terminal shape and alignment. The resultant termination structures and electronic components exhibit reliable electrical and mechanical properties, including low volatile component emissions.

Some embodiments of the presently disclosed technology also result from formation of termination structures that substantially cover one or more peripheral surfaces of an MLC. Generally larger termination structures can facilitate heat transfer and dissipation by carrying heat away from internal areas where the ceramic dielectric acts to insulate generated heat. Some such structures may also serve as an isolation shield for the MLCs to protect against electromagnetic interference (EMI) that may be generated in various circuit applications.

Additional objects and advantages of the present subject matter are set forth in, or will be apparent to those of ordinary skill in the art from, the detailed description herein. Also, it should be further appreciated by those of ordinary skill in the art that modifications and variations to the specifically illustrated, referenced, and discussed features hereof may be practiced in various embodiments and uses of the disclosed technology without departing from the spirit and scope thereof, by virtue of present reference thereto. Such variations may include, but are not limited to, substitution of equivalent means and features, or materials for those shown, referenced, or discussed, and the functional, operational, or positional reversal of various parts, features, or the like.

Still further, it is to be understood that different embodiments, as well as different presently preferred embodiments, of this subject matter may include various combinations or configurations of presently disclosed features or elements, or their equivalents (including combinations of features or configurations thereof not expressly shown in the figures or stated in the detailed description).

A first exemplary embodiment of the present subject matter relates to a multilayer electronic component including a plurality of dielectric layers, a plurality of respective first and second internal electrode layers, a portion of plated termination material, a solder dam layer and a plurality of solder preforms. The first and second polarity internal electrodes are provided in pairs to form opposing capacitor plates and are alternately interleaved with the plurality of dielectric layers to form a stacked monolithic assembly. Electrode tab portions extend from the first and second electrode layers and are initially exposed (before subsequent plating) in respective groups along a mounting surface of the monolithic assembly. Additional portions of the electrode layers may extend to side surfaces, and still further electrodes may be provided externally on one or more surfaces of the stacked assembly. All exposed conductive electrode (and optional anchor tabs) are plated with a termination material that corresponds to a thin-film deposition that nucleates in a self-determining fashion to the exposed conductive elements. In one embodiment, an initial termination material comprising copper is plated to such areas. The solder dam layer is then formed over the mounting surface of the monolithic assembly, and is formed to define openings at a plurality of predetermined areas where solder preforms will ultimately be applied. Before application of the solder preforms, additional layers such as but not limited to a nickel barrier layer and a gold flash layer are plated in the openings formed by the solder dam layer. Solder preforms are subsequently attached to yield a low inductance capacitor with ball grid array (BGA) termination features and electrode layers that are substantially perpendicular to the mounting surface, thus resulting in a low inductance component.

Another exemplary embodiment of the subject technology corresponds to a multilayer electronic component that includes a plurality of dielectric layers, a plurality of respective first and second polarity electrode layers, at least one first portion of thin-film deposition, and at least one second portion of thin-film deposition. The first and second electrode layers are alternately interleaved with the plurality of dielectric layers to form a monolithic assembly where first polarity electrode layers are exposed along first and second adjacent surfaces of the assembly and second electrode layers are exposed along opposite surfaces to those where first polarity electrode layers are exposed. One first polarity electrode may also be provided on the topmost stacked surface and one second polarity on the bottommost surface of the stack to provide external conductive portions. The first portion of thin-film plated deposition is then formed to cover and connect all exposed first polarity internal and external electrode portions in a substantially continuous fashion. Similarly, the second portion of thin-film deposition covers and connects all exposed second polarity internal and external electrode portions.

A still further exemplary embodiment of the subject technology corresponds to a multilayer electronic component for use in high frequency coupling applications. In such embodiment, a plurality of first and second polarity electrodes are interleaved with a plurality of dielectric layers to form a monolithic assembly generally characterized by six peripheral surfaces. First polarity electrodes are configured to extend along an entire dimension (e.g., length) of three surfaces. By providing additional first polarity electrodes externally on opposing top and bottom surfaces of the stack, exposed first polarity conductive portions are positioned to facilitate plated deposition of material completely covering three surfaces and substantially covering two more. In some embodiments, the first polarity electrodes are extended further and exposed such that applied plated terminations also extend to a portion of a sixth surface of the component. Second polarity electrodes have a portion that only extends to a given location along the sixth surface to provide a defined termination path. In one embodiment, this termination path will wrap around to adjacent side surfaces.

The present subject matter equally concerns methodology associated with forming multilayer electronic components in accordance with the disclosed technology.

Additional embodiments of the present subject matter, not necessarily expressed in this summarized section, may include and incorporate various combinations of aspects of features or parts referenced in the summarized objectives above, and/or features or parts as otherwise discussed in this application.

Those of ordinary skill in the art will better appreciate the features and aspects of such embodiments, and others, upon review of the remainder of the specification.

BRIEF DESCRIPTION OF THE SEVERAL VIEWS OF THE DRAWING

A full and enabling description of the present subject matter, including the best mode thereof, directed to one of ordinary skill in the art, is set forth in the specification, which makes reference to the appended figures, in which:

FIG. 20 depicts an exemplary terminated multilayer capacitor in accordance with the presently disclosed technology;

FIGS. 21A and 21B respectively illustrate exemplary cross-sections of the multilayer capacitor of FIG. 20 taken along lines D-D and E-E, specifically depicting the general shape of selected device corners before and after corner rounding of the capacitor device;

FIG. 21C illustrates an exemplary cross-section of the multilayer capacitor of FIG. 20 taken along lines D-D and E-E, specifically depicting an exemplary length relationship between the cover layer anchor tabs and the capacitor end margin;

FIG. 22 illustrates a close-up view of an exemplary cross-section of the multilayer capacitor taken along lines D-D and E-E, specifically depicting the placement of cover layer anchor tabs in an incrementally close relationship towards top and/or bottom surfaces of the capacitor;

FIG. 28A provides a generally bottom perspective view (contact side) of a known exemplary electrode configuration for a multilayer interdigitated capacitor;

FIG. 28B provides a generally top perspective view of the same known exemplary electrode configuration illustrated in FIG. 28A;

FIG. 28C provides a generally bottom perspective view (contact side) of an exemplary multilayer interdigitated capacitor with an internal electrode layer configuration such as the embodiment illustrated in FIGS. 28A and 28B;

FIG. 28D provides a top perspective view of the same exemplary multilayer interdigitated capacitor of FIG. 28C, having an internal electrode layer configuration such as the embodiment illustrated in FIGS. 28A and 28B;

FIGS. 29A and 29B respectively illustrate generally plan views of an exemplary electrode layer configuration with alternating extended side and extended bottom electrode portions for use in multilayer capacitor embodiments in accordance with the present subject matter;

FIGS. 29C and 29D respectively illustrate generally bottom and top perspective views of an exemplary electrode layer configuration using the electrodes illustrated in FIGS. 29A and 29B;

FIGS. 29E and 29F respectively illustrate generally bottom and top perspective views of an exemplary multilayer capacitor with an internal electrode layer configuration such as that illustrated in FIGS. 29C and 29D;

Figure 1A:
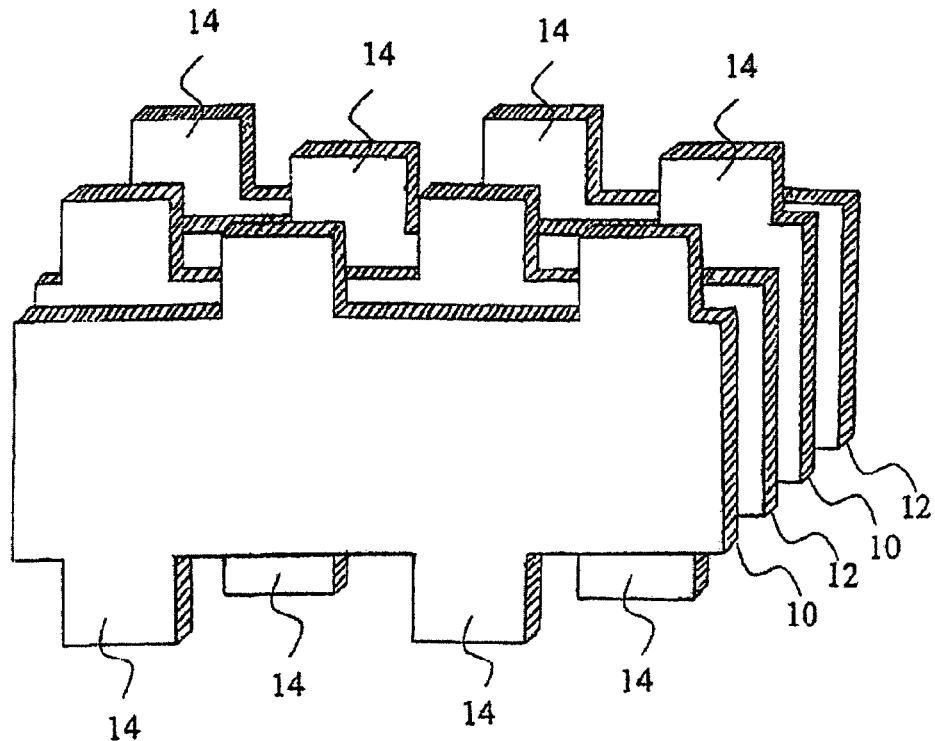
FIG. 1A illustrates a generally top exploded view of a known exemplary electrode layer configuration for a multilayer interdigitated capacitor.

Repeat use of reference characters throughout the present specification and appended drawings is intended to represent same or analogous features, elements, or steps of the present subject matter.

DETAILED DESCRIPTION OF THE EMBODIMENTS

As referenced in the Brief Summary of the Invention section, supra, the present subject matter is directed towards improved termination features for monolithic electronic components.

The subject termination scheme utilizes exposed electrode portions of structures such as monolithic capacitor arrays, multilayer capacitors including those with interdigitated electrode configurations, integrated passive components, and other electronic chip structures. Additional anchor tabs may be embedded within such monolithic components to provide stacked pluralities of exposed internal conductive portions to which plated terminations may be formed and securely positioned along the periphery of a device.

By providing additional anchor tabs on selected top and/or bottom surfaces of a chip device, wrap-around plated terminations may be formed that extend along the side of a chip to one or more of the top and bottom layers. Such wrap-around terminations may be desirable in certain applications to facilitate soldering of the chip to a printed circuit board or other suitable substrate. Exposed tabs that extend along an entire side without wrapping around to the top and/or bottom layers may be formed by providing anchor tabs into respective corner radius portions of the top and bottom cover layers of the device, thus facilitating a land-less termination that still enables good solder wetting to a printed circuit board or other mounting surface.

Figure 1B:
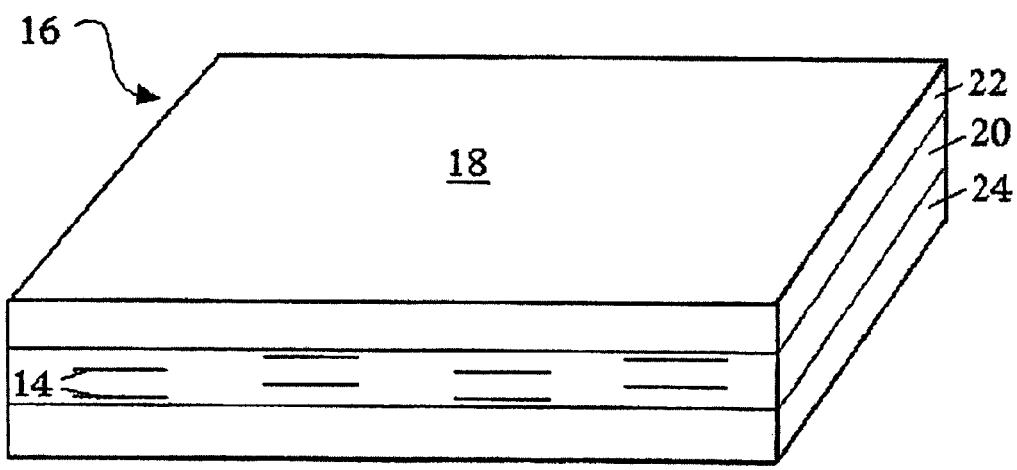
FIG. 1B illustrates a generally side perspective view of an exemplary multilayer interdigitated capacitor with an internal electrode layer configuration such as the known exemplary embodiment illustrated in FIG. 1A.

The subject plating technology and anchor tab features may be utilized in accordance with a plurality of different monolithic components. FIGS. 1A and 1B represent aspects of known interdigitated electrode layer configurations wherein electrode tabs generally extend to and are exposed on two selected sides of a multilayer component. Aspects of plated terminations in accordance with the present subject matter are thereafter presented with respect to FIGS. 2A and 2B, which also concern multilayer component embodiments with exposed conductive portions of two selected sides of a device.

Figure 3A:
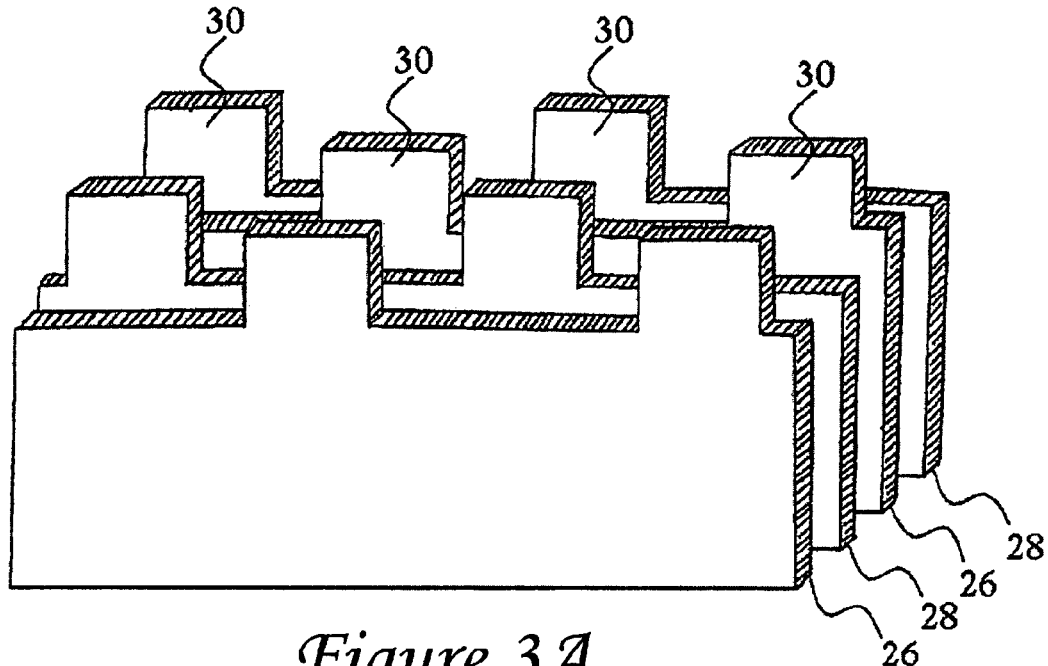
FIG. 3A illustrates a generally top exploded view of a known exemplary internal electrode layer configuration for a multilayer capacitor.
Figure 3B:
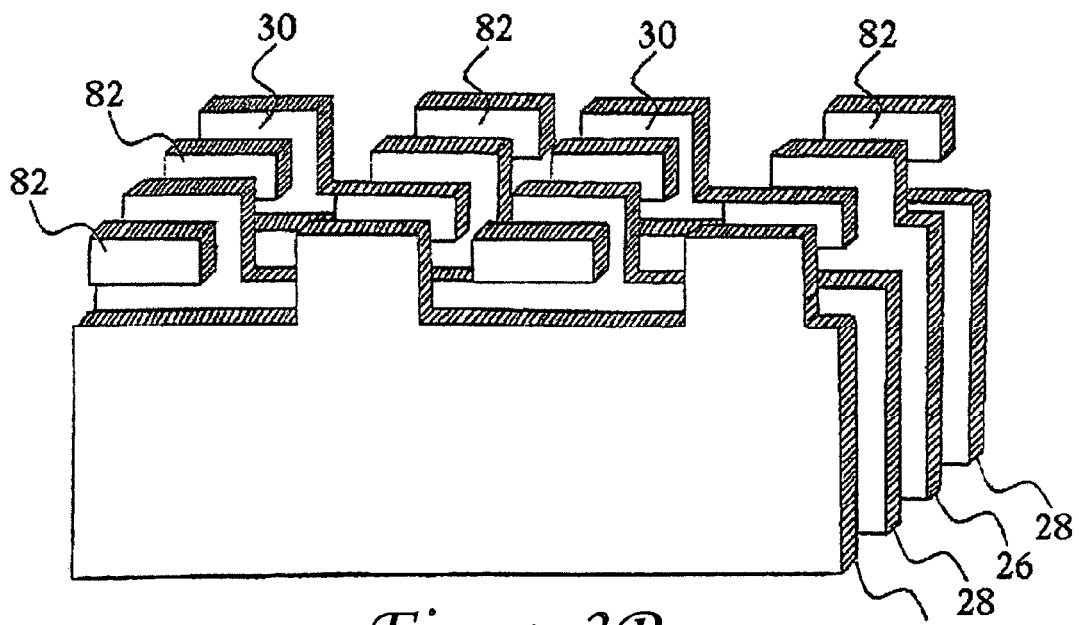
FIG. 3B illustrates a generally top exploded view of an exemplary internal electrode layer and anchor tab configuration for a multilayer capacitor in accordance with the present subject matter.
Figure 4A:
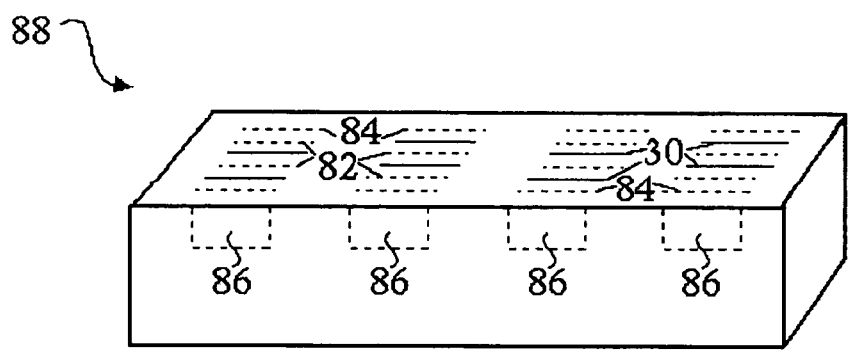
FIG. 4A illustrates a generally side perspective view of an exemplary multilayer capacitor in accordance with the present subject matter with internal electrode and anchor tab portions such as illustrated in FIG. 3B.
Figure 4B:
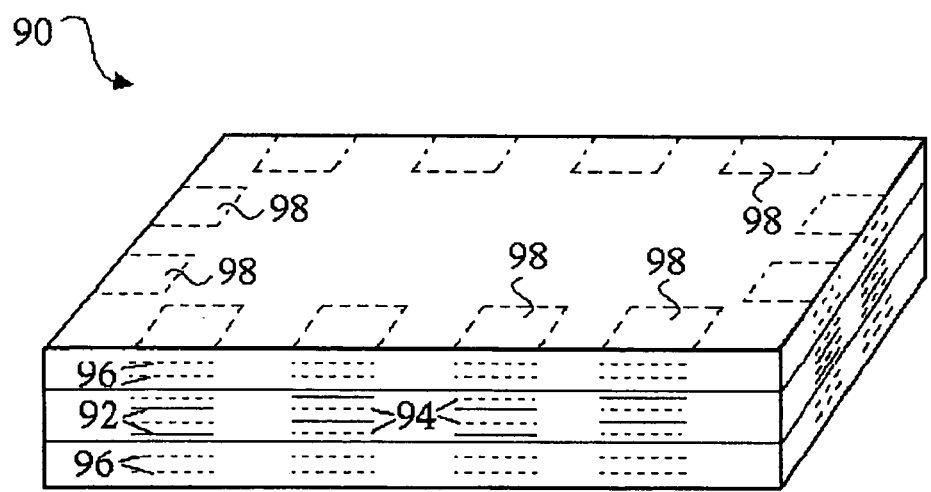
FIG. 4B illustrates a generally side perspective view of an exemplary multilayer interdigitated capacitor in accordance with the present subject matter, featuring internal electrode and anchor tab portions exposed on four selected sides of the exemplary capacitor configuration.

FIG. 3A illustrates aspects of a known electrode layer configuration with electrode tabs for exposure on one selected side of a multilayer electronic device. FIGS. 3B and 4A, respectively, relate to improvements of the exemplary embodiment presented in FIG. 3A, providing for an exemplary multilayer capacitor with internal electrode tabs exposed on one selected side of the capacitor and featuring anchor tabs in accordance with the present technology. FIG. 4B relates to an exemplary multilayer interdigitated component with internal electrode tabs and anchor tabs exposed on four selected sides of the component in accordance with the present subject matter.

Figure 5A:
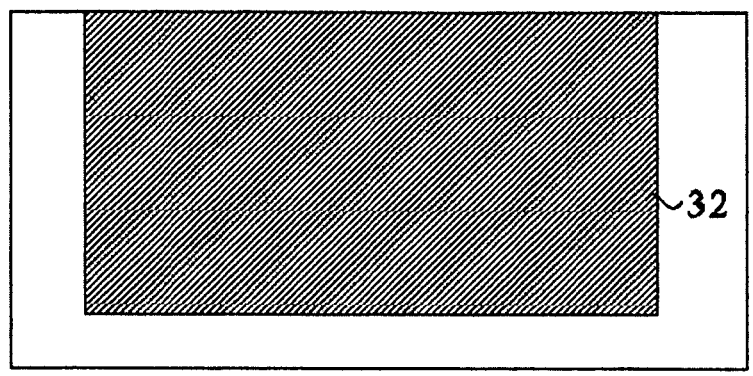
FIGS. 5A and 5B respectively illustrate generally top views of a known electrode layer configuration for use in exemplary multilayer capacitor embodiments.
Figure 5B:
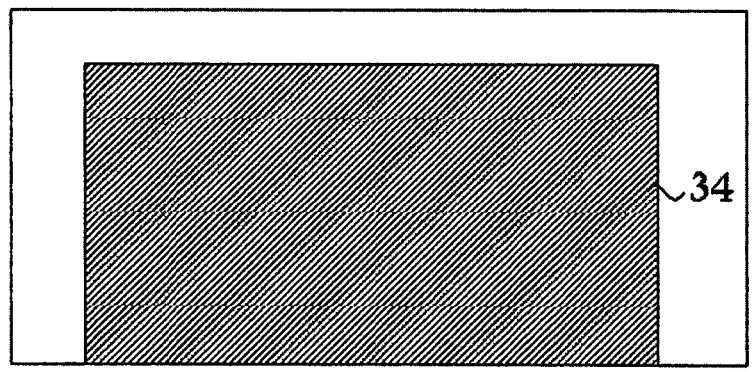
Figure 5C:
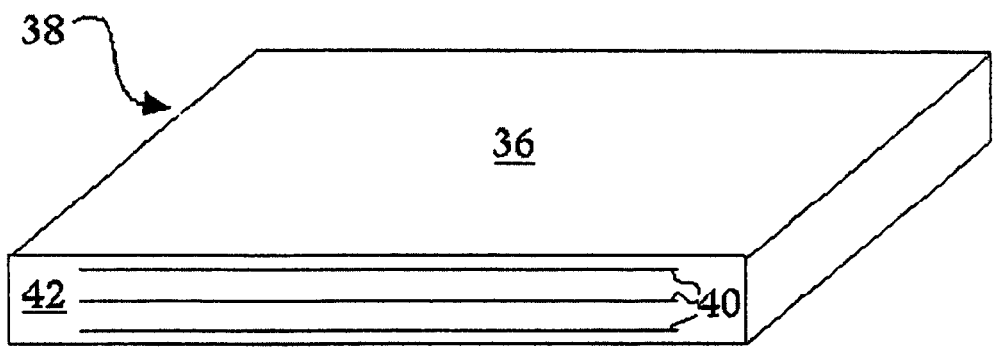
FIG. 5C illustrates a generally side perspective view of an exemplary multilayer capacitor embodiment with electrode layer configurations such as the known exemplary representations of FIGS. 5A and 5B.
Figures 10A, 10B:
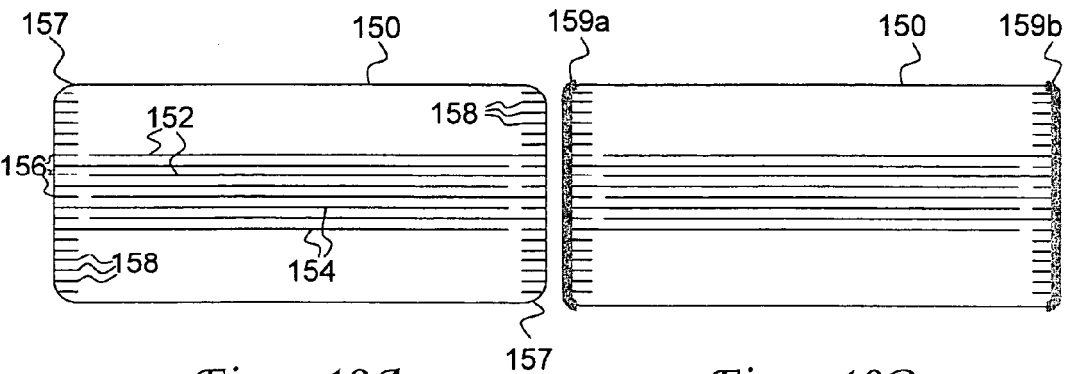
FIG. 10A illustrates a generally side cross-sectional view of an exemplary multilayer electronic component having electrodes and anchor tabs positioned and exposed for forming an "I-shaped" termination in accordance with the presently disclosed technology.
FIG. 10B illustrates a generally side cross-sectional view of an exemplary multilayer electronic component with "I-shaped" terminations, such as formed via subjection of the embodiment depicted in FIG. 10A to selected plating processes as presently disclosed in accordance with the present subject matter.
Figures 11A, 11B:
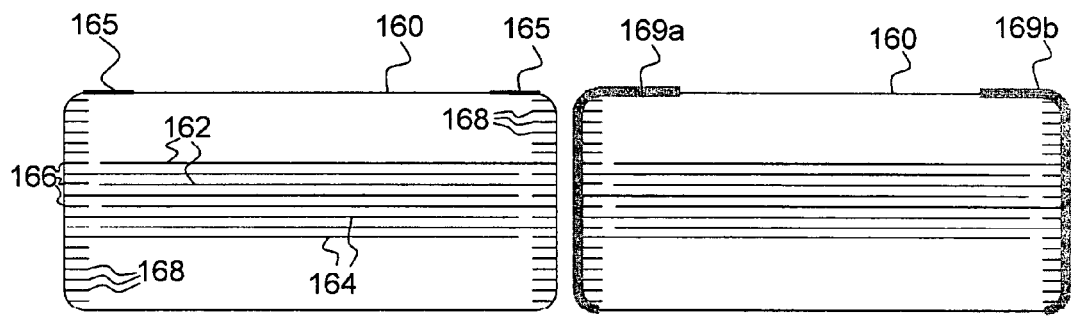
FIG. 11A illustrates a generally side cross-sectional view of an exemplary multilayer electronic component having electrodes and anchor tabs positioned and exposed for forming a "J-shaped" termination in accordance with the presently disclosed technology.
FIG. 11B illustrates a generally side cross-sectional view of an exemplary multilayer electronic component with "J-shaped" terminations, such as formed via subjection of the embodiment depicted in FIG. 11A to selected plating processes as presently disclosed in accordance with the present subject matter.
Figures 12A, 12B:
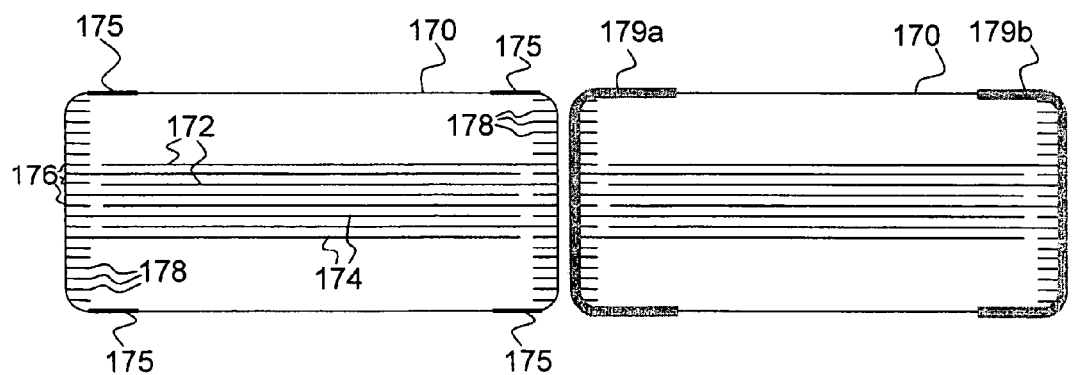
FIG. 12A illustrates a generally side cross-sectional view of an exemplary multilayer electronic component having electrodes and anchor tabs positioned and exposed for forming an "U-shaped" termination in accordance with the presently disclosed technology.
FIG. 12B illustrates a generally side cross-sectional view of an exemplary multilayer electronic component with "U-shaped" terminations, such as formed via subjection of the embodiment depicted in FIG. 12A to selected plating processes as presently disclosed in accordance with the present subject matter.
Figure 23A:
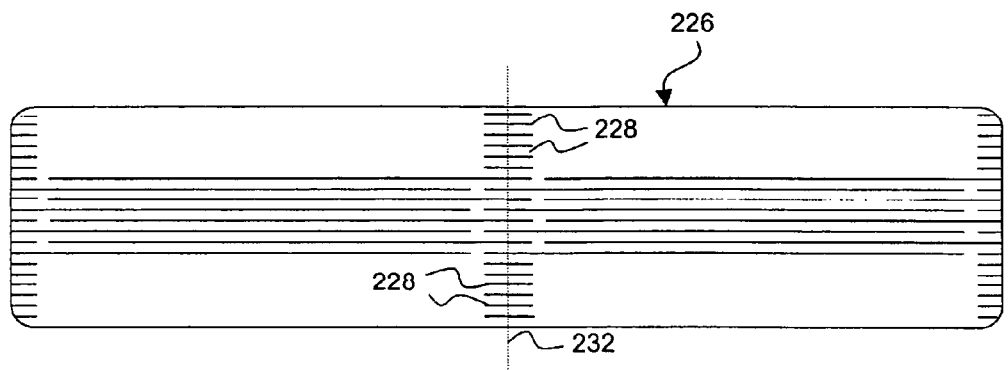
FIG. 23A illustrates an exemplary portion of a multilayer capacitor assembly that may be subjected to generally "V-shaped" dicing such as represented in FIG. 23B to produce multiple capacitors that after slight additional corner rounding may appear as depicted in FIG. 23C.
Figure 23B:
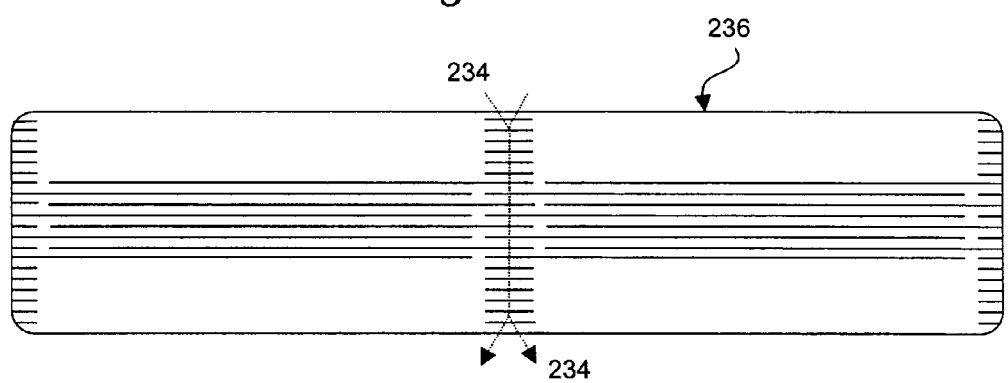
Figure 23C:
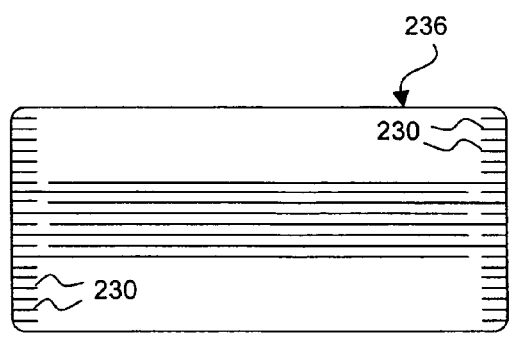
Figure 24:
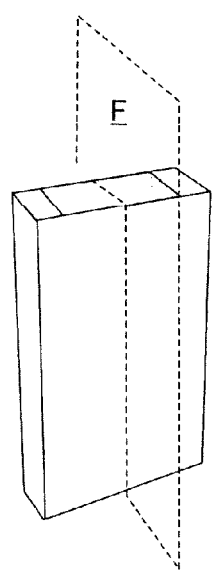
FIG. 24 depicts an exemplary terminated multilayer capacitor in accordance with the presently disclosed technology.
Figure 25:
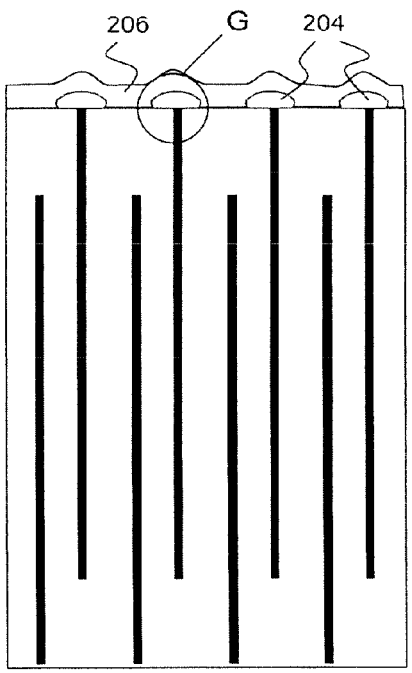
FIG. 25 illustrates an exemplary cross-section of the multilayer capacitor of FIG. 24 taken along plane F, depicting various visual features of the exemplary plated terminations in accordance with the present subject matter.
Figure 26A:
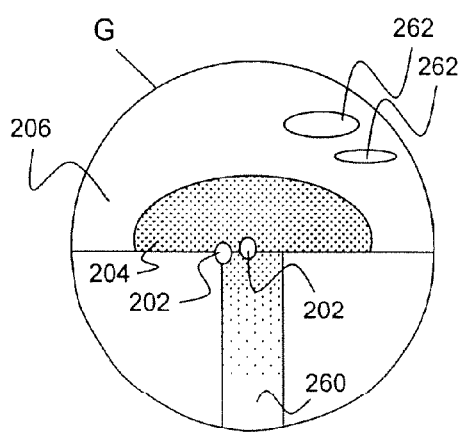
FIG. 26A illustrates an exemplary detailed view of area G of the capacitor cross-section depicted in FIG. 25, illustrating additional various visual features of exemplary plated terminations in accordance with the present subject matter.
Figure 26B:
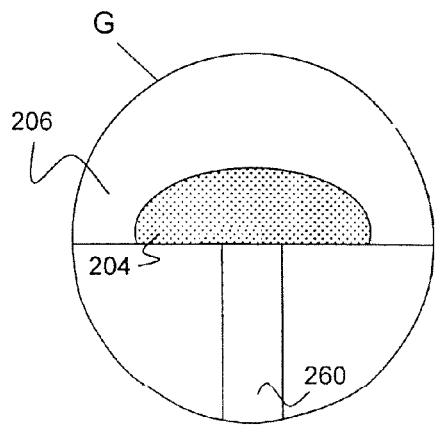
FIG. 26B illustrates an exemplary detailed view of an area G of a capacitor cross-section as depicted in FIG. 25, illustrating additional various visual features of exemplary plated terminations for a non metal penetration embodiment in accordance with the present subject matter.
Figure 27:
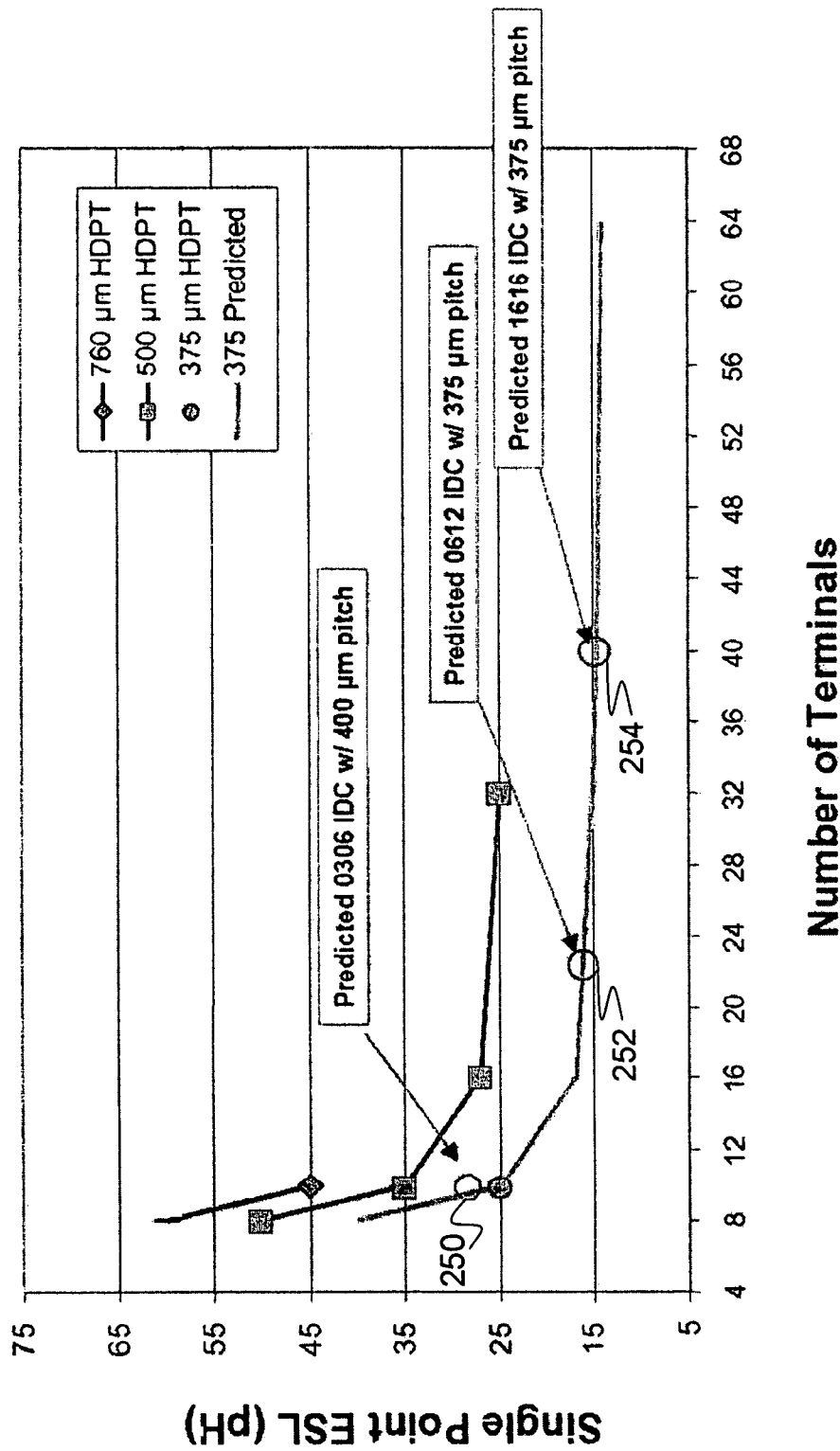
FIG. 27 provides a graphical representation of single point ESL measurements versus the number of terminals in High Density Peripheral Termination (HDPT) capacitors designed in accordance with the present subject matter.

Still further exemplary embodiments of the present subject matter relate to the multilayer capacitor configurations illustrated in FIGS. 6A through 6G, respectively, which are improvements to the exemplary multilayer capacitor configurations of FIGS. 5A through 5C, respectively. Additional examples of multilayer capacitor configurations are illustrated in FIGS. 13A through 13C, 14A through 14C, 15A through 15C, 16A through 16D and 17A through 17C, respectively. Still further embodiments of the disclosed technology are presented with reference to the exemplary capacitor arrays of FIGS. 7A and 7B. FIGS. 8A and 8B then represent aspects of the subject plated termination features, while FIGS. 9A and 9B concern an exemplary integrated passive component with selective terminations in accordance with the present subject matter. As more particular examples of possible uses of the presently disclosed technology, FIGS. 10A and 10B depict aspects of "I-shaped" terminations, while FIGS. 11A and 11B depict aspects of "J-shaped" terminations and FIGS. 12A and 12B depict aspects of "U-shaped" terminations. FIGS. 18A and 19A through 19D illustrate exemplary variations of the incorporation of anchor tabs, active capacitor electrodes and common electrodes in multilayer capacitors of the present technology. FIGS. 20, 21A through 21C and 22 more specifically illustrate exemplary aspects associated with providing anchor tabs in cover layers of a multilayer electronic component. FIGS. 23A through 23C, respectively, depict an exemplary V-cut dicing option that facilitates generally angled off and eventually rounded edges and corners for embodiments of the present subject matter. FIGS. 24, 25 and 26 illustrate specific exemplary features associated with the subject plated terminations, and FIG. 27 provides a graphical representation of ESL values associated with exemplary embodiments of the disclosed technology having a relatively high number and density of resultant peripheral terminations.

It should be noted that each of the exemplary embodiments as presented herein should not insinuate limitations of the disclosed technology. More particularly, different electrode configurations than those illustrated may be utilized with the disclosed plating steps and structures. Features illustrated or described as part of one embodiment can be used in combination with another embodiment to yield further embodiments. Additionally, certain features may be interchanged with similar devices or features not mentioned yet which perform the same, similar or equivalent function.

Reference will now be made in detail to the presently preferred embodiments of the disclosed technology. Referring to the drawings, FIG. 1A illustrates a known exemplary configuration of electrode layers 10 and 12 with electrode tabs 14 for use in a multilayer interdigitated capacitor or capacitor array. Electrode layers are arranged in parallel with tabs 14 extending from the layers such that electrode tabs extending from alternating electrode layers 10 and 12 are aligned in respective columns. The exemplary illustration depicts four such electrode layers with corresponding tabs 14, but typical arrangements as utilized with the present technology may in some instances contain many more electrode layers and respective tabs. This feature provides the option of creating capacitive elements with a large range of capacitance values (by choosing the number of electrodes).

The exemplary electrode layer configuration of FIG. 1A is not representative of a finished capacitor embodiment. Instead, FIG. 1A provides a reference for an intermediate aspect of exemplary capacitor and capacitor array configurations. The electrode layer configuration of FIG. 1A can be utilized in accordance with an exemplary multilayer interdigitated capacitor such as displayed in FIG. 1B.

An interdigitated capacitor typically consists of a plurality of electrode layers, such as those shown in FIG. 1A disposed in a body of dielectric material 18, such as seen in the exemplary interdigitated capacitor configuration 16 of FIG. 1B. Electrode layers 10 and 12 are disposed in the dielectric material 18 such that electrode tabs 14 extend to and are exposed at two sides of IDC embodiment 16. Exemplary materials for such electrode layers may include platinum, nickel, silver, a palladium-silver alloy, other alloys of these materials, or other suitable conductive substances. Dielectric material 18 may comprise barium titanate, zinc oxide, alumina with low-fire glass, or other suitable ceramic or glass-bonded materials. Alternatively, the dielectric may be an organic compound such as an epoxy (with or without ceramic mixed in, with or without fiberglass), popular as circuit board materials, or other plastics common as dielectrics. In these cases the conductor is usually a copper foil which is chemically etched to provide the patterns.

Exemplary IDC embodiment 16 may alternatively be viewed as a multilayer configuration of alternating electrode layers and dielectric layers in portion 20 of the device. IDC 16 is typically further characterized by a topmost dielectric layer 22 and bottommost dielectric layer 24 that may be built up to be generally thicker than other dielectric layer portions of IDC configuration 16. Such dielectric layers 22 and 24 act as cover layers to protect the device and provide sufficient bulk to withstand the stress of glass/metal frit that may be fired to a capacitor body. Known capacitor embodiments have utilized the multilayer arrangement of FIG. 1B, and the present subject matter utilizes aspects of such configuration 16 in accordance with additional features disclosed herein.

A multilayer IDC component 16 such as that of FIG. 1B that incorporates the known exemplary electrode layer configuration of FIG. 1A is characterized by electrode portions 14 that are exposed on two selected sides of IDC component 16. Other exemplary internal electrode configurations may be employed in a multilayer component such that internal electrode portions are exposed at different locations and/or on different numbers of sides of the device.

For example, consider the exemplary internal electrode layer configuration illustrated in the exploded view of FIG. 3A. Alternating electrode layers 26 and 28 are provided with electrode tab portions 30 extending toward a single selected direction. Electrode tabs 30 for each set of alternating electrode layers are preferably arranged in a stacked configuration such that, for instance, tabs 30 from electrode layers 26 are aligned in two respective columns. A similar alignment situation preferably holds for tabs 30 of electrode layers 28. A multilayer capacitor or other passive component that utilizes the exemplary internal electrode configuration of FIG. 3A will typically be configured such that electrode tab portions 30 are exposed on a single selected side of the component.

Yet another exemplary internal electrode layer configuration provides for electrode tabs that are exposed on four sides of a multilayer interdigitated component. Such internal electrode layers may be similar to the configuration depicted in FIG. 1A wherein each alternating electrode layer 10 and 12 has additional tab portions on the sides of the layers adjacent to the sides from which tab portions 14 extend.

A still further exemplary electrode layer configuration and corresponding multilayer capacitor embodiment is depicted in FIGS. 5A through 5C, respectively. A first plurality of internal electrode layers 32 such as in FIG. 5A are interleaved with internal electrode layers 34, such as in FIG. 5B, in a body of dielectric material 36 to form a multilayer capacitor 38 such as in FIG. 5C. In such exemplary multilayer component 38, portions 40 of one set of electrode layers 32 or 34 is exposed on side 42 of component 38. The portions of the other set of electrode layers 32 or 34 are thus exposed on the side of the device opposite of side 42 (not seen in the drawing).

Referring again to FIG. 1B, a typical conventional termination for IDC embodiment 16 and for other monolithic electronic components comprises a printed and fired thick-film stripe of silver, copper, or other suitable metal in a glass matrix, on top of which is plated a layer of nickel to promote leach resistance, and is followed by a layer of tin or solder alloy which protects the nickel from oxidation, and promotes an easily soldered termination.

A thick-film stripe in accordance with such type of termination also typically requires printed application by a termination machine and printing wheel or other suitable component to transfer a metal-loaded paste. Such printing hardware may have resolution limits that make it hard to apply thick-film stripes, especially to smaller chips. A typical existing size for an IDC 16 or other electronic component is about one hundred and twenty mils (thousandths of an inch) by sixty mils along the two opposing sets of sides with a thickness from top to bottom layers of about thirty mils. When more than four terminations need to be applied to a part this size or terminations are desired for a part with smaller dimensions, the resolution levels of specialized termination machinery often becomes a limitation in applying effective termination stripes.

The present subject matter offers a termination scheme that eliminates or greatly simplifies the provision of such typical thick-film termination stripes. By eliminating the less-controlled thick film stripe, the need for typical termination printing hardware is obviated. Termination features in accordance with the disclosed technology focus more on the plated layer of nickel, tin, copper, etc. that is typically formed over a thick-film termination stripe.

With plated terminations in accordance with the presently disclosed technology, it should be appreciated that it is possible to form terminations that are the same width along a component's periphery as that of the exposed internal electrodes. In prior art termination schemes, where thick-film termination stripes are applied, the terminations are typically wider than the exposed electrode portions to account for potential misregistration of exposed tabs. Exposed electrode portions in such prior art embodiments must typically be narrow enough to not only ensure complete coverage thereof by the terminations, but also to ensure that adjacent terminations do not short together. In accordance with aspects of the presently disclosed plated terminations, the pitch between adjacent columns of exposed internal electrode pads need not be as great. Since the potential problems associated with thick-film terminations are eliminated in many embodiments, capacitors may be made with electrode tabs having greater width, or reduced pitch between adjacent columns of electrode tabs, or with a higher number of electrode tabs. Each of the aforementioned capacitor modifications yields electronic components with advantageously lower equivalent series inductance (ESL).

ESL can be particularly lowered when more electrode tabs are utilized in a multilayer capacitor embodiment and when columns of such electrode tabs are closer together. Interdigitated capacitors having a relatively large number of electrode tabs per electrode have a resulting large number of electrical terminals and are thus often referred to as High Density Peripheral Termination (HDPT) capacitors. The construction and termination of such parts is facilitated in accordance with the presently disclosed technology, thus achieving components with improved ESL characteristics. A graph illustrating this phenomenon is provided in FIG. 27, which shows several curves modeling the single point ESL in picoHenries (pH) versus number of terminals in an interdigitated capacitor. The curve with the diamond-shaped data point corresponds to the measured ESL for HDPT capacitors with 8-10 terminals having a pitch of about 760 µm. The curve with the square-shaped data points corresponds to the measured ESL for HDPT capacitors with 8-32 terminals having a pitch between terminals of about 500 µm. The solid circular data point and portion of the corresponding line between 8-10 terminals represents the measured ESL versus number of terminals with a terminal pitch of 375 μm. The portion of the line extending beyond the solid circular data point (>10 terminals) represents the predicted ESL versus number of terminals with terminals having a pitch of about 375 μm. Circular data point 250 represents the predicted ESL for an 0306 size interdigitated capacitor (IDC) having a 400 μm pitch between its 10 terminals. Circular data point 252 represents the predicted ESL for an 0612 size IDC having a 375 μm pitch among its 22 terminals. Circular data point 254 corresponds to the predicted ESL for a 1616 size IDC having a 375 μm pitch between components. The predicted ESL from the model is clearly lower from either the experimental data or from expectation of those of ordinary skill in the art. As should be understood by one of ordinary skill in the art, a component size of "XXYY" corresponds to one having a width dimension of 0.XX inches and a length dimension of 0.YY inches.

Figure 7A:
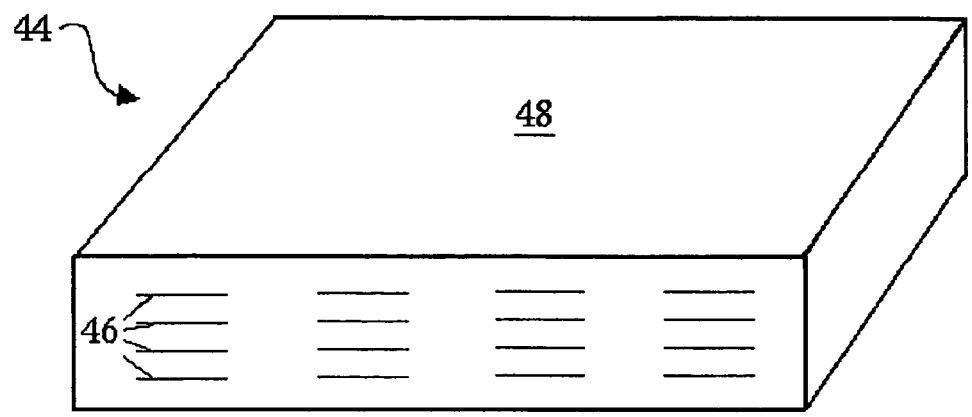
FIG. 7A illustrates a generally side perspective view of an exemplary capacitor array with exposed electrode tabs.
Figure 7B:
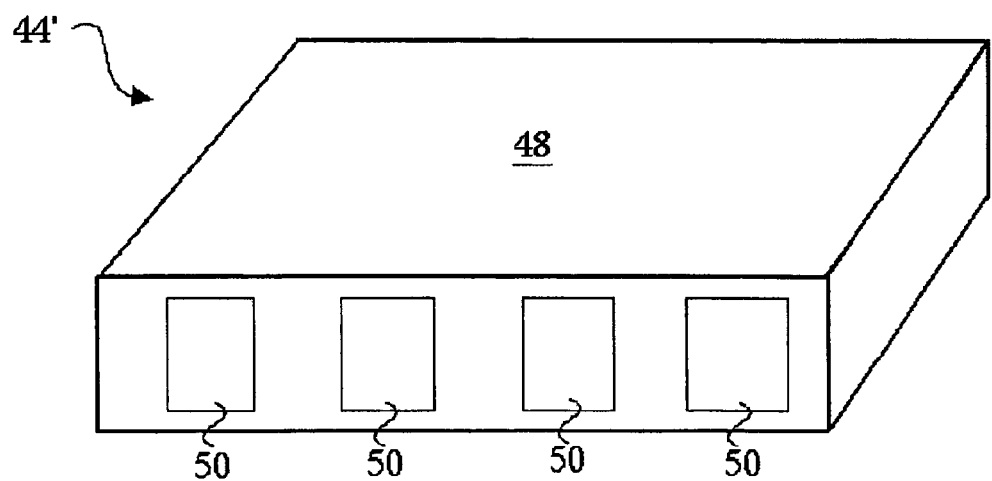
FIG. 7B illustrates a generally side perspective view of an exemplary capacitor array with plated terminations in accordance with the present subject matter.
Figure 8A:
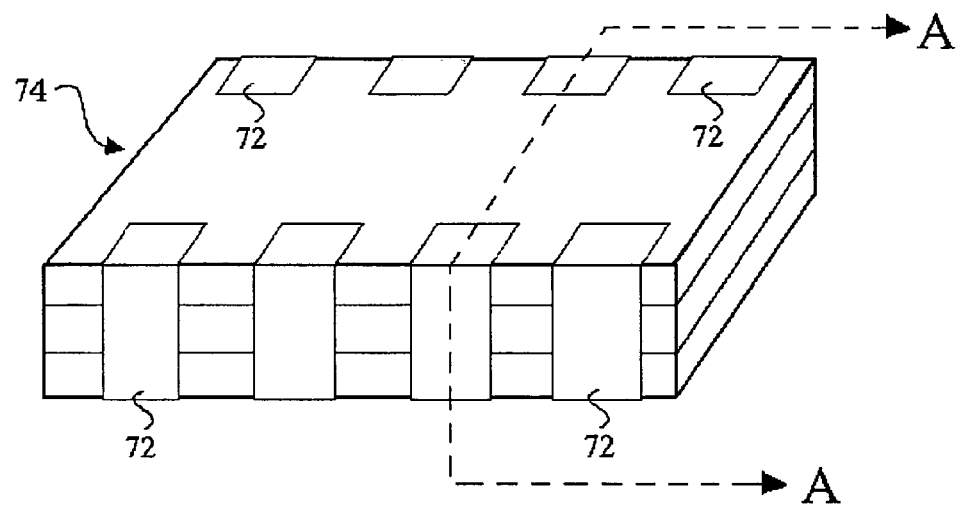
FIG. 8A illustrates a generally side perspective view of an exemplary multilayer interdigitated capacitor with plated terminations in accordance with the present subject matter.
Figure 8B:
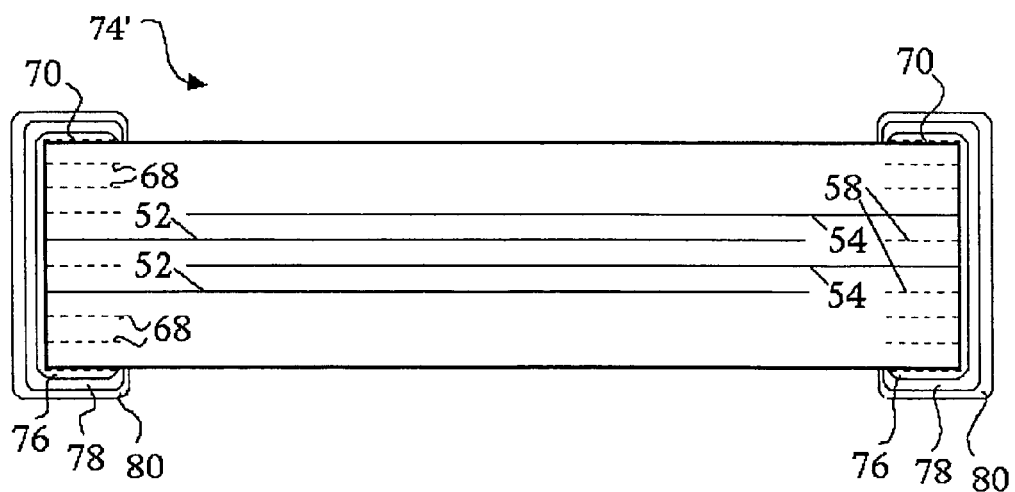
FIG. 8B illustrates a side cross-sectional view of an exemplary multilayer interdigitated capacitor with exemplary plated terminations in accordance with the disclosed technology taken along planar section line A-A of FIG. 8A.

Now consider the exemplary capacitor array configuration 44 presented in FIG. 7A. Capacitor array 44 is characterized by a plurality of internal electrodes and corresponding electrode tabs 46 embedded in a body of dielectric material 48. As opposed to the electrode layers of exemplary IDC configuration 16, the electrode tabs 46 of capacitor array 44 typically correspond to separate internal electrodes. By subjecting capacitor array 44 or other electronic component with similarly exposed electrode tabs to an electroless plating solution, for example nickel or copper ionic solution, or to an electrolytic plating solution with an electrical bias, the formation of plated terminations 50, such as is shown in FIG. 7B, is preferably effected. Electrical bias for electrolytic plating solution is established by external power supply with negative or minus connection to the electronic component requiring formation of plated terminations and positive or plus connection to proper solid anode material (e.g., Cu in Cu plating solution) in the same electrolytic plating solution. Exposure to such solution enables the exposed electrode tabs 46 to become deposited with nickel, copper, tin or other metallic plating. The resulting deposition of plated material is preferably enough to effect an electrical connection between adjacent electrode tabs 46 in a stacked column. The distance between adjacent electrode tabs in a column of tabs should preferably be no greater than about ten microns to ensure proper plating, and may be less than about eight microns in some embodiments. The one to ten micron distances between electrodes can be maintained in accordance with the present subject matter for most embodiments by the addition of anchor or non-functional tabs. The distance between adjacent columnar stacks of electrode tabs 46 should thus be greater by at least a factor of 2 than this minimum distance to ensure that distinct terminations 50 do not run together. In some embodiments of the present technology, the distance between adjacent columnar stacks of exposed metallization is about four times the distance between adjacent exposed electrode tabs 46 in a particular stack. By controlling the distance between exposed internal conductor portions, termination connectivity can be manipulated to form bridged or non-bridged terminations depending on the desired termination configuration.

Plated terminations 50 are thus guided by the positioning of the exposed electrode tabs 46. This phenomena is hereafter referred to as "self-determining" since the formation of plated terminations 50 is determined by the configuration of exposed metallization at selected peripheral locations on multilayer component, or capacitor array, 44. The exposed internal electrode tabs 46 also help anchor terminations 50 to the periphery of capacitor array 44', which corresponds to a multilayer capacitor embodiment such as 44 of FIG. 7A with the addition of plated terminations 50. Further assurance of complete plating coverage and bonding of the metals may be achieved by including resistance-reducing additives in the plating solution.

A still further mechanism for enhancing the adhesion of metallic deposit that forms the subject plated terminations is to thereafter heat the component in accordance with such technologies as baking, laser subjection, UV exposure, microwave exposure, arcwelding, etc. This heating step, also referred to in the art as annealing, often results in the diffusion of some of the plated termination material into the adjacent exposed conductive portions (e.g., internal electrodes, internal and/or external anchor tabs). The resultant diffusion evident from such an annealing process is represented in the example of FIG. 26A, which displays a detailed view of the area G from FIG. 25, which respectively illustrates an exemplary cross-section of the multilayer device of FIG. 24 taken along plane F. When conductive portion 204 (for example, copper plating) is formed at an exposed conductive portion 260 (for example, a Nickel electrode) some copper from portion 204 will diffuse into the portion 260. This phenomenon is represented by the downward gradient shading in portion 260. The annealing step may also result in some voiding in selected portions of the plated terminations (for example in plated layer 206). Such voiding (represented by exemplary areas 262) may be the result of "Kirkendall" voiding, where diffusion of the adjacent conductive portions during annealing causes formed alloy(s) to take up less volume than the original constituents. Somewhat to a degree in contrast, the exemplary embodiment of FIG. 26B (a non metal penetration embodiment of the present subject matter) does not have such voiding areas 262, does not have the activator material traces 202, and does not have some portion of 204 diffusing into the portion 260.

The plated terminations 50 of FIG. 7B may be sufficiently formed for some component applications, but sometimes the exposed metallization from internal electrode tabs is insufficient to form the self-determining terminations of the present technology. In such case, it may be beneficial, and in some cases necessary, to provide additional anchor tabs embedded within select portions of a monolithic component. Anchor tabs are short conductive tabs that typically offer no electrical functionality to a component, but mechanically nucleate and secure additional plated termination along the periphery of a monolithic device. Exposed anchor tabs in combination with exposed internal electrode portions can provide sufficient exposed metallization to create more effective self-determining terminations. Exposed anchor tabs in combination with exposed internal electrodes can be used to reduce the distance between exposed electrodes and tabs to less than ten microns to insure continuous metal deposit with no gaps and to potentially improve deposit adhesion by providing more direct electrolytically plated metal to internal and exposed metal contact areas, as well as a root-like system into the ceramic.

Figure 2A:
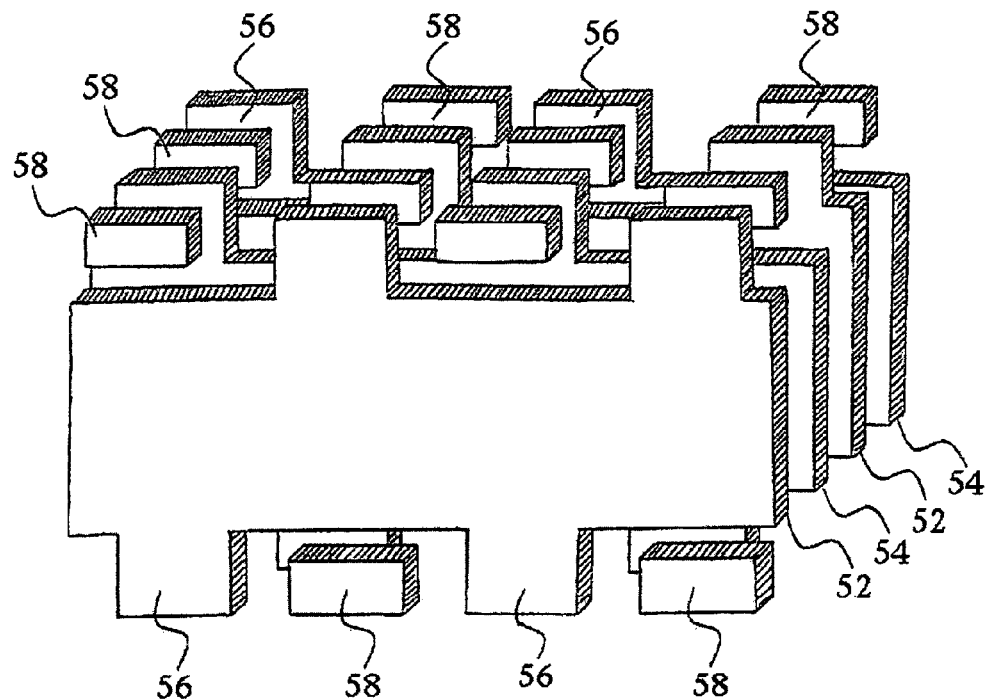
FIG. 2A illustrates a generally top exploded view of an exemplary internal electrode layer and anchor tab configuration for a multilayer interdigitated capacitor in accordance with the present subject matter.

For instance, consider the exploded configuration of exemplary internal metallization illustrated in FIG. 2A. Alternating electrode layers 52 and 54 are provided in a similar configuration to the electrode layers of FIG. 1A, with electrode tab portions 56 extending from selected locations of electrode layers 52 and 54. Additional anchor tabs 58 are also preferably provided in the same plane as active electrode layers 52 and 54 such that they are also exposed at selected locations along a multilayer component, yet offer no internal electrical connections. Additional anchor tabs may also be provided in the cover layers of a multilayer component and exposed along selected sides such that the formation of self-determining plated terminations that extend along even more of the component periphery is enabled.

Figure 2B:
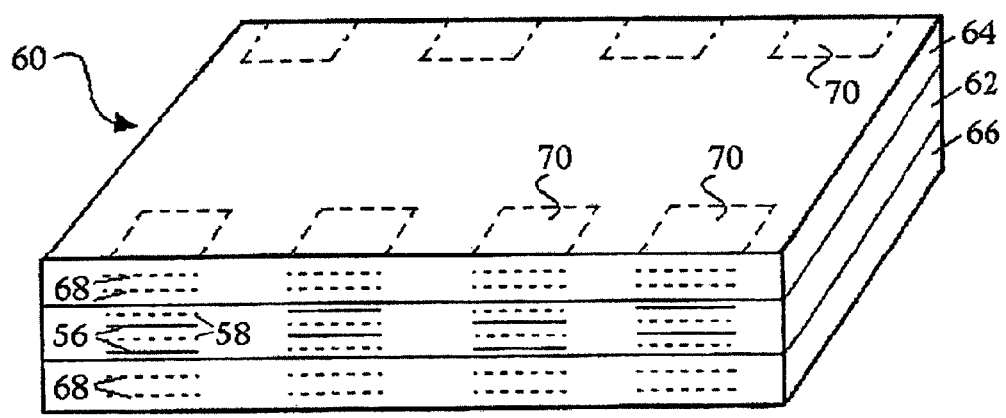
FIG. 2B illustrates a generally side perspective view of an exemplary multilayer interdigitated capacitor in accordance with the present subject matter with internal electrode and anchor tab portions such as illustrated in FIG. 2A.

With reference to FIG. 2B, multilayer component 60 corresponds to an exemplary multilayer capacitor embodiment in accordance with the present subject matter. Portion 62 of multilayer component 60 preferably comprises the exemplary interdigitated electrode layer and anchor tab configuration of FIG. 2A embedded within a portion of dielectric material. Solid lines 56 along the periphery of portion 62 are intended to represent exposed portions of the electrode tabs 56 of FIG. 2A, and dashed lines 58 along the periphery of portion 62 represent exposed anchor tabs 58. Additional anchor tabs (not illustrated in FIG. 2A) may be embedded within dielectric cover layers 64 and 66 (exposed portions of which are represented by dashed lines 68) to further provide an arrangement of exposed metallization for facilitating the formation of self-determining plated terminations in accordance with the present subject matter. Internal anchor tabs are preferably aligned in a generally similar column as a stack of internal electrode tabs such that all internal tabs are arranged in common stacks. It was previously mentioned that the distance between adjacent electrode tabs in a column of tabs should preferably be no greater than about ten microns to ensure proper plating. It should be appreciated that this distance should generally reflect the distance between exposed conductive portions including exposed electrode tabs and anchor tabs, when such structures are utilized. Although it may be recommended that some exemplary embodiments of the present technology have a distance between adjacent exposed conductive portions in a given column of no greater than about ten microns, such distance may be less than about eight microns in some embodiments.

For some component applications, it may be preferred that terminations not only extend along the entire width of a component, but also wrap around to the top and/or bottom layers. In this case, external anchor tabs, or lands, 70 may be positioned on top and bottom layers of multilayer IDC 60 such that plated terminations can form along the sides and on portions of the top and bottom layers, forming extended solder lands. For example, the provision of embedded internal anchor tabs 58 and 68 and external anchor tabs 70 along with existing exposed electrode tabs 56 in IDC 60, such as depicted in FIG. 2B, would facilitate the formation of wrap-around plated terminations 72, such as in FIG. 8A.

Figure 19A:
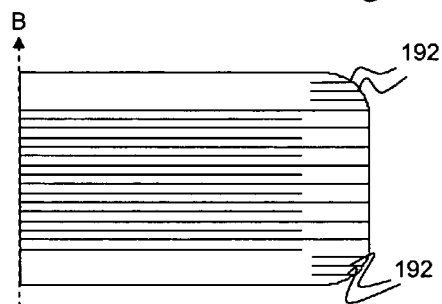
FIG. 19A illustrates an exemplary cross-section of the multilayer capacitor of FIG. 18 taken along lines B-B and C-C, specifically depicting the use of internal anchor tabs in the cover layers only of a multilayer capacitor.

Additional insight into the selective use of anchor tabs in accordance with the presently disclosed technology is depicted in FIGS. 18 and 19A-19D, respectively. FIGS. 19A, 19B, 19C and 19D each illustrate respective exemplary cross-sections of the multilayer capacitor illustrated in FIG. 18 when taken along the planes represented by lines B and C. FIG. 19A illustrates an exemplary multilayer device where anchor tabs 192 are embedded in the cover layers such that terminations can be formed that extend along the entire height of a device. It is advantageous in certain embodiments to extend the termination to the top and/or bottom surface of the device such that when the device is subjected to process(es) for creating generally rounded edges, land-less terminations can be applied that still facilitate effective solder wetting to a printed circuit board or other mounting substrate. In some exemplary embodiments, anchor tabs 192 may be embedded at distances within two mils (more specifically, within about 1.0-1.5 mils) from top and/or bottom device surfaces. In still further embodiments, multilayer devices may have relatively thin cover layers (e.g., less than about two mils), which serves to lower the equivalent series inductance (ESL) of a device.

Figure 19B:
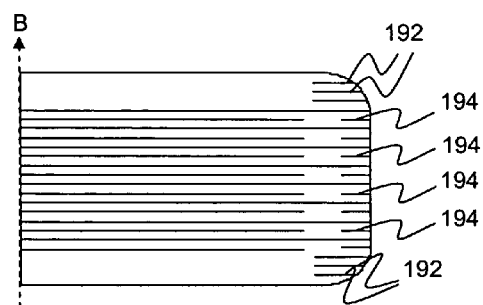
FIG. 19B illustrates an exemplary cross-section of the multilayer capacitor of FIG. 18 taken along lines B-B and C-C, specifically depicting the use of internal anchor tabs in both the cover layers and active layers of a multilayer capacitor.
Figure 19C:
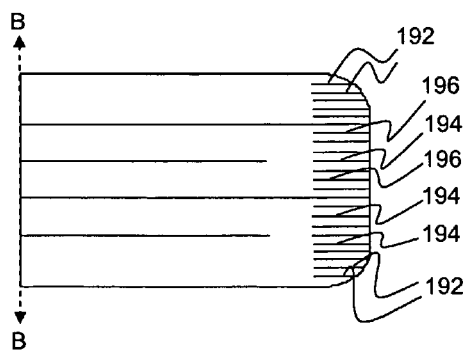
FIG. 19C illustrates an exemplary cross-section of the multilayer capacitor of FIG. 18 taken along lines B-B and C-C, specifically depicting the use of internal anchor tabs in the cover layers and active layers of a multilayer capacitor having reduced number of active layers and corresponding capacitance.

Referring now to FIG. 19B, it may be desirable in some embodiments of the present subject matter to provide internal anchor tabs in the active layers (depicted as anchor tabs 194) as well as the cover layers (depicted as anchor tabs 192). In such case, anchor tabs 194, designed as additional nucleation points for a termination of one polarity, may be printed in the same plane as the electrode layers of the opposite polarity. In still further embodiments, anchor tabs may also be used in between active layers when there is greater spacing between such layers, such as in generally lower capacitance or higher voltage rated devices. Such internal anchor tabs between active layers in FIG. 19C are depicted as anchor tabs 196. Since it is possible to provide anchor tabs anywhere desirable within an electronic device to provide nucleation points along a device periphery, overall device size or capacitance should not limit the use and application of plated terminations in accordance with the presently disclosed technology.

Figure 19D:
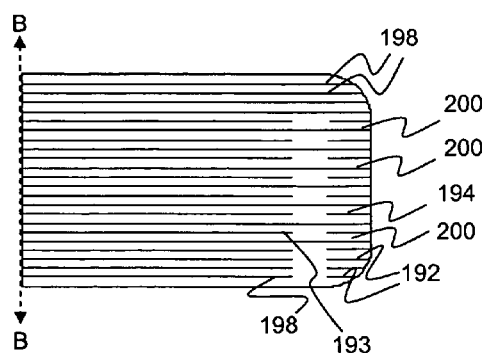
FIG. 19D illustrates an exemplary cross-section of the multilayer capacitor of FIG. 28 taken along lines B-B and C-C, specifically depicting the use of common electrode layers in the cover layers of a multilayer capacitor.

Another option for extending nucleation points into the cover layers of a multilayer capacitor is represented in FIG. 19D. Instead of utilizing only anchor tabs 192 in the cover layers, common electrode layers 198 may be provided in the cover layers with or without additional anchor tabs 192. In such embodiment, the active electrode layers 200 of the device comprise multiple pairs of opposing first and second electrode layers. One of the cover layers may then include common electrode layers formed in the same or similar fashion as the first electrode layer 200, while the other cover layer includes common electrode layers similar to the second electrode layers 193. Each layer could include anchor tabs as illustrated in FIG. 19D but anchor tabs may not be required in embodiments where the spacing between electrode layers is sufficiently small. An advantage to using common electrode layers in the cover layers as opposed to only anchor tabs may be realized by the common electrode layers providing additional mechanical support and uniformity in the cover layers.

There are several different techniques that can potentially be used to form plated terminations, such as terminations 72 on multilayer component embodiment 74 of FIG. 8A. As previously addressed, a first method corresponds to electroplating or electrochemical deposition, wherein an electronic component with exposed conductive portions is exposed to a plating solution such as electrolytic nickel or electrolytic tin characterized by an electrical bias. The component itself is then biased to a polarity opposite that of the plating solution, and conductive elements in the plating solution are attracted to the exposed metallization of the component.

In accordance with a more particular exemplary method of electroplating a thin-film metal to form termination structures or other plated structures on the periphery of electronic components, an initial cleaning step may be implemented before the electroplating step. Such a cleaning step is employed to remove any oxide buildup that forms on the exposed portions of internal electrodes or anchor tabs. This cleaning step may be particularly helpful to assist in removing any buildup of nickel oxide when the internal electrodes and/or anchor tabs or other conductive elements are formed of nickel. Component cleaning may be effected by full immersion of electronic component(s) in a preclean bath, such as one including an acid cleaner with no media. In one exemplary embodiment, components are exposed to such a preclean bath for a predetermined time, such as on the order of about 10 minutes. Component cleaning may alternatively be effected by chemical polishing or harperizing steps as later described in more detail. It should be appreciated that the cleaning step and other subsequent plating steps described herein can occur as a bulk process, such as a barrel plating, fluidized bed plating and/or flow-through plating termination processes, all of which are generally known to one of ordinary skill in the art. Such bulk processes enable multiple components to be processed at once, providing an efficient and expeditious termination process. This is a particular advantage relative to conventional termination methods, such as the printing of thick-film terminations, that require individual component processing.

With further reference to an exemplary electroplating method, the above cleaning step may be followed by the direct electroplating process. As briefly described above, one or more electronic components with exposed conductive portions is fully immersed in a plating solution characterized by an electrical bias. The component itself is then biased to a polarity opposite that of the plating solution, and conductive elements in the plating solution are attracted to the exposed metallization of the component. When the exposed portions of internal conductive elements are arranged in groups, termination structures are developed by controlled bridging of the plating material among each respective group of exposed conductive portions. In one exemplary embodiment, an electrolytic plating solution such as a copper (Cu) acid bath, or other suitable copper bath solution, with organic additives and media is utilized for direct electroplating of thin-film Cu to the periphery of one or more electronic components. In another exemplary embodiment, a Nickel Sulfamate bath solution, or other nickel bath solution, is used for direct electroplating of thin-film nickel (Ni) to respective component peripheries. Nickel Sulfamate baths may be provided with appropriate media. Preselected pH levels for such bath solutions may be controlled in a fixed process window or by other means known to those of ordinary skill in the art. These electrolytic plating solutions are subjected typically to a high current density range, for example, ten to fifteen amp/ft$^2$ (rated at 9.4 volts). In one particular exemplary embodiment, a plurality of electronic components are barrel plated in a 2.5×4 inch barrel at 16 rpm for about 60 minutes.

With still further reference to an exemplary electroplating method, an additional annealing step as previously described may also be optionally employed. In some embodiments when copper is directly electroplated, such annealing step may not be necessary thus eliminating process cost. Process cost may also be reduced when nickel is directly electroplated, eliminating an initial copper layer utilized in some multilayer termination structures.

A second plating technique involves full immersion of electronic components in a plating solution with no polar biasing. Such technique is referred to as electroless plating, and can be employed in conjunction with electroless plating solutions such as nickel or copper ionic solution. In accordance with electroless plating techniques, also referred to in some applications as immersion plating, preliminary steps may sometimes be utilized before immersing an electronic component in a given electroless plating solution. Such treatments may serve to catalyse, accelerate or improve the adhesion of the subsequent plating step(s). After an electronic component is formed with exposed metallic electrode and/or anchor tab portions, a chemical polishing step may be effected to aid exposure of the metallic portions. For example, when electrode and/or anchor tab portions are made of Nickel, chemical polishing can help to chemically remove any buildup of Nickel Oxide (NiO) on the periphery of the yet unterminated component.

A still further example of a preliminary step that may be utilized in accordance with presently disclosed electroless plating techniques is a step to activate the exposed metallic portions of the device to facilitate depositing of the electrolessly plated materials. Activation can be achieved by immersion of the electronic component in Palladium salts, photo patterned Palladium organometallic precursors (via mask or laser), screen printed or ink-jet deposited Palladium compounds or electrophoretic Palladium deposition. It should be appreciated that Palladium-based activation is presently disclosed merely as an example of activation solutions that often work well with activation for exposed electrode and/or tab portions formed of Nickel or Nickel-based alloys. In other embodiments, alternative activation solutions may be utilized. In still further embodiments, a Palladium (Pd) dopant may be introduced into the Nickel ink that forms the capacitor electrodes and/or anchor tabs to eliminate the Pd activation step for electroless Cu deposition. It should be further appreciated that some of the above activation methods, such as organometallic precursors, also lend themselves to co-deposition of glass formers for increased adhesion to the generally ceramic body of an electronic component. When activation steps are taken as described above, traces of the activator material (represented by portions 202 in FIG. 26A) often remain at the exposed conductive portions before and after termination plating.

In accordance with electrolytic plating (electrochemical deposition) and electroless plating techniques, a component such as IDC 74 of FIG. 8A, is preferably submersed in an appropriate plating solution for a particular amount of time. With certain embodiments of the present subject matter, no longer than fifteen minutes is required for enough plating material to deposit at exposed conductive locations along a component such that buildup is enough to spread the plating material in a perpendicular direction to the exposed conductive locations and create a bridged connection among selected adjacent exposed conductive portions. In some embodiments of the present technology, completely bridged terminations may not be formed when plating an initial material, but only after subsequent plating steps. For example, referring to FIG. 25, a first plating step may result in the formation of unconnected "bump"-like portions 204 of plating material. A completely bridged termination is then achieved upon plating a second portion 206 of material over the initial unconnected portions 204. It should be further noted with respect to FIG. 25 that the initial build-up of electroless plating portions 204 underneath final plated layer 206 may result in a generally "wavy" appearance at the termination periphery. This visual aspect may be evident even when initial plated portions 204 are formed in a connected bridge, and with or without the provision of subsequent plated layers.

Another technique that may be utilized in accordance with the formation of the subject plated terminations involves magnetic attraction of plating material. For instance, nickel particles suspended in a bath solution can be attracted to similarly conductive exposed electrode tabs and anchor tabs of a multilayer component by taking advantage of the magnetic properties of nickel. Other materials with similar magnetic properties may be employed in the formation of plated terminations, or other materials can be coated over the magnetic cores.

A still further technique regarding the application of plated termination material to exposed electrode tabs and/or anchor tabs of a multilayer component involves the principles of electrophoretics or electrostatics. In accordance with such exemplary technology, a bath solution contains electrostatically charged particles. An IDC or other multilayer component with exposed conductive portions may then be biased with an opposite charge and subjected to the bath solution such that the charged particles are deposited at select locations on the component. This technique is particularly useful in the application of glass and other semiconductive or non-conductive materials. Once such materials are deposited, it is possible to thereafter convert the deposited materials to conductive materials by intermediate application of sufficient heat to the component.

A related advantage of most of the methods disclosed herein for forming plated terminations is that multiple electronic components can be terminated in a bulk process, such as a barrel plating, fluidized bed plating and/or flow-through plating termination processes, all of which are generally known to one of ordinary skill in the art. Such aspect facilitates more convenient and expedient component termination since device manufacture no longer requires the selective application of terminations via precisely configured termination machines.

It should also be appreciated that as these electronic parts get ever smaller, the practical matter of being able to physically hold them while applying the thick film termination to each end becomes less practicable.

Further, this thin film approach provides less dimensional variability, permitting easier automatic handling.

One particular methodology for forming plated terminations in accordance with the disclosed technology relates to a combination of the above-referenced plating application techniques. A multilayer component may first be submersed in an electroless plating solution, such as copper ionic solution, to deposit an initial layer of copper over exposed tab portions, and provide a larger contact area. The plating technique may then be switched to an electrochemical plating system which allows for a faster buildup of copper on the selected portions of such component.

In still further exemplary methods, the initial component submersion in an electroless plating solution may effect the formation of initial unconnected portions 204 such as illustrated in FIG. 25. Electrochemical plating or electrolytic plating may then be employed to form a subsequent bridged portion 206 of termination material. When the initial portions 204 are formed of Copper, the bridged portion 206 may correspond to additional buildup of Copper in some exemplary embodiments or to electroplated deposition of a different material, such as nickel (Ni), gold (Au), silver (Ag), nickel-phosphorus (NiP), or other suitable alloys in other exemplary embodiments.

In accordance with the different available techniques for plating material to exposed conductive elements of a multilayer component in accordance with the present technology, different types of materials may be used to create the plated terminations and form electrical connections to internal features of an electrical component. For instance, metallic conductors such as nickel, copper, tin, etc. may be utilized as well as suitable resistive conductors or semi-conductive materials, and/or combinations of selected of these different types of materials.

A particular example of plated terminations in accordance with the present subject matter wherein plated terminations comprise a plurality of different materials is discussed with reference to FIG. 8B. FIG. 8B provides a cross-sectional view of component 74 of FIG. 8A taken along planar section line A-A in accordance with a particular exemplary embodiment of plated terminations 72. It should be appreciated that terminations 72 may comprise only a first plating layer and no additional layers as presented in this example. Due to such potential for variation in the number of plating layers in the multilayer component and termination embodiments of FIGS. 8A and 8B, the two respective embodiments are labeled as 74 and 74' respectively, and such reference is not intended to insinuate additional variations between the two respective embodiments.

A first step in the formation of the terminations illustrated in FIG. 8B involves submersing a component in an electrolytic or electroless plating solution such that a layer of copper 76 or other metal is deposited along the periphery of component 74' where portions of internal anchor tabs 58 and 68, exposed internal electrode tabs extending from electrode layers 52 and 54, and external anchor tabs 70 are exposed. The tab area covered with metallic plating 76 and entire surface of component 74' can then be covered with a resistor-polymeric material 78 for sealing. The tab area can then be polished to selectively remove resistive polymeric material and then plated again with metallic copper or other material 80. In other exemplary embodiments, termination layer 78 may correspond to a solder barrier layer, for example a Ni-solder barrier layer. In some embodiments, layer 78 may be formed by electroplating an additional layer of nickel on top of an initial electrolessly or electrolytically plated layer 76 (e.g., plated copper). Other exemplary materials for layer 78 include nickel-phosphorus, gold, and silver. A third exemplary termination layer 80 may in some embodiments correspond to a conductive layer, such as plated Ni, Ni/Cr, Ag, Pd, Sn, Pb/Sn or other suitable plated solder.

A still further plating alternative corresponds to forming a layer of metallic plating, and then electroplating a resistive alloy or a higher resistance metal alloy coating, for example, electroless Ni—P alloy over such metallic plating. In accordance with present subject matter, it is presently possible to include any metal coating except the first coating as electroless or electrolytic plating, as those of ordinary skill in the art will understand from the complete disclosure herewith. Yet another embodiment includes an initial electrolytically plated layer of thin-film nickel, followed by plated layers of tin (Sn) or gold (Au). In some embodiments, a copper (Cu) layer may first be electrolytically plated before the nickel layer. Selection of plating materials for forming termination structures in accordance with aspects of the present subject matter may be determined in part by whether the electronic components will be soldered or wirebonded in their respective circuit applications.

Plating layers can be provided alone or in combination to provide a variety of different plated termination configurations. A fundamental of such plated terminations is that the self-determining plating is configured by the design and positioning of exposed conductive portions along the periphery of a component. It should be appreciated that the aforementioned plated terminations having multiple layers are not limited to utilization with the embodiments illustrated in FIGS. 8A and 8B, and may be practiced in accordance with all illustrated, disclosed and otherwise obvious electronic component variations.

Such particular orientation of internal electrode portions and anchor tabs may be provided in a variety of different configurations to facilitate the formation of plated terminations in accordance with the present subject matter. For instance, consider the exemplary internal conductive configuration of FIG. 3B with electrode layers 26 and 28. Electrode tabs 30 and internal anchor tabs 82 may be provided in a body of dielectric material to create a multilayer component similar to that of FIG. 4A. Additional internal anchor tabs 84 and external anchor tabs 86 may also be provided. One of the prescribed plating techniques may then be utilized to form plated terminations on multilayer component 88 along the exposed areas of metallization.

Yet another exemplary multilayer component in accordance with aspects of the present subject matter is represented as component 90 in FIG. 4B. Internal electrode layers are provided with electrode tabs that extend to four sides of component 90. Additional internal anchor tabs 94 may be interleaved with exposed electrode tabs 92. Still further internal anchor tabs 96 may be embedded within cover layers of component 90 to provide for expanded plated terminations.

The provision of external anchor tabs 98 could facilitate the formation of wrap-around plated terminations to top and/or bottom sides of the component. Such external anchor tabs 98 may be printed directly into the ceramic plate or tape forming the topmost substrate layer to form an "embedded" layer that is completely flush with the topmost substrate layer. By embedding such portions of the electronic component, terminations may be less susceptible to partial breakage or inadvertent removal and a more aesthetically designed overall component may also be effected.

Examples of different peripheral termination shapes, such as effected by selective arrangement of external anchor tabs, are now presented with reference to FIGS. 10A, 10B, 11A, 11B, 12A and 12B. Referring more particularly to FIG. 10A, a multilayer electronic component 150 has multiple pairs of opposing electrodes embodied by respective first electrodes 152 and respective second electrodes 154. Each electrode layer is formed on a respective ceramic layer, on which at least one anchor tab 156 may also be provided. Additional anchor tabs 158 may also be provided in dielectric cover layers without electrode elements, such that exposed conductive regions are provided along the general entirety of either side of multilayer component 150. By providing the exposed conductive anchor tabs 158 into the cover layers and approaching selected respective corners 157 of the component 150, the formation of generally "I-shaped" terminations 159a and 159b, such as depicted in FIG. 10B is facilitated. Such "I-shaped" terminations provide a land-less termination that still enables good solder wetting to a printed circuit board or other mounting surface, since the terminations preferably extend completely to the top and/or bottom surfaces of component 150.

Referring now to FIGS. 11A and 11B, a multilayer electronic component 160 has multiple pairs of opposing electrodes embodied by respective first electrodes 162 and respective second electrodes 164. Each electrode layer is formed on a respective ceramic layer, on which at least one anchor tab 166 may also be provided. Additional anchor tabs 168 may also be provided in dielectric cover layers without electrode elements, such that exposed conductive regions are provided along the general entirety of either side of multilayer component 160. External anchor tabs 165 are also preferably provided on a selected one of the top and bottom sides of component 160 such that resultant "J-shaped" terminations 169a and 169b are formed in accordance with the subject plating technology. Such "J-shaped" terminations provide lands for mounting the electronic component to a printed circuit board or other mounting surface, and since the lands are only on a selected side of component 108, a predetermined component mounting orientation is provided.

The absence of conductive portions on the top surface is sometimes desirable, for example, when the surface may come in contact with a heat sink or RF shield, which could cause a short circuit.

It should be appreciated in accordance with the above description of FIGS. 11A and 11B, that shorthand characterization of terminations 169a and 169b as generally "J-shaped" should be considered from a generally broad descriptive perspective, and should not be considered limiting to embodiments of the present technology. For example, a "J-shaped" termination can be interpreted in different embodiments to describe terminations formed as either an upper-case "J" or a lower-case "j". A "J"-shaped termination when considered in a lower case "j" embodiment may be regarded as similar to a reversed perspective of an "L" shaped structure, each including two generally perpendicular extended portions. When provided as a termination in the context of certain embodiments of the present subject matter, such a termination may extend along a given peripheral surface while wrapping around to one selected surface adjacent to the given peripheral surface. An upper case "J"-shaped termination may be similar to a lower case "j"-shaped termination in that it includes two generally perpendicular portions, but may further include a portion corresponding to the small crossbar at the top of an upper case "J". When provided as a termination in the context of certain embodiments of the present subject matter, such a termination may have a main portion extending along a given peripheral surface while including lands wrapping around to opposing surfaces adjacent to the given peripheral surface, with one land generally longer than the other land. The longer land may be representative of the bottom base portion of a capital "J", while the shorter land may be representative of the upper crossbar portion.

Referring now to FIGS. 12A and 12B, a multilayer electronic component 170 has multiple pairs of opposing electrodes embodied by respective first electrodes 172 and respective second electrodes 174. Each electrode layer is formed on a respective ceramic layer, on which at least one anchor tab 176 may also be provided. Additional anchor tabs 178 may also be provided in dielectric cover layers without electrode elements, such that exposed conductive regions are provided along the general entirety of either side of multilayer component 170. External anchor tabs 175 are also preferably provided on both top and bottom sides of component 170 such that resultant "U-shaped" terminations 179a and 179b are formed in accordance with the subject plating technology. Such "U-shaped" terminations provide lands for mounting either side of electronic component 170 to a printed circuit board or other mounting surface.

With regard to FIGS. 10B, 11B and 12B, it should be appreciated that the respective terminations 159a, 159b, 169a, 169b, 179a and 179b may be selectively formed as single layer terminations or as multilayer terminations. For example, each peripheral termination in FIGS. 10B, 11B and 12B may correspond to a single layer of plated copper or nickel. The use of copper only has been found to be useful, for example, where an MLC is buried inside a printed wire board (PWB) or other mounting structure. Alternatively, such terminations may be formed to have an initial layer of plated copper followed by respective plated solder barrier and solder layers, for example nickel and then tin. In accordance with multilayered terminations, selected of the layers could be formed of a resistive or a semiconductive material.

Figure 15A:
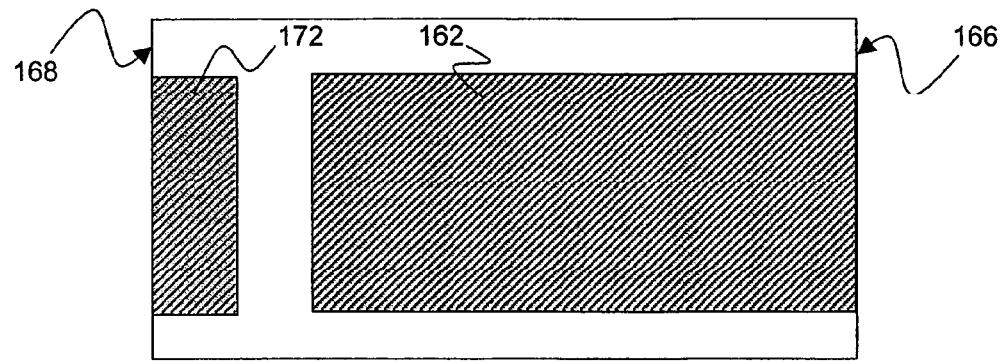
FIGS. 15A and 15B respectively illustrate generally top views of an exemplary rectangular electrode layer configuration in accordance with the present subject matter for use in multilayer capacitor embodiments.
Figure 15B:
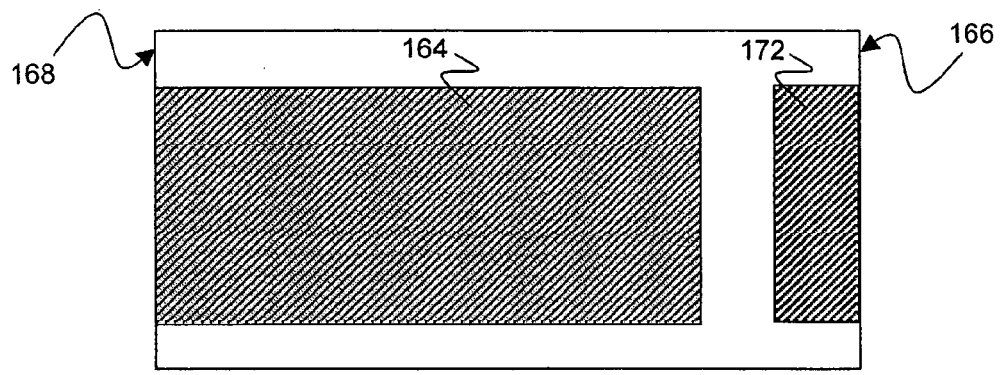
Figure 15C:
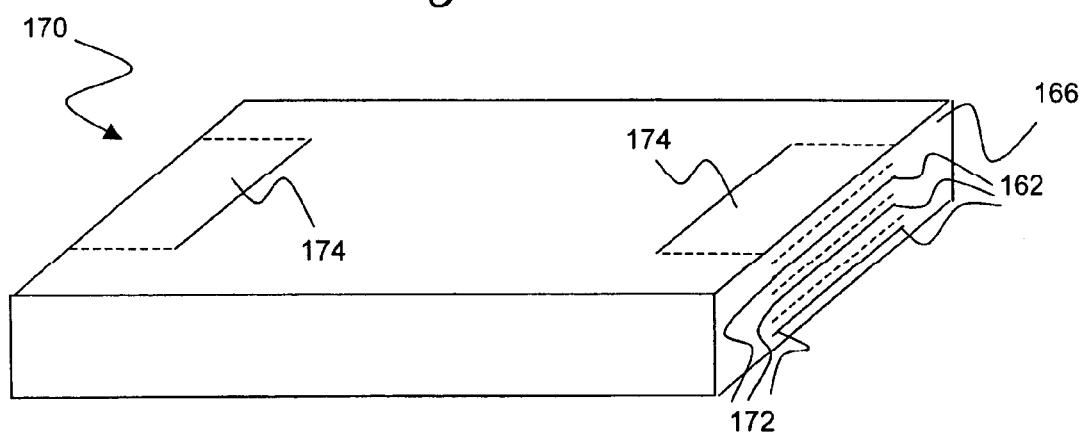
FIG. 15C illustrates a generally side perspective view of an exemplary multilayer capacitor embodiment in accordance with the present subject matter with rectangular electrode layer configurations such as those illustrated in FIGS. 15A and 15B.

A still further application of the presently disclosed technology relates to more general multilayer component configurations, such as depicted in FIGS. 15A, 15B and 15C. Electrode layer 162 of FIG. 15A and electrode layer 164 of FIG. 15B are provided in respective generally rectangular configurations such that when interleaved with dielectric layers to form a multilayer device such as depicted in FIG. 15C, such electrodes 162 and 164 extend to alternating ends 166 and 168 of the multilayer device 170. Anchor tab portions 172 may also be provided within the respective electrode layer planes to increase the density of exposed conductive portions along the ends 166 and 168 of device 170 and to facilitate the formation of plated terminations thereto. External anchor tabs, or lands, 174 may also be provided on top and/or bottom surfaces of device 170 and in alignment with the exposed internal electrode and anchor tab portions to facilitate selected formation of wrap-around terminations to one or more top/bottom surfaces. After subjecting the device 170 to one or more of the plating techniques described herein, the formation of plated terminations in accordance with the present subject matter may be effected. It should be appreciated that additional embodiments of the present subject matter may incorporate similar electrode configurations as illustrated in FIGS. 15A and 15B, where electrode plates 162 and 164 are generally square-shaped instead of rectangular.

Figure 6A:
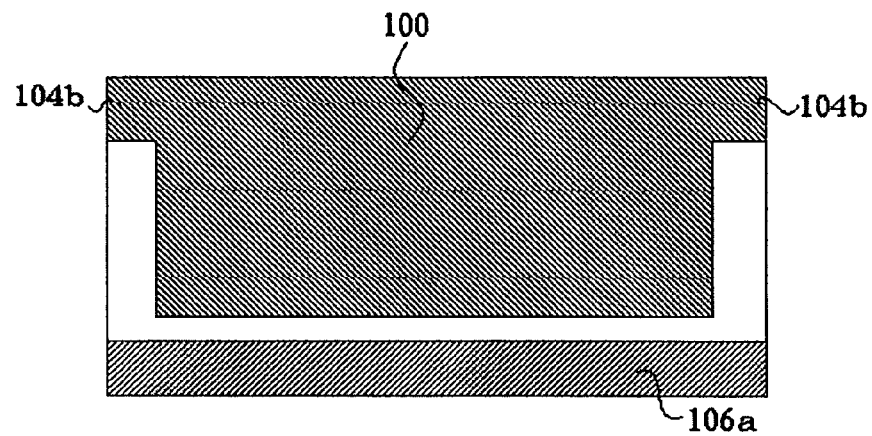
FIGS. 6A and 6B respectively illustrate generally top views of an exemplary "T-shaped" electrode layer configuration in accordance with the present subject matter for use in multilayer capacitor embodiments with corner terminations.
Figure 6B:
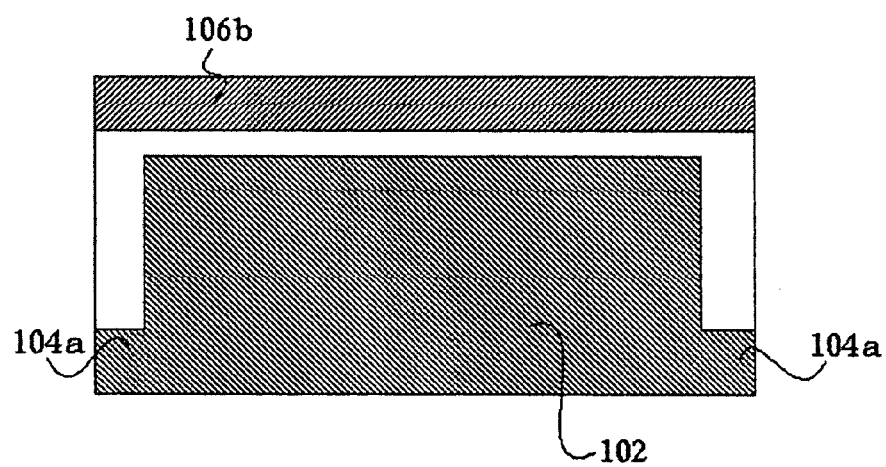
Figure 6C:
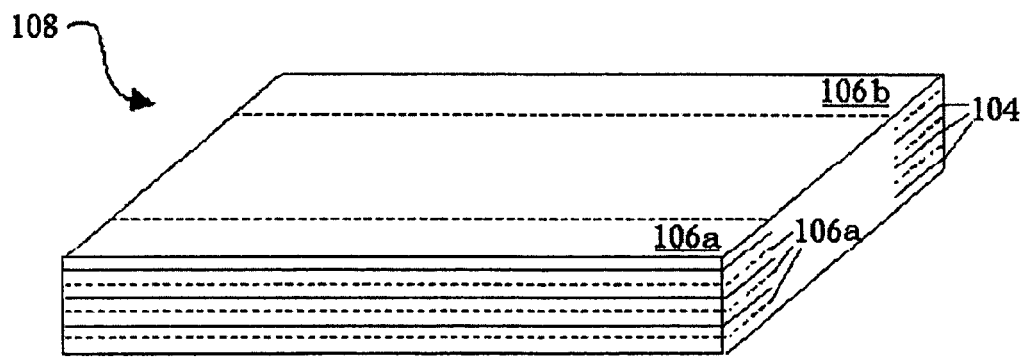
FIG. 6C illustrates a generally side perspective view of an exemplary multilayer capacitor embodiment in accordance with the present subject matter with electrode layer configurations such as those illustrated in FIGS. 6A and 6B.

Yet another exemplary multilayer configuration for use in accordance with embodiments of the present subject matter is illustrated in FIGS. 6A, 6B, 6C, 6D, 6E, 6F and 6G. Electrode layer 100 of FIG. 6A and electrode layer 102 of FIG. 6B are provided in respective T-shaped configurations such that electrode tab portions 104b extend from electrode layer 100 and electrode tab portions 104a extend from electrode layer 102. When electrode layers 100 and 102 are interleaved with dielectric layers to form a multilayer electronic device, such as shown in FIG. 6C, each electrode tab portion 104a and 104b is exposed on two adjacent sides of the device 108. More particularly, the base portion defined between respective tabs 104b and the base portion defined between respective tabs 104a are both exposed along an entire side of device 108 as well as to portions of two respective surfaces adjacent to the given side surface. Anchor tab portions 106a and 106b may also be provided within the electrode layer planes such that exposed conductive portions are aligned along the opposing peripheral sides of device 108, to facilitate formation of the external plated electrodes thereon. After subjecting device 108 to one of the plating techniques described herein, the formation of corner terminations would be effected. It should be appreciated that provision of such terminations around selected corners of a multilayer electronic component was often difficult to achieve with prior art termination processes. It should be further appreciated by one of ordinary skill in the art that corner-terminated designs can be achieved not only in device 108, but in many other specifically configured devices, and it should further be appreciated that, analogous to the anchor tab discussion above, the corner wrap can be provided on only one corner, when that is desirable, as when an orientation feature may be needed.

Figure 6D:
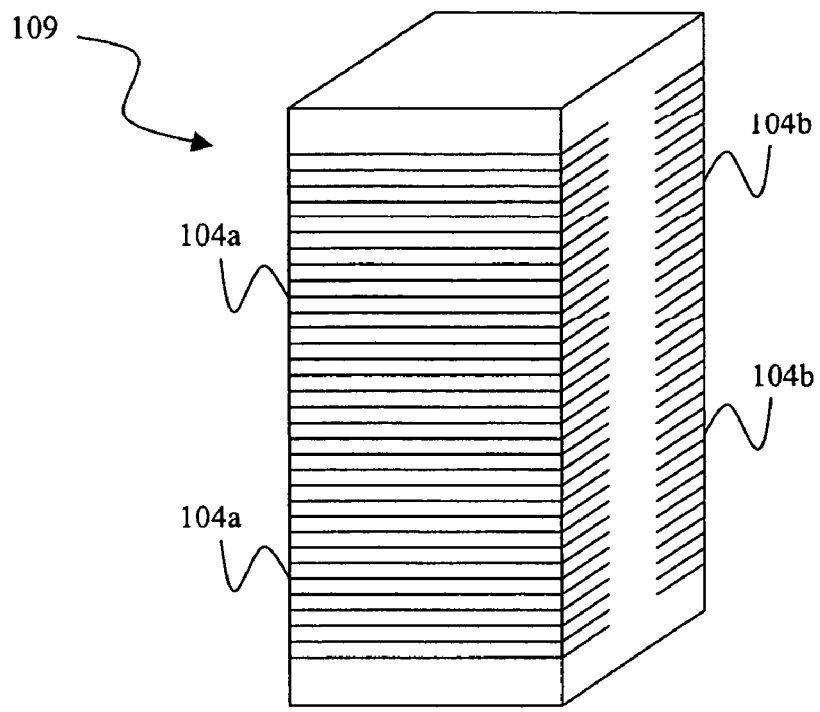
FIGS. 6D and 6F illustrate alternative embodiments of an exemplary multilayer capacitor embodiment similar to FIG. 6C and having electrode layer configurations such as those illustrated in FIGS. 6A and 6B.
Figure 6E:
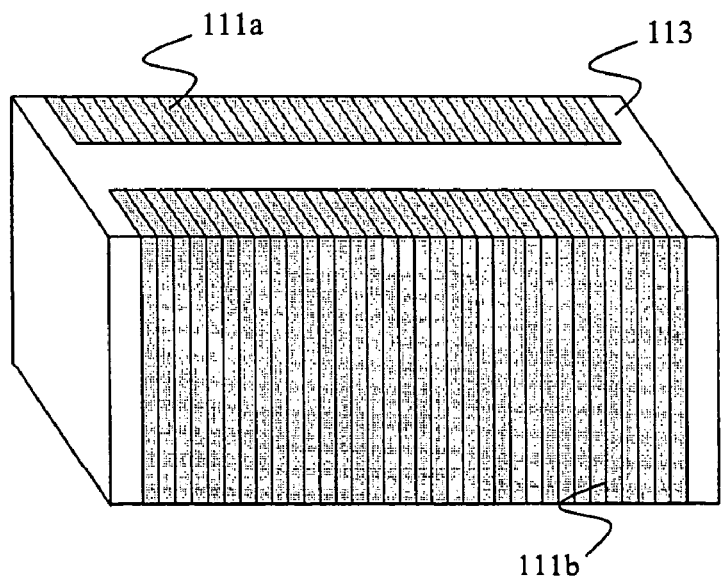
FIG. 6E illustrates the embodiment of FIG. 6D with plated terminations applied in accordance with the present subject matter and further depicted in an exemplary orientation for mounting the embodiment to a substrate.

A further advantage of the exemplary configuration illustrated in FIG. 6C may be realized when many more dielectric and electrode layers are stacked to form an assembly 109 as depicted in FIG. 6D. Similar to FIG. 6C, a plurality of first electrodes 104a (and optionally including additional anchor portions 106a) are exposed in a column along one side of the device 109 while a plurality of second electrodes 104b (and optionally additional anchor portions 106b) are exposed along the side of device 109 opposing the side at which first electrodes 104a are exposed. Each electrode portion 104a and 104b (and any corresponding optional anchor portions 106a and/or 106b) may actually be exposed along an entire side of device 109 and onto two adjacent side surfaces. This unique stacked assembly 109 may then be terminated in accordance with the disclosed plating technology to form two terminations 111a and 111b as illustrated in FIG. 6E. The assembly 109 depicted in FIG. 6D is flipped to its side as depicted in FIG. 6E to be configured for mounting to a substrate. The unique corner terminations 111a and 111b effected in such assembly enable both side surface 113 and the surface opposing side surface 113 to be equally capable of mounting to a surface, thus providing component orientation and mounting versatility.

Figure 6F:
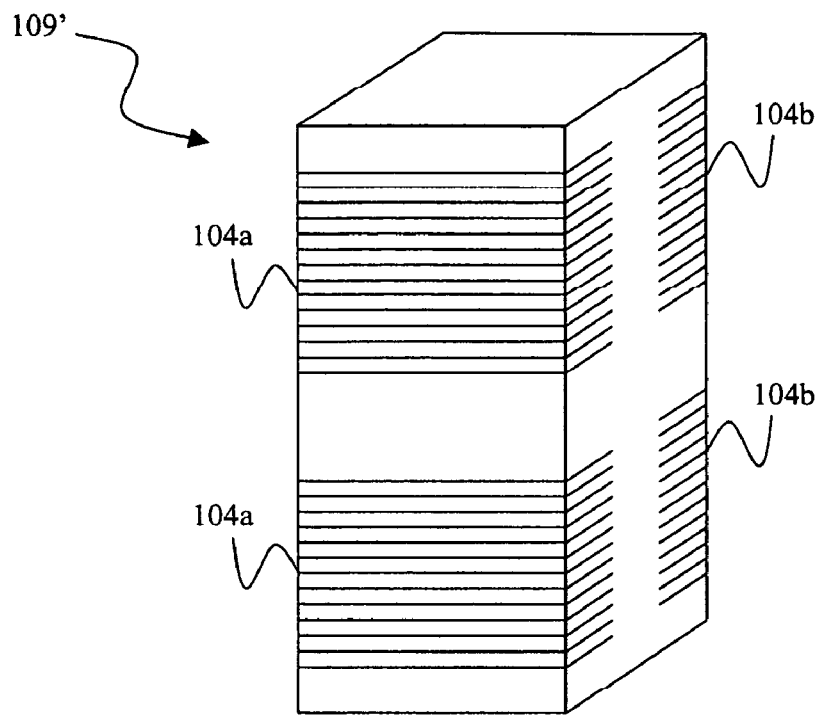
Figure 6G:
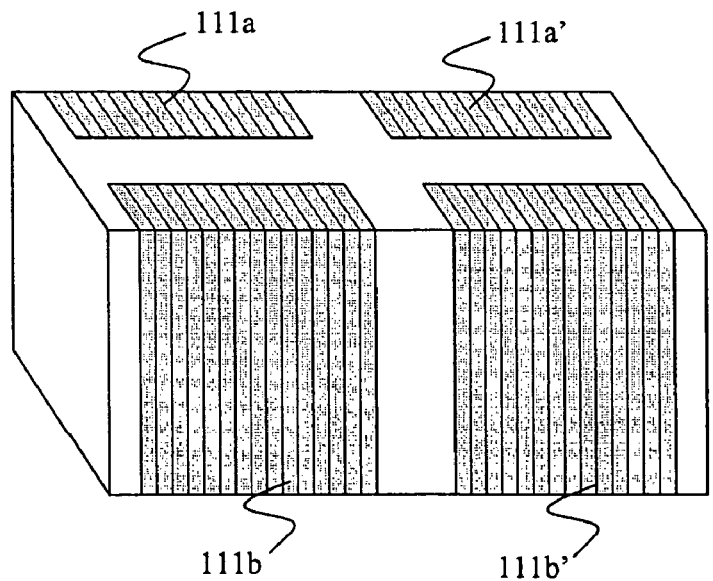
FIG. 6G illustrates the embodiment of FIG. 6F with plated terminations applied in accordance with the present subject matter and further depicted in an exemplary orientation for mounting the embodiment to a substrate.

Referring now to FIGS. 6F and 6G, it should be appreciated that the exemplary electrodes and corner terminations illustrated and discussed with reference to FIGS. 6A-6E are not limited to one termination 111a of a first polarity and one termination 111b of a second polarity. As illustrated in FIG. 6F, such electrodes 104a and 104b may be selectively interleaved with dielectric layers (with or without additional anchor tab portions 106a and 106b) to form distinct columns of exposed conductive portions. In accordance with the "self-determining" plating technology of the present subject matter, such distinct exposed areas may result in the formation of multiple first terminations 111a and 111a' and multiple second terminations 111b and 111b'. It should be appreciated that many more than two or four terminations per assembly (as illustrated herein) may be effected.

Figure 16A:
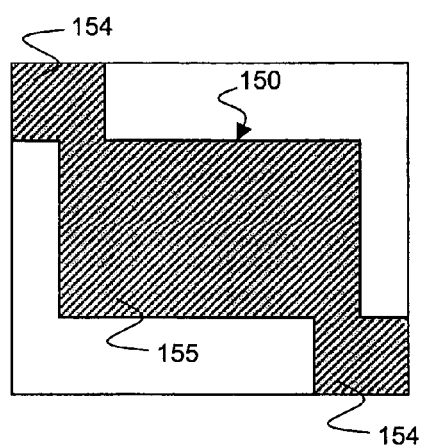
FIGS. 16A and 16B respectively illustrate generally top views of an exemplary electrode layer configuration for effecting opposing corner terminations for use in multilayer capacitor embodiments in accordance with the present subject matter.
Figure 16B:
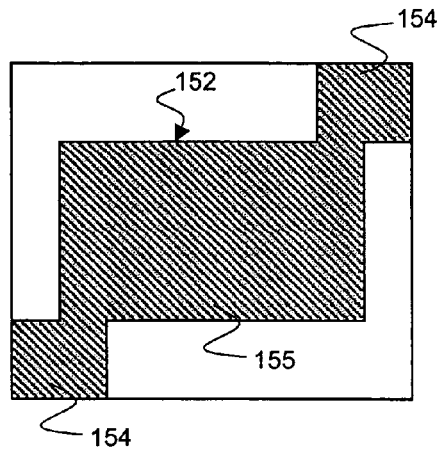
Figure 16C:
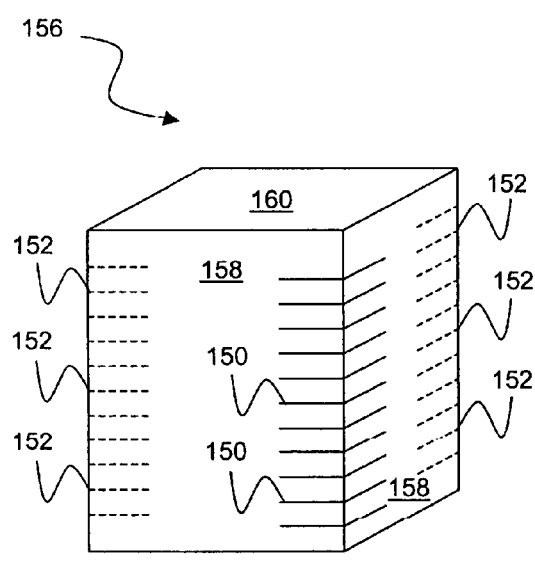
FIG. 16C illustrates a generally side perspective view of an exemplary multilayer capacitor embodiment with electrode layer configurations such as illustrated in FIGS. 16A and 16B in accordance with the present subject matter.
Figure 16D:
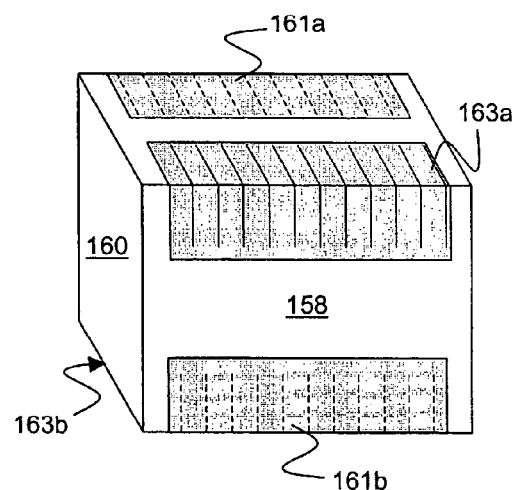
FIG. 16D illustrates a generally side perspective view of the exemplary multilayer capacitor embodiment of FIG. 16C provided with plated terminations in accordance with the present subject matter and oriented in an exemplary mounting configuration.

Yet another example of a corner-terminated multilayer electronic device is illustrated in FIGS. 16A-16D, respectively. Electrode layer 150 of FIG. 16A and electrode layer 152 of FIG. 16B are provided in respective configurations such that generally rectangular tab portions 154 are provided at opposing corners of respective generally rectangular base portions 155. When electrode layers 150 and 152 are interleaved with dielectric layers to form a multilayer device 156, such as shown in FIG. 16C, respective corner tab portions 154 of the set of electrode layers 150 (depicted in FIG. 16C by solid lines) are exposed for termination at opposite corners of the device 156 while the respective corner tab portions of the set of electrode layers 152 (depicted in FIG. 16C by dashed lines) are exposed at the other two corners. When such a device 156 of FIG. 6C is subjected to the plating technology disclosed herein, a plurality of terminations 161a, 161b, 163a and 163b are formed at the periphery of such device as illustrated in FIG. 16D. Flipping the terminated device on its side for mounting allows all electrodes to be accessed from any of the four generally larger side surfaces 158 of device 156, allowing any of such four side surfaces 158 to be mounted to a substrate. It should be appreciated that each corner termination 161a, 161b, 163a and 163b need not be one continuous termination as illustrated in FIG. 16D. Alternatively, selective arrangements of internal electrodes 150 and 152 may result in one or more columns per corner such as represented by the embodiment of FIGS. 6F and 6G.

The electrode and corresponding capacitor design of FIGS. 16A-16D allows for much greater freedom of orientation in surface mount devices, which may be of particular advantage in some exemplary embodiments of the present subject matter since reduced component size sometimes increases potential difficulty in achieving proper device orientation for testing, tape/reel and pick/place applications, and actual device mounting. These advantages may be realized for generally rectangular devices, but greater orientation insensitivity may be achieved when the cross section of device 156 (as defined by top and bottom surfaces 160) are defined by a generally square shape. As mentioned above with regard to the corner terminations of FIGS. 6A-6C, it should be appreciated that utilization of plated terminations with the exemplary embodiment of FIGS. 16A-16D provides additional advantage since provision of corner terminations with previous printing technologies was often difficult, especially in smaller components. Although not illustrated in the embodiments of FIGS. 16A-16D, it should be appreciated that the illustrated electrode configuration may be supplemented by anchor tab portions (such as generally "L"-shaped or triangular corner tabs) in the active and/or cover layers and/or serving as external lands of the device to provide additional nucleation points for forming plated terminations in accordance with the disclosed technology.

Figure 13A:
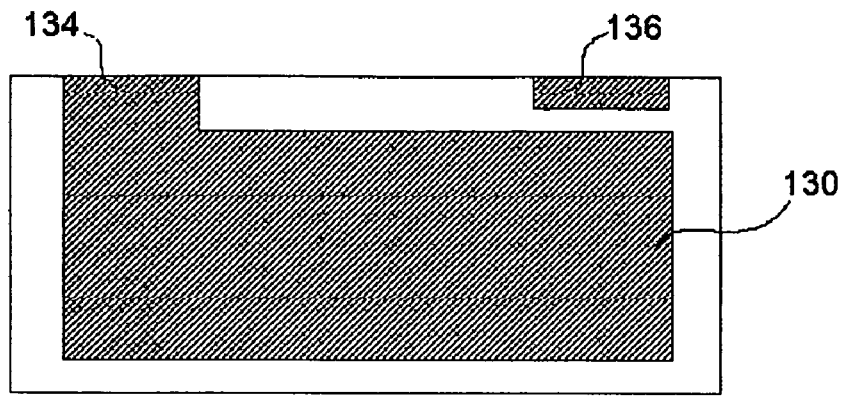
FIGS. 13A and 13B respectively illustrate generally top views of an exemplary "J-shaped" electrode layer configuration in accordance with the present subject matter for use in multilayer capacitor embodiments.
Figure 13B:
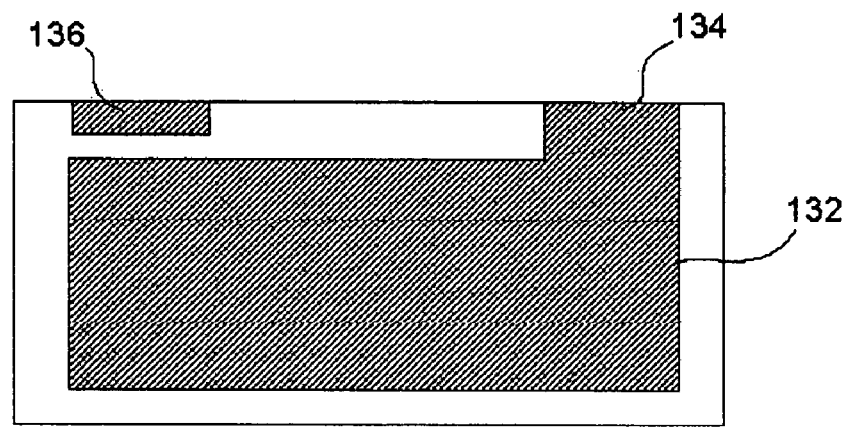
Figure 13C:
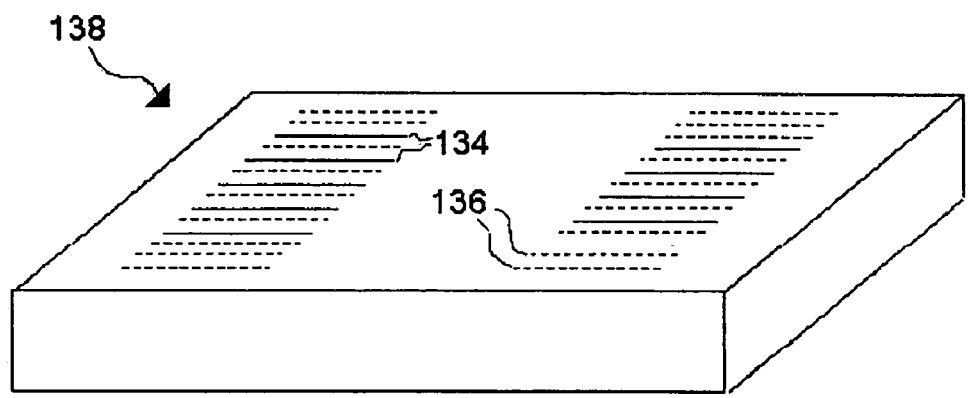
FIG. 13C illustrates a generally side perspective view of an exemplary multilayer capacitor embodiment in accordance with the present subject matter with "J-shaped" electrode layer configurations such as those illustrated in FIGS. 13A and 13B.

Yet another example of a multilayer electronic component with which the presently disclosed technology may be utilized is depicted in FIGS. 13A, 13B and 13C. Electrode layer 130 of FIG. 13A and electrode layer 132 of FIG. 13B are provided in respective J-shaped configurations such that electrode tab portions 134 extend from the respective electrode layers. When electrode layers 130 and 132 are interleaved with dielectric layers and stacked to form a multilayer ceramic device, such as shown in FIG. 13C, each electrode tab portion 134 (represented by an respective solid line) is exposed at selected locations along the top side of the device 138. Anchor tab portions 136 may also be provided within the electrode layer planes and/or within dielectric cover layers such that additional exposed conductive portions (as depicted by the respective dashed lines in FIG. 13C) may facilitate formation of plated electrodes thereon. Components that utilize "J-shaped" electrodes as depicted in FIGS. 13A-13C have the advantage in certain applications of having inherently predetermined component orientation, since terminations are formed only on one side of the component.

Figure 14A:
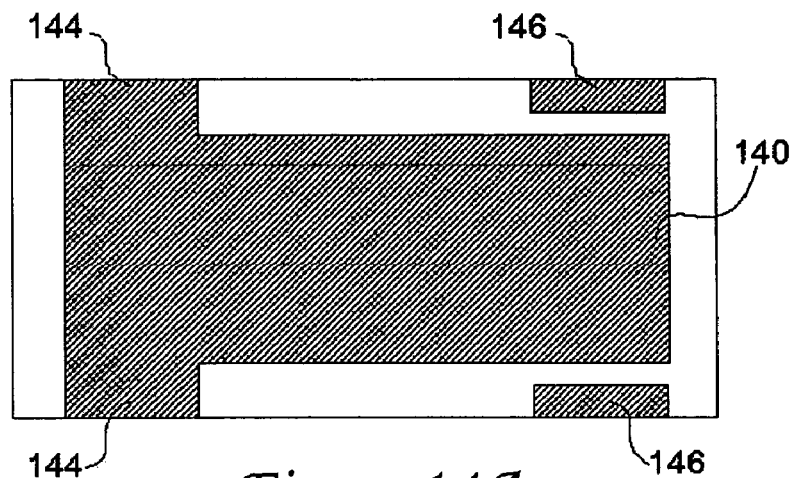
FIGS. 14A and 14B respectively illustrate generally top views of an exemplary "T-shaped" electrode layer configuration in accordance with the present subject matter for use in multilayer capacitor embodiments.
Figure 14B:
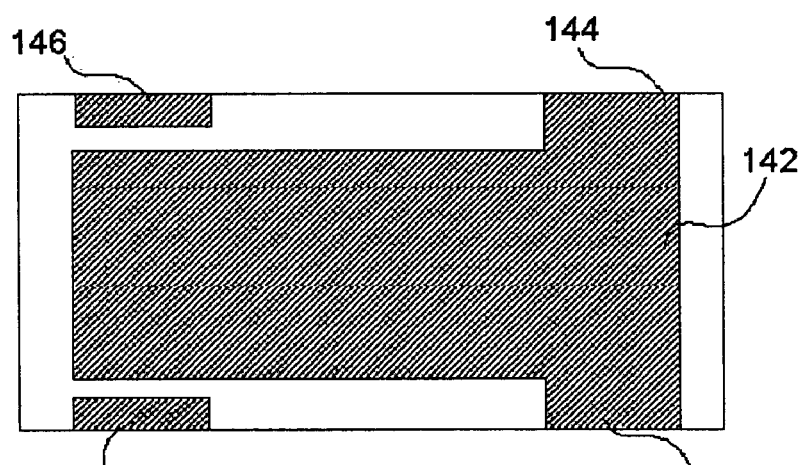
Figure 14C:
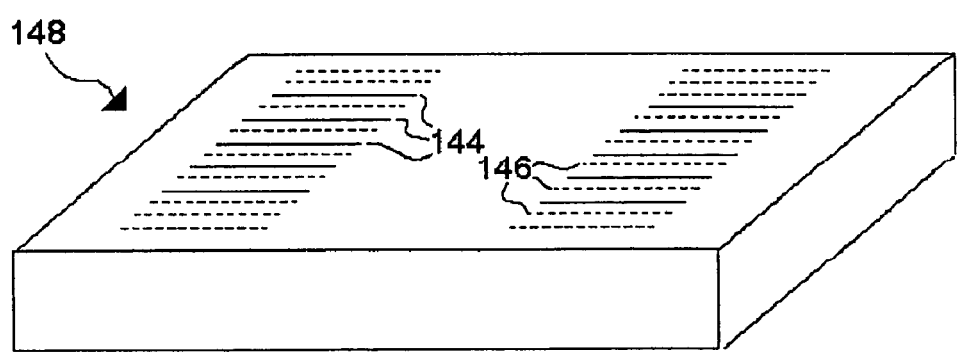
FIG. 14C illustrates a generally side perspective view of an exemplary multilayer capacitor embodiment in accordance with the present subject matter with "T-shaped" electrode layer configurations such as those illustrated in FIGS. 14A and 14B.

A slight variation to the "J-shaped" electrodes illustrated in FIGS. 13A-13C, respectively, corresponds to the "T-shaped" electrodes embodied in FIGS. 14A, 14B and 14C. Electrode layer 140 of FIG. 14A and electrode layer 142 of FIG. 14B are provided in respective T-shaped configurations such that electrode tab portions 144 extend from the respective electrode layers. When electrode layers 130 and 132 are interleaved with dielectric layers and stacked to form a multilayer ceramic device, such as shown in FIG. 14C, each electrode tab portion 144 (represented by an respective solid line) is exposed at selected locations along both top and bottom sides of the device 148. Anchor tab portions 146 may also be provided within the electrode layer planes and/or within dielectric cover layers such that additional exposed conductive portions (as depicted by the respective dashed lines in FIG. 14C) may facilitate formation of plated electrodes thereon. This structure also facilitates electrical testing, since standard two-point testers may be used.

Figure 17A:
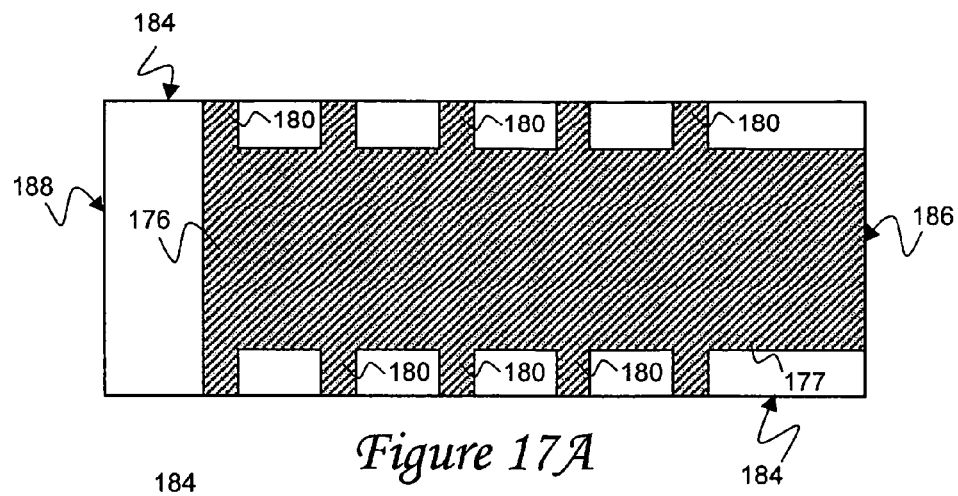
FIGS. 17A and 17B respectively illustrate generally top views of an exemplary electrode layer configuration with multiple side tabs and extended end portions for use in multilayer capacitor embodiments in accordance with the present subject matter.
Figure 17B:
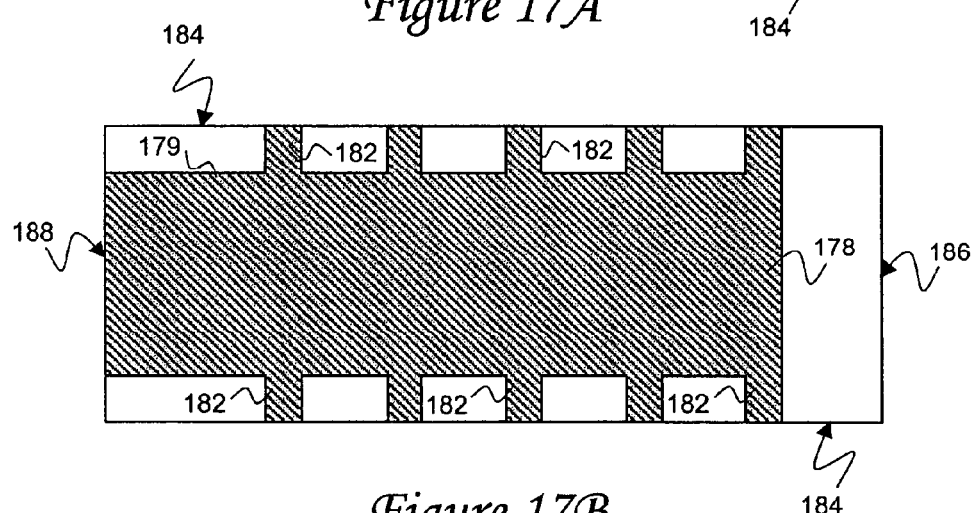
Figure 17C:
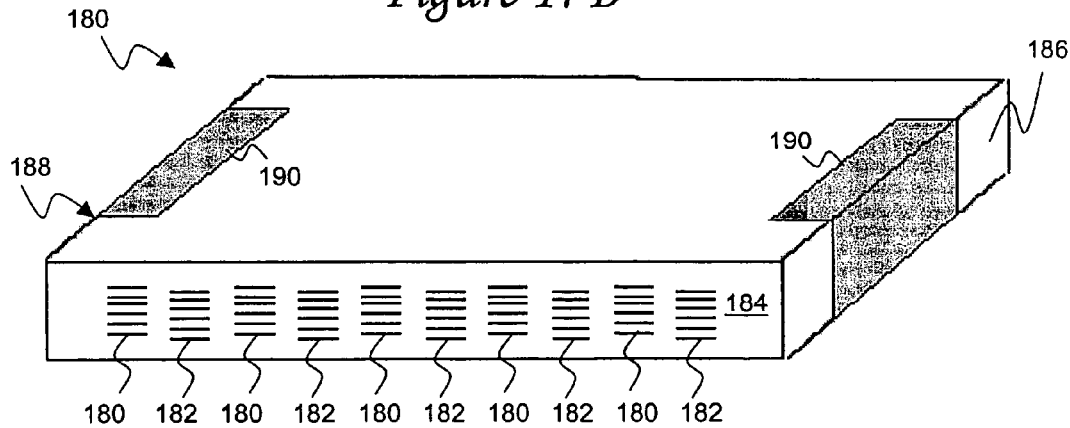
FIG. 17C illustrates a generally side perspective view of an exemplary multilayer capacitor embodiment with embedded electrode layer configurations such as illustrated in FIGS. 17A and 17B in accordance with the present subject matter.
Figure 18:
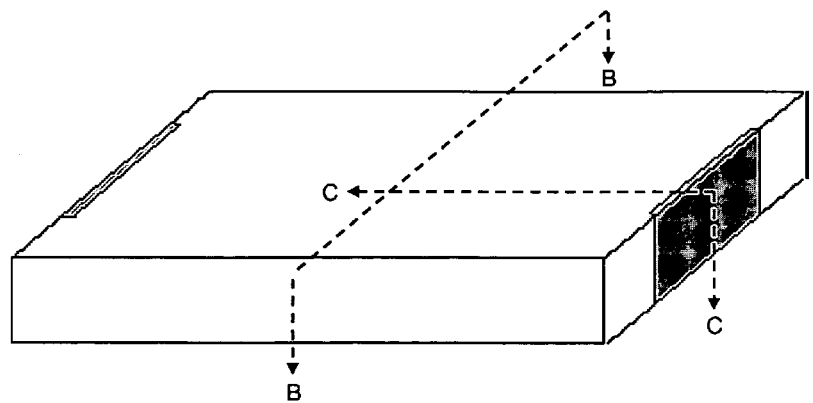
FIG. 18 depicts an exemplary terminated multilayer capacitor in accordance with the presently disclosed technology.

A still further exemplary device configuration for use with the subject plated termination technology is depicted in FIGS. 17A, 17B and 17C. Multiple electrode layers 176 such as depicted in FIG. 17A and electrode layers 178 such as depicted in FIG. 17B are interleaved with a plurality of dielectric layers to form a multilayer device 180 such as depicted in FIG. 17C. Each respective electrode layer 176 and 178 has a plurality of electrode tabs extending therefrom which are exposed at selected locations along the generally longer sides 184 of device 180. The extended portions 177 of each electrode layer 176 are exposed in an aligned column at side 186 of device 180 while the extended portions 179 of each electrode layer 178 are exposed in an aligned column at side 188 of the device. It should be appreciated that although not illustrated in FIGS. 17A-17C, anchor tabs may supplement the electrode layers 176 and 178 in the active and/or cover layers and/or serving as external lands of the device to provide additional nucleation points for forming plated terminations in accordance with the disclosed technology.

There are a relatively high number of exposed conductive portions in the multilayer device embodiment of FIG. 17C. Electroless plating techniques and others as previously described herein may be utilized to form plated terminations at the exposed conductive portions, but it may be difficult in some embodiments to utilize only electroplating or electrochemical deposition techniques when the intended number of terminations is high and/or termination pitch and/or termination size is relatively small. Referring to the device of FIG. 17C, electroplating techniques require that each exposed conductive portion (portions 180 and 182 as well as the exposed ends 177 and 179 of electrode layers 176 and 178) must be electrically biased for the electrolytic plating solution to be attracted to and deposited at the exposed conductive portions. If only some of the conductive portions are biased, termination formation may not bridge across all exposed portions in one or more aligned columns. In order to make electroplating a more viable option for the device 180 of FIG. 17C, printed end terminations 190 may be applied to the extended respective end portions 177 and 179 of electrode layers 176 and 178 at the device sides 186 and 188. Printed end terminations 190 would form two collective electrical connections for the respective electrode layers of opposing polarities. Such terminations may correspond to the relatively thick-film stripes conventionally applied to terminate electronic devices and may wrap around to one or more selected sides of the device if desired. The device 170 with printed terminations 190 may then be subjected to an electroplating solution, and as long as the terminations 190 are biased, then each exposed conductive portion 180 and 182 will also be energized such that plating material will be deposited thereon. This method can serve to greatly reduce the possibility of plated terminations not forming at one or more exposed conductive portion 180 and 182 during electroplating techniques. This structure also facilitates electrical testing, since standard two-point testers may be used.

Figure 9A:
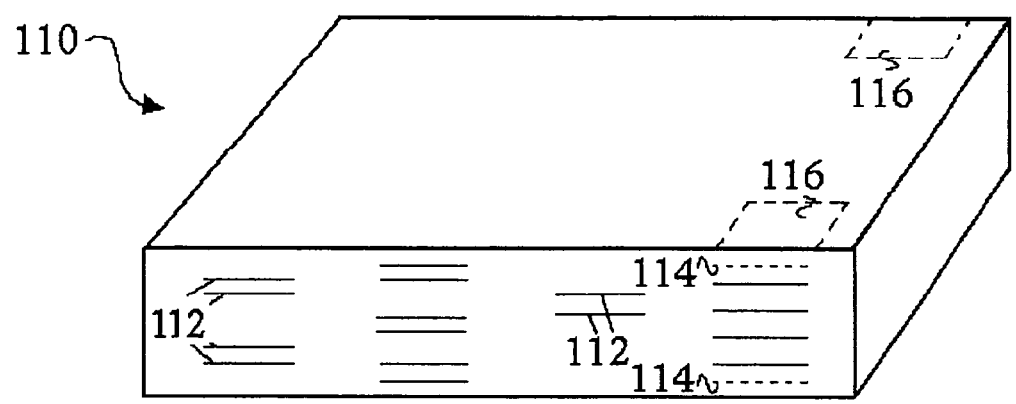
FIG. 9A illustrates a generally side view, with slight top perspective, of an exemplary monolithic integrated passive component with exposed electrode tabs and additional anchor tabs in accordance with the disclosed technology.
Figure 9B:
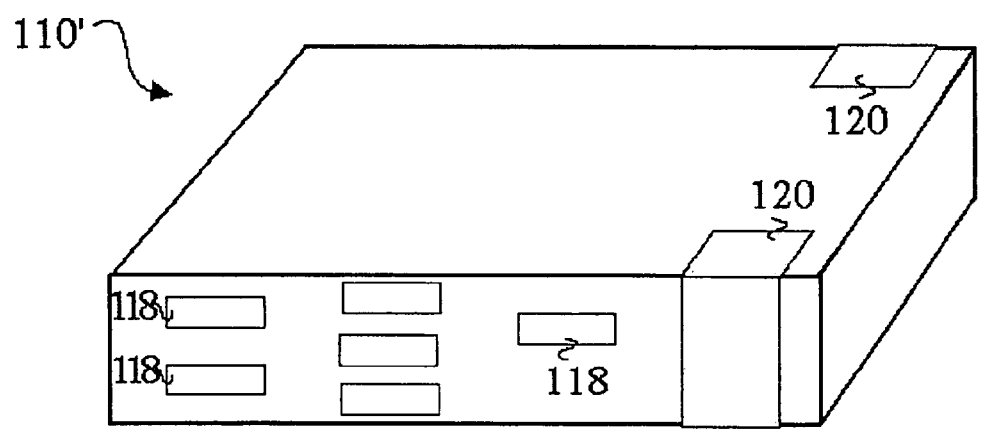
FIG. 9B illustrates a generally side view, with slight top perspective, of an exemplary monolithic integrated passive component with plated terminations in accordance with the present subject matter.

Another example embodying aspects of the disclosed technology is presented with respect to FIGS. 9A and 9B. FIG. 9A represents an integrated passive component 110, comprising a combination of passive components provided in a single monolithic structure. Integrated component 110 may include a selected combination of resistors, varistors, capacitors, inductors, couplers, baluns, and/or other passive components. Each distinct passive component is typically characterized by at least one conductive electrode-like portion from which at least one electrode tab portion 112 extends and is exposed along the periphery of component 110.

An integrated passive component 110, such as that represented by FIG. 9A, may have a plurality of different internal electrode arrangements as shown. Corresponding electrode tabs 112 may be provided in symmetrical or nonsymmetrical configurations and may be grouped in a variety of fashions. An important feature is that exposed electrode tabs 112 may be arranged within component 110 to facilitate the formation of selective plated terminations. In addition, internal anchor tabs 114 and/or external anchor tabs 116 may also be provided with an integrated passive component to create additional selective termination arrangements. For example, consider the exposed tab arrangement of FIG. 9A, with numerous exposed internal electrode tabs 112, internal anchor tabs 114, and external anchor tabs 116. Subjecting such configuration to a plating solution in accordance with variations of the presently disclosed technology would preferably effect the formation of a plurality of plated side terminations 118 and plated wrap-around terminations 120, such as in FIG. 9B. Integrated passive component, or multilayer electronics device, 110' simply corresponds to an integrated passive component such as 110 of FIG. 9A with the addition of plated terminations 118 and 120, respectively. Thus, tabs of an integrated passive component can be designed whereby plated terminations can be formed among different electrodes and different component layers.

Referring now to FIGS. 20, 21A-21C and 22, various additional aspects of the present subject matter will now be discussed. FIGS. 21A, 21B and 21C illustrate different exemplary cross-sections of multilayer capacitor 208 taken along the planes defined by lines D-D and E-E. The cross sections of FIGS. 21A, 21B and 21C illustrate the generally shorter side of capacitor 208 when delineated by line D-D on which exemplary termination 210b might be formed and the upper portion defined by line E-E. Although FIGS. 21A-21C reference one particular device corner, it should be appreciated that many multilayer devices are formed in a substantially symmetrical fashion in one or more dimensions and thus the illustrated portions may actually be representative of multiple edges/corners of multilayer device 208. FIGS. 21A-21C do not illustrate end terminations 210a and 210b depicted in FIG. 20, but illustrate the exposed conductive portions that could lead to formation of such terminations in accordance with the subject plated termination technology.

FIGS. 21A and 21B illustrate the effects of corner rounding on an electronic component. "Corner rounding" is yet another step that may be implemented before actual termination plating in accordance with the present technology in order to effect general rounding of previously sharp edges of an electronic component. Such rounding may promote better termination coverage and device uniformity among parts, as well as reduce potential chipping that might come from handling multiple components having the sharp edges in bulk. In accordance with such "corner rounding", a plurality of electronic components may be subjected to a predefined level of mechanical agitation either while in the green state, usually with a soft media or none at all, or while in the fired state with media and/or water. This process when applied to components in a fired state is sometimes referred to by those of ordinary skill in the art as "harperizing".

A representation of such corner rounding is presented in a before and after comparison of FIGS. 21A and 21B. In the multilayer component portions of FIGS. 21A and 21B, multiple pairs of opposing first electrode layers 212 and second electrode layers 214 are interleaved among a plurality of dielectric layers to form the active region of a capacitor 208. Anchor tabs 217 may also be provided in such active region to increase the density of exposed conductive portions along selected areas of the active region periphery. A cover layer (generally represented as region 218) may be provided at top and/or bottom surfaces of the active region of capacitor 208. A cover layer may consist of multiple layers of dielectric material (e.g., ceramic sheets) among which anchor tabs 220 may be provided. By arranging anchor tabs in the cover layers such that they are exposed at the device periphery, similar to the first and/or second electrode layers 212 and 214, plated terminations can be deposited along the entire height of the capacitor 208.

Referring to FIG. 21B, it should be noted that a level of mechanical agitation to round the corners of capacitor 208 can be controlled in order to provide anchor tabs 220 having predetermined length(s) in the corner radius portion 222 of the device. Predetermined agitation variables such as duration and effectiveness may be predetermined to achieve different results. For instance, longer agitation times might result in higher levels of corner rounding while less agitation could reduce potential component wear. One portion of multilayer electronic components that is often more susceptible to mechanical abrasion associated with a corner rounding process are external anchor tabs, or lands, 224 which may be provided on a device to facilitate wrap-around terminations. For at least this reason, external anchor tabs 224 are often formed with a greater thickness than internal anchor tabs. For example, in some embodiments, internal anchor tabs such as tabs 217 in the active layers or tabs 220 in the cover layers as well as internal electrodes 212 and 214 may be characterized by an exemplary thickness of about two µm or less, while external lands 224 may be characterized by an exemplary thickness of about five µm or more. In general, the thickness of external lands 224 may be about two times the thickness of internal electrodes and/or anchor tabs for added robustness when a resultant electronic component is to be subjected to mechanical agitation associated with corner rounding or harperizing.

One option for reducing the exposure of the subject components to corner rounding or harperizing would be to dice the components such that less or no tumbling is required to achieve generally rounded device corners. For example, referring to FIGS. 23A-23C, respectively, it should be appreciated and known by one of ordinary skill in the art that capacitors in accordance with the present subject matter are typically manufactured in a bulk process whereby relatively large capacitor arrays are assembled and then diced to form individual components. FIG. 23A represents an exemplary portion 226 of such a capacitor array that enables one to see how the internal conductive portions 228 may be formed that are cut to provide anchor tabs 230 for more than one multilayer capacitor. Instead of conventional component dicing which may be effected by a substantially straight line depicted at 232 in FIG. 23A, the dicing could correspond to a "V"-type cut, such as represented at cut(s) 234 in FIG. 23B. A "V"-type cut would serve to angle the corners of the component such that much less tumbling or harperizing would be needed to achieve a capacitor 236 with rounded corners as depicted in FIG. 23C. Furthermore, the external lands 224 may not need to be quite as thick as otherwise needed to survive corner rounding.

Yet another design aspect that may be practiced in some embodiments of the present technology to achieve increased mechanical robustness of a device, which becomes especially desirable when tumbling or harperizing of a device is effected, corresponds to the inclusion of certain amounts of ceramic in the material forming the conductive portions of an electronic device. For example, in a multilayer ceramic capacitor, the internal electrode layers and internal and/or external anchor tabs may each be respectively formed of a certain volume percentage (vol %) of conductive metal-loaded ink (e.g., nickel (Ni), Copper (Cu), etc.) and a certain vol % of ceramic. It should be appreciated that some conductive portions may be formed with up to 75 vol % ceramic (and a corresponding counter vol % of conductive ink such that the two percentages combine to 100 vol %). It should be appreciated that somewhat of a tradeoff exists in the combination of ceramic and conductive ink: higher vol % ceramic helps achieve increased robustness but to a loss of conductivity by reduced levels of the conductive particles. In more specific exemplary embodiments, internal electrodes and/or internal anchor tabs are formed with conductive ink (e.g., Ni ink)) combined with about 20 vol % ceramic (e.g., barium titanate). Adding ceramic to such conductive portions helps control electrode shrinking and improve adhesion when a part is fired during manufacturing. External anchor tabs (lands) may include even more vol % ceramic than the internal conductive portions, such as on the level of about 30 vol % ceramic. As conductive portions of the subject capacitors are formed with increasing percentages of ceramic material, decreased ceramic powder particle size, such as less than about 1 µm, may facilitate adherence of the ceramic and conductive materials. Although increasing the ceramic content generally increases the adhesion of the printed material, it does reduce the conductivity of that layer. This is not critical, however, as the subsequent plating of pure materials will be very conductive again.

Referring now to FIG. 21C, a multilayer device in accordance with the present subject matter is depicted with an exemplary dimensional relationship among specific components. In the device of FIG. 21C, the length 238 of anchor tabs 220 in the cover layer 218 is less than the length of the end margin 240 between the device periphery and the electrode layers 214. When cover layer anchor tab length 238 is the same or longer than end margin length 240 (such as the instances illustrated in FIGS. 21A and 21B) a potential risk may exist of the anchor tabs 220 shorting with one or more of the upper second electrodes 214. This risk is greatly reduced in the embodiment of FIG. 21C. If the anchor tabs 220 or 217 come into contact internally with any of the first electrodes 212, device functionality will not be effected since those conductive portions will all be coupled together anyways upon the formation of external terminations.

Referring now to FIG. 22, another aspect of corner rounding in multilayer electronic components will now be presented. FIG. 22 generally represents a corner radius portion 222 of a cover layer portion 218 such as illustrated in FIG. 21B. It is visually illustrated in FIG. 21B that when a device corner is rounded, the distance between exposed locations of adjacent cover layer anchor tabs 220 increases towards the top of a device. In order to maintain a more constant lateral exposure of anchor tabs (or common active layers or whatever conductive portions may be internally provided near top and/or bottom surfaces of a multilayer electronic component), the density of such anchor tabs 220 may be increased towards the top surface 242 of the device. For example distances between anchor tabs closer to the top surface 242 (such as distance 246) are less than distances (such as distance 244) between anchor tabs further from the top surface 242.

Reference will now be made to FIGS. 28A-28F and 29A-29L respectively. FIGS. 28A-28F respectively illustrate various aspects related to formation of Ball Grid Array (BGA) termination features in accordance with a known arrangement. FIGS. 29A-29L respectively disclose exemplary BGA embodiments which may be formed in accordance with the subject plating technology to provide advantages over the known version depicted in FIGS. 28A-28F.

Referring to FIGS. 28A and 28B, a known exemplary electrode configuration is illustrated in an exploded representation within an exemplary three-dimensional area 300. For relational purposes, it should be appreciated that area 300 may generally correspond in some embodiments to the volumetric area of a finished multilayer component, although only electrode layer portions for use in such a component are illustrated in FIGS. 28A and 28B. FIGS. 28A and 28B are respective bottom and top views of the same exemplary electrode layer configuration, which includes a plurality of first polarity electrode layers 302 and a plurality of second polarity electrode layers 304. First and second polarity electrode layers 302 and 304 are provided in pairs to function as opposing capacitor plates in a multilayer capacitor (MLC). First polarity electrode layers 302 include respective portions 306 that extend from and are initially exposed along a mounting surface 310 of an MLC as illustrated in FIG. 28C. Similarly, second polarity electrode layers 304 include respective portions 308 that extend from and are initially exposed along the same mounting surface 310. Electrode portions 306 and 308 may be referred to as electrode tabs in some embodiments. These electrode tabs 306 and 308 are positioned at the same location along each edge of the first and second polarity electrodes 302 and 304 such that they are aligned in columns and exposed in respective groups along the mounting surface 310 of component 312. As understood by viewing both FIGS. 28C and 28D, the electrodes in this known exemplary embodiment are only exposed along mounting surface 310 and not along other device surfaces. The exemplary electrode layers 302 and 304 are alternately layered together in a stacked configuration with interleaved dielectric or substrate layers to form the MLC illustrated in FIGS. 28C and 28D. In one prior art embodiment, electrode layers 302, 304 comprise platinum and the interleaved dielectric layers comprise a BaTiO3 ceramic.

Figure 28E:
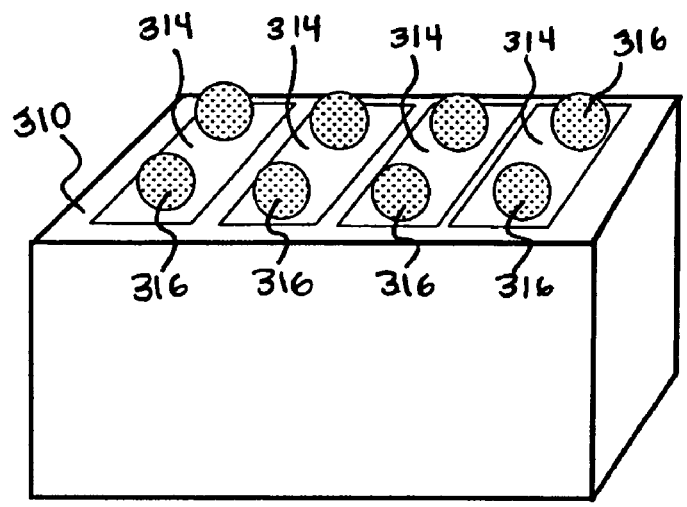
FIG. 28E provides a generally bottom perspective view (contact side) of a multilayer interdigitated capacitor such as that illustrated in FIGS. 28C and 28D after attaching solder preforms.
Figure 28F:
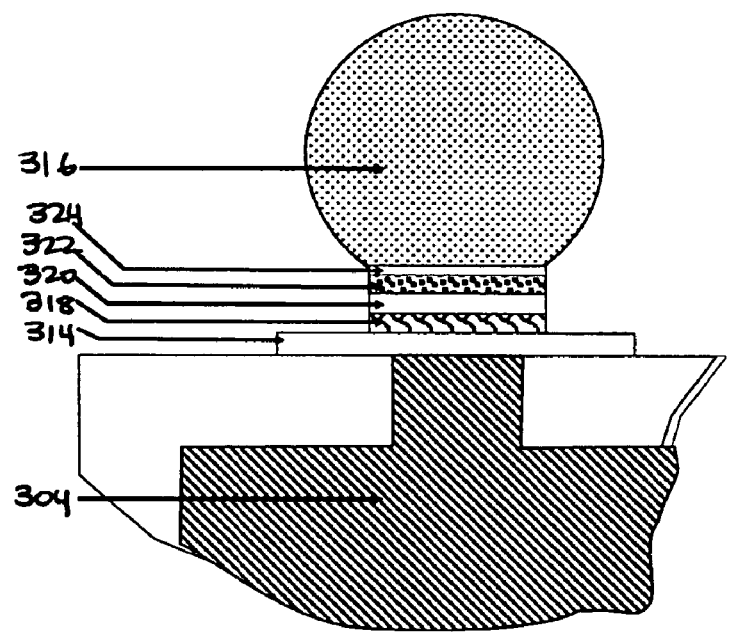
FIG. 28F provides a detailed cross-sectional view representing the mounting surface and termination layers associated with application of each solder preform of FIG. 28E.

Referring now to FIG. 28E, the unterminated MLC of FIGS. 28C and 28D may be terminated in accordance with prior art techniques by printing a thick-film termination stripe 314 over the exposed portions of electrode layers 30. In one embodiment termination stripes 314 comprise chrome. Before application of solder preforms (solder balls) 316 as illustrated in FIGS. 28E and 28F, additional layers may be provided including a chrome (Cr) base layer 318, a chrome/copper (Cr/Cu) diffusion layer 320, a copper (Cu) layer 322, and layer of gold flash 324. Solder balls 316 may correspond in one embodiment to a Lead-Tin 97/3 Pb/Sn alloy material.

The known MLC embodiment variously illustrated in FIGS. 28A-28E, respectively can be limiting in some instances because of the technology used to form termination stripes 314. As previously mentioned, printing such thick-film structures has mechanical limitations due to the formation process and is also more expensive than terminations formed in accordance with batch plating techniques as presently disclosed. To address these concerns, an improved MLC is disclosed and will now be discussed with reference to FIGS. 29A-29L, respectively.

FIG. 29A illustrates an exemplary first polarity electrode layer 330 for use in a MLC embodiment. First polarity electrode layer 330 includes a main body similar to that of the known electrode 302 of FIGS. 28A and 28B with tab portions 306', and also having an extended bottom portion 336. Second polarity electrode layer 332 includes a main body similar to that of the known electrode 304 of FIGS. 28A and 28B with tab portions 308' and extended side portions 336. Multiple first and second polarity electrodes 330 and 332 may be alternately stacked (such as illustrated in the exploded perspective top and bottom views of FIGS. 29C and 29D, respectively) with a plurality of dielectric layers to result in a stacked monolithic assembly as generally illustrated in respective FIGS. 29E and 29F.

With further reference to FIGS. 29E and 29F, which collectively show perspective views of a stacked monolithic assembly after alternately interleaving dielectric layers and electrode layers, one exemplary embodiment includes respective first polarity electrodes 330 provided on first and second opposing stack surfaces 340a and 340b. The respective tab portions 306' and 308' of electrode layers 330 and 332 extend to and are initially exposed (before application of termination features) along a mounting surface 342a. In one embodiment, mounting surface 342a is a surface that may ultimately be configured for mounting to a circuit substrate, other component or other location in an integrated circuit (IC) application. The bottom portions 334 of electrodes 330 extend to and are initially exposed along the surface 342b opposite that of mounting surface 342a. Side portions 336 extend to and are initially exposed along opposing first and second end surfaces 344a and 344b.

With still further reference to FIGS. 29E and 29F, the exposed tab portions 306' and 308' (and other exposed conductive elements) are aligned in respective groups with a spacing that enables deposition of plated termination material as previously discussed. In one embodiment, the spacing between adjacent exposed electrode portions in a given aligned column is no greater than about ten microns. In some embodiments, the spacing between adjacent columns is at least twice the distance between given exposed electrode portions in a given column. Further, although not illustrated in FIGS. 29C-29F, respectively, it should be appreciated that anchor tabs as previously discussed may be employed here to facilitate a desired base for nucleation and guiding of deposited plating material in a self-determining fashion.

It should be appreciated with respect to the unterminated MLC of FIGS. 29E and 29F and also the terminated MLC illustrated and that will now be discussed with reference to FIGS. 29G-29L, that by designating surface 342*a* as a mounting surface, the electrode layers in the MLC will be oriented in a perpendicular fashion relative to the mounting surface. This is different than some multilayer capacitors having electrode layers oriented parallel relative to a mounting surface. The "vertical" or perpendicular electrodes facilitate lower overall component inductance levels and also minimize circuit board real estate when mounted.

Figure 29G:
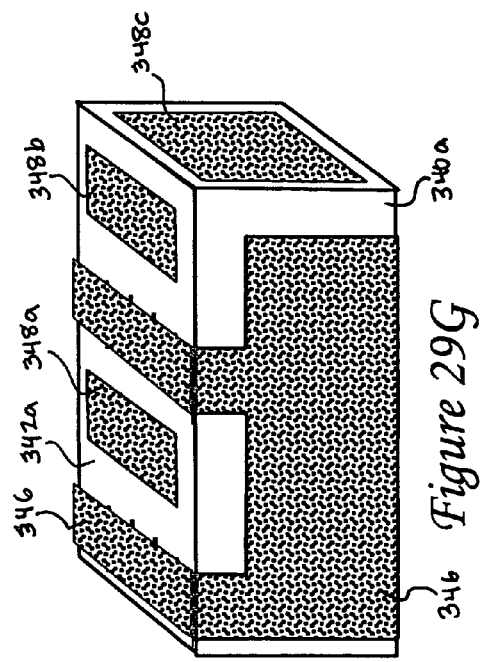
FIGS. 29G and 29H respectively illustrate generally bottom and top perspective views of an exemplary multilayer capacitor such as that illustrated in FIGS. 29E and 29F after subjecting the component to a plating process to form an initial termination layer on exposed conductive portions.
Figure 29H:
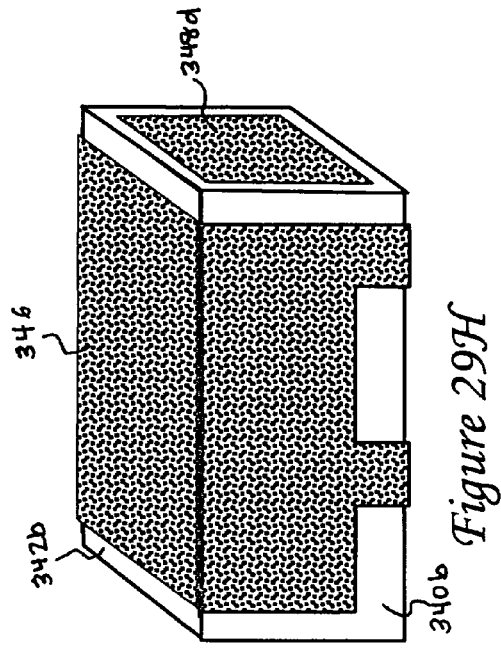

After arranging various electrode and dielectric layers as illustrated in FIGS. 29E and 29F, the devices may be subjected to the disclosed process of forming plated terminations. For example, one or more unterminated components as illustrated in FIGS. 29E and 29F are immersed in a plating solution until a thin-film plated deposition is formed to cover exposed conductive areas, including the outer electrodes 330 and exposed portions of internal electrodes 330 and 332, including exposed tab portions 306' and 308', exposed side portions 336 and exposed bottom portions 334. The portion of plated termination material, or thin-film deposit may be formed by electroless and/or electrochemical/electrolytic techniques or others as disclosed herein to form portions of plated termination material. Such plating techniques may be used to form a single layer of material or multiple layers as previously discussed. As illustrated in FIGS. 29G and 29H, a portion 346 of plated termination material covers all exposed portions of said first polarity electrodes, and generally covers portions of the mounting surface 342*a*, surface 342*b* opposite the mounting surface, and first and second opposing stack surfaces 340*a* and 340*b*. Portions 348*a* and 348*b* of plated termination material are deposited along the exposed groups of electrode tab portions 308' of second polarity electrodes 332. Additional portions 348*c* and 348*d* are deposited along the exposed side electrode portions 336 of second polarity electrodes 332.

Figure 29I:
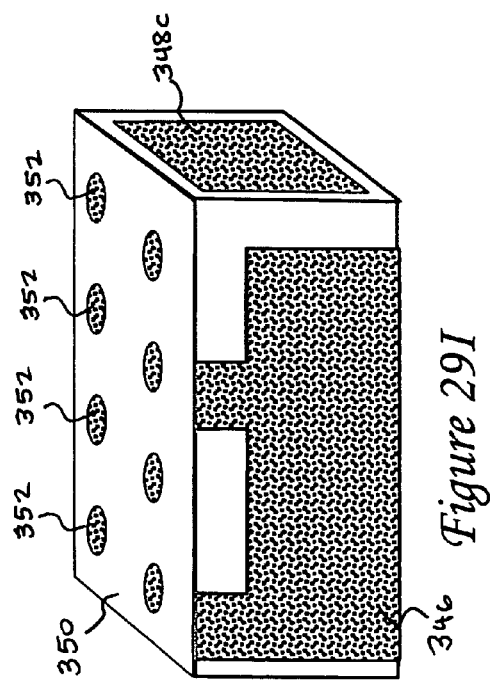
FIG. 29I illustrates a bottom perspective view of a multilayer capacitor such as that illustrated in FIGS. 29G and 29H after placing a patterned polymer layer on the bottom (contact) surface of the component.

After an initial formation of plated termination material as described with respect to FIGS. 29G and 29H, a solder dam layer 350 is applied over mounting surface 342*a*. In one embodiment, solder dam layer 350 comprises a patterned polymer layer, which may comprise organic polymer in one embodiment. Solder dam layer 350 is formed to expose one or more predetermined areas 352 of the plated termination material provided on the mounting surface 342*a*. More particularly, the solder dam layer 350 as illustrated in FIG. 29I is formed to define eight openings 352, some of which expose various respective areas of termination material portion 346, 348*a* and 348*b*. Solder dam layer 346 enables the formation of Ball Limiting Metallurgy (BLM). BLM enables the application of solder preforms to selected areas so that the solder preforms do not reflow over large sections of the termination material, but merely attach to predetermined areas, and help to maintain the spherical shape of the molten solder during reflow.

Figure 29J:
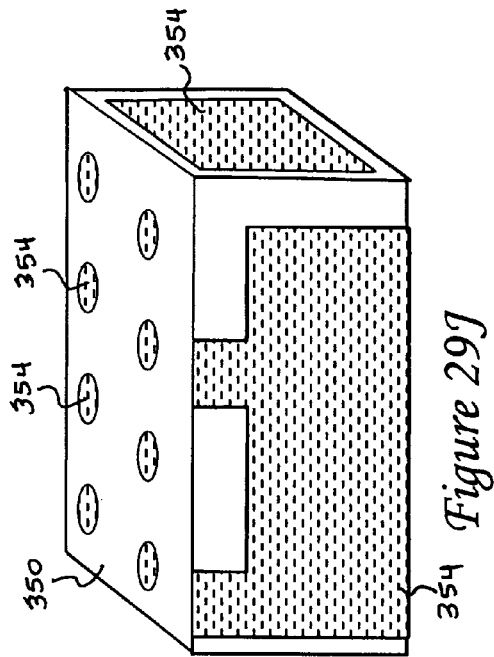
FIG. 29J illustrates a bottom perspective view of a multilayer capacitor such as that illustrated in FIG. 29I after subjecting the component to additional plating.

Referring now to FIG. 29J, after application of solder dam layer 350, additional electroplating steps are taken to deposit additional layers in predetermined areas 352. In FIG. 29J, an additional layer of conductive material, such as a thin-film deposition of nickel is plated over the exposed conductive portions by electrolytic plating or other disclosed plating techniques. The plating of the open areas 352 is assisted by the electrically contiguous surfaces 346 and 354. Such process results in deposition of an additional layer of conductive material (generally depicted as material 354 in FIG. 29J, which serves as a solder barrier layer where formed in areas 352. The portions of material 354 applied over the remaining conductive portions including 346, 348*c* and 348*d* of FIGS. 29G-29I form a conductive shield for the MLC since they substantially cover several surfaces of the device. By substantially covering exterior surfaces of the device with conductive plating, heat dissipation for the MLC is facilitated because a larger conductive surface for transferring heat away from the relatively insulative ceramic dielectric material is provided. An additional benefit of these generally larger plated termination structures is that they serve as an isolation shield for protecting the MLC from electromagnetic interference (EMI) levels that may exist in a circuit application.

Figure 29K:
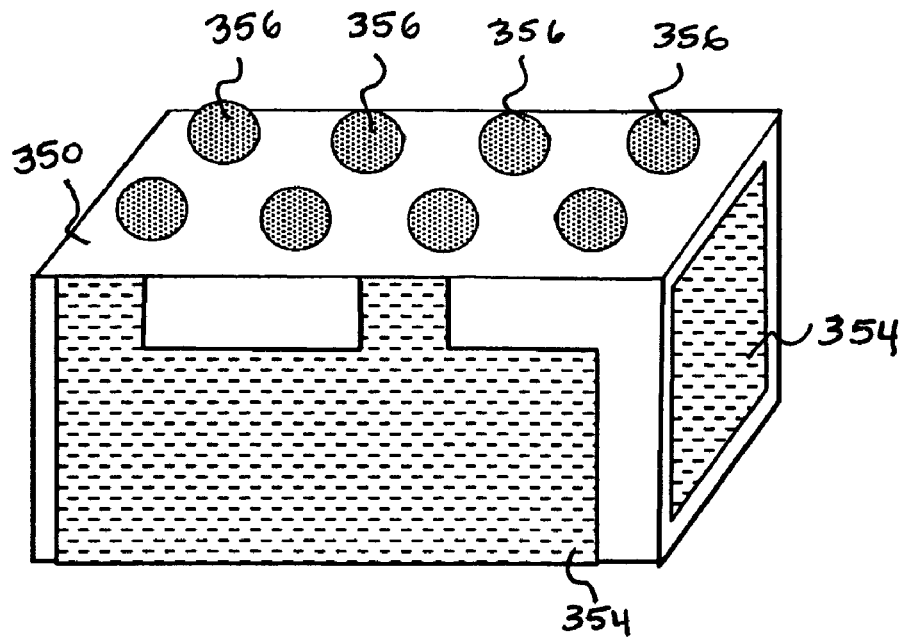
FIG. 29K provides a generally bottom perspective view (contact side) of a multilayer capacitor such as that illustrated in FIG. 29J after attaching a plurality of solder balls.
Figure 29L:
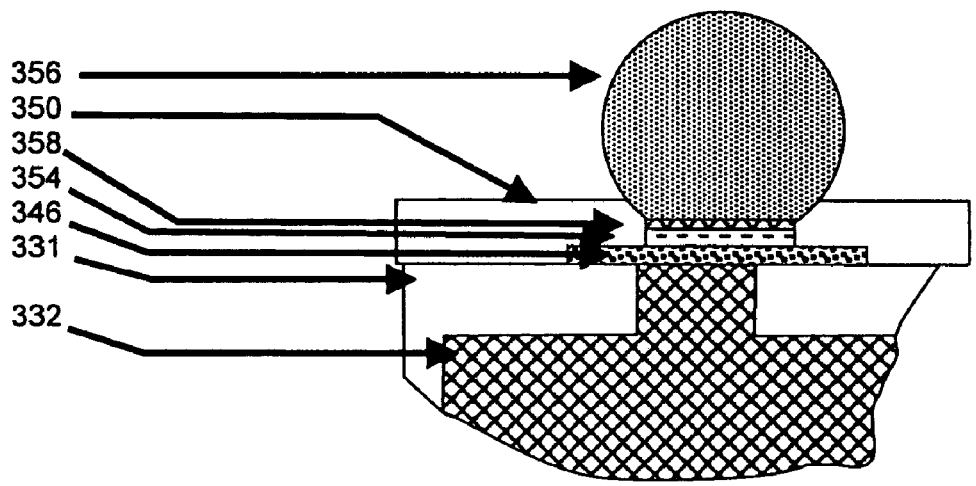
FIG. 29L provides a detailed cross-sectional view representing the mounting surface and termination layers associated with application of each solder ball of FIG. 29K.

Referring now to FIG. 29K, solder preforms 356 may subsequently be applied to the ball limiting metallurgy formed in accordance with the plating steps described relative to FIGS. 29G-29J, respectively. It should be appreciated that before application of the solder preforms (solder balls) 356, still further portions may be plated over the solder barrier material 354. Such material may be plated over all exposed conductive portions or over just the portions exposed in the one or more predetermined areas 352 formed by the solder dam 350. More particular illustration of such exemplary additional layers is depicted in FIG. 29L, which illustrates a detailed cross-sectional view of an electrode layer 332 and dielectric layer 331. As further represented in FIG. 29L, a portion of thin-film copper deposition 346 (or alternatively 348*a* or 348*b*) is covered with solder dam layer 350 with openings formed therein. The predetermined areas corresponding to each opening may be successively plated with a first layer 354 of solder barrier material, such as nickel, and a second layer 358 of a flash material such as gold flash. A solder preform 356 may then be reflowed to each portion of gold flash 358. In one embodiment solder preform 356 corresponds to a solder ball comprising a lead-free SAC (Tin-Silver-Copper alloy) material.

Another embodiment similar to that described above with respect to FIGS. 29A-29L, respectively, includes a variation of the electrode configurations illustrated in FIGS. 29A and 29B. In accordance with such exemplary alternative, each first polarity electrode layer 330 can include instead of a bottom portion 334, a side portion such as one of portions 336 illustrated in FIG. 29B. Each second polarity electrode layer 332 may then include only one side portion 336 extending to the opposite side as that of the first polarity electrode layers 330. This electrode configuration would provide alternating side portions, similar to the first and second polarity electrodes 176 and 178 as illustrated in FIGS. 17A and 17B. This would result in formation of an MLC similar to that ultimately illustrated in FIG. 29G-29K, except that no plated termination structure will be formed on the surface 342*b* opposing mounting surface 342*a*, and termination structures formed on opposing end surfaces will be of opposite polarity.

Figure 30A:
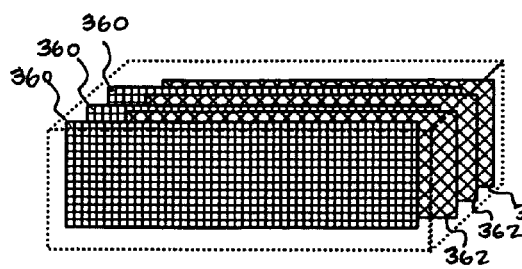
FIG. 30A illustrates a perspective view of a known exemplary electrode layer configuration for a multilayer capacitor.
Figure 30B:
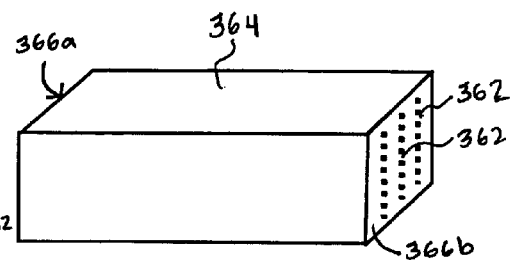
FIG. 30B illustrates a perspective view of a multilayer capacitor utilizing the internal electrode layer configuration of FIG. 30A.

FIGS. 30A and 30B illustrate aspects of a known prior art capacitor. FIG. 30A illustrates exemplary first polarity electrode layers 360 and second polarity electrodes 362 that are alternated in pairs among a plurality of dielectric layers to form a stacked MLC 364 as illustrated in FIG. 30B. The known electrode configuration of FIG. 30A yields an MLC with portions of first polarity electrodes 360 exposed along a first end surface 366*a* (not visible in FIG. 30B) and portions of second polarity electrodes 362 exposed along a second end surface 366*b*. After terminations are applied to the exposed electrodes of FIG. 30B, terminations are only formed on respective opposing end surfaces 366*a* and 366*b*.

In contrast to the arrangement depicted in FIGS. 30A and 30B, FIGS. 31A-31D illustrate a component configuration that accommodates plated terminations that substantially cover each of six surfaces of a resultant MLC device. FIG.

31A illustrates a plurality of first polarity electrodes 370 and a plurality of second polarity electrodes 372. Such exemplary electrodes are provided as layers which are interleaved among a plurality of dielectric layers to form a monolithic assembly 374 as illustrated in FIG. 30B. One first polarity electrode is provided as an external electrode on a first stack surface 376a of the assembly 374. Although not visible in the perspective view of FIG. 31B, a second polarity electrode 372 is provided as an external electrode on a second stack surface 376b. Additional second polarity electrodes 372 extend to and are exposed along first and second end surfaces 368a and 370a. Similarly, additional first polarity electrodes 370 extend to and are exposed along end surfaces 378b and 380b (which are opposite the end surfaces 378a and 380a at which second polarity electrodes 372 are exposed).

Figure 31A:
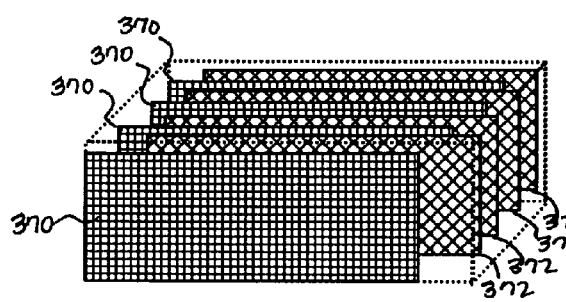
FIG. 31A illustrates a perspective view of an exemplary electrode layer configuration for use in multilayer capacitors in accordance with the presently disclosed technology.
Figure 31B:
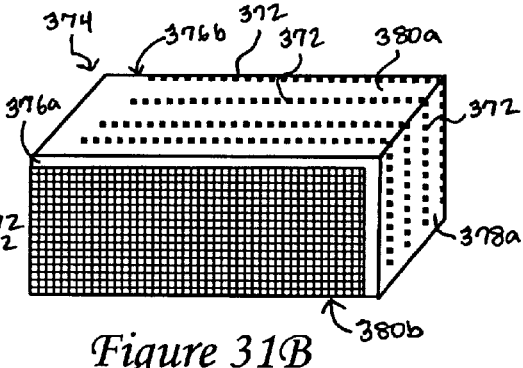
FIG. 31B illustrates a perspective view of an exemplary multilayer capacitor utilizing the internal electrode layer of FIG. 31A.
Figure 31C:
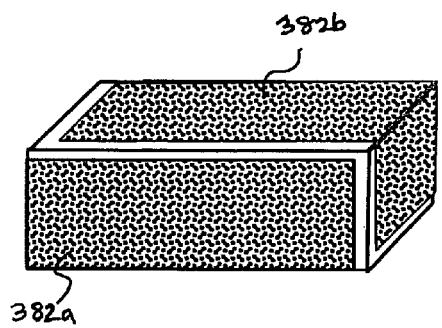
FIG. 31C illustrates a perspective view of the exemplary multilayer capacitor of FIG. 31C after subjecting the component to a plating process to form at least one termination layer.
Figure 31D:
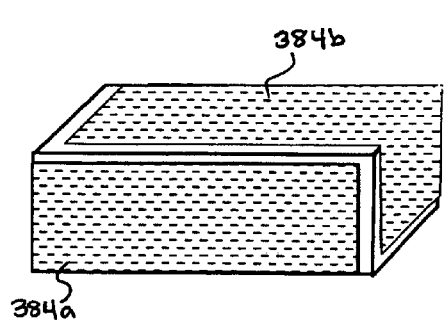
FIG. 31D illustrates a perspective view of the exemplary multilayer capacitor of FIG. 31C after additional application of thermally enhanced material onto the initial plating layers.

Referring now to FIG. 31C, provision of external electrode layers as well as exposed portions of internal electrode layers results in a configuration that accommodates plated terminations as illustrated. FIG. 31C depicts an example of how the assembly of FIG. 31B will appear after being subjected to a plating process as disclosed herein to form a first portion 382a of thin-film plated deposition covering and connecting first polarity electrodes and a second portion 382b of thin-film plated deposition covering and connecting second polarity electrodes. One or more additional layers 384a, 384b of plated deposition may be applied over the initial layers of plated deposition 382a, 382b as illustrated in FIG. 31D. The configuration illustrated in FIGS. 31C and 31D generally corresponds to an MLC with thermally enhanced plating features for improved heat dissipation within the MLC. Advantages are afforded in two ways. A first advantage results from a decrease in overall equivalent series resistance (ESR) for the MLC, thus reducing $I^2R$ heating levels. A second structural advantage occurs from the resultant thermal paths to the MLC exterior that carry heat away from the component. The MLC of FIGS. 31C and 31D also provides EMI shielding and signal isolation functionality as previously discussed relative to FIG. 29K.

Figure 32A:
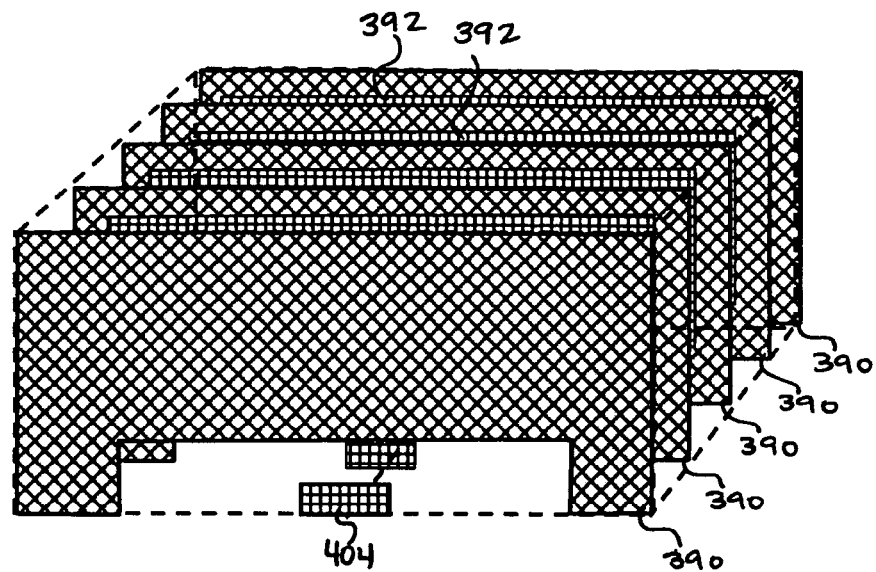
FIG. 32A illustrates a perspective view of an exemplary electrode layer configuration for use in multilayer capacitors in accordance with the presently disclosed technology.
Figure 32B:
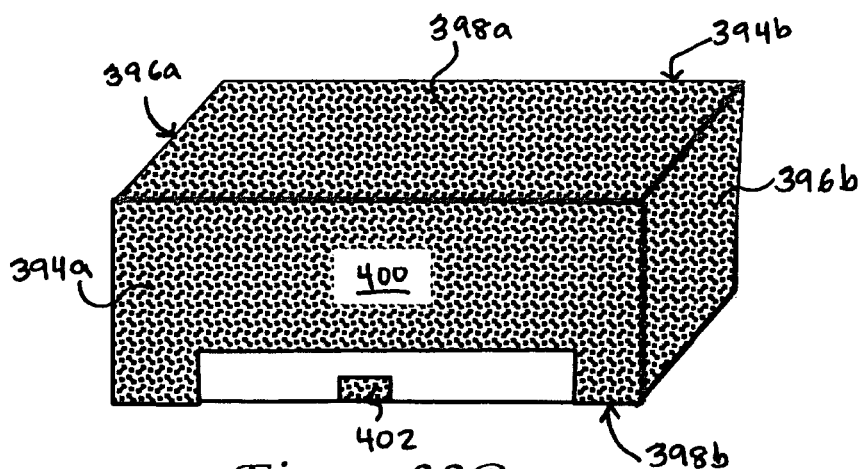
FIG. 32B illustrates a generally top perspective view of an exemplary multilayer capacitor utilizing an internal electrode layer configuration such as illustrated in FIG. 32B.
Figure 32C:
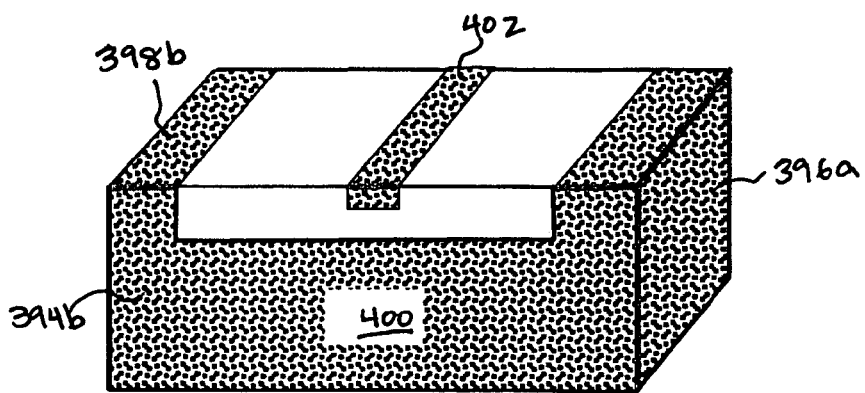
FIG. 32C illustrates a generally bottom (contact side) perspective view of an exemplary multilayer capacitor utilizing an internal electrode layer configuration such as illustrated in FIG. 32A.

A still further exemplary MLC embodiment that may be formed in accordance with the present subject matter is illustrated in FIGS. 32A-32C, respectively. In such embodiment, a plurality of first polarity electrodes 390 are provided as well as a plurality of second polarity electrodes 392. A first polarity electrode 390 is provided on first and second opposing stack surfaces 394a and 394b (as illustrated in FIG. 32B), and each additional first polarity electrode (layered internally within a stacked monolithic assembly) extends to and is exposed along an entire length of each of first and second opposing side surfaces 396a and 396b as well as a surface 398a opposing a mounting surface 398b. In some embodiments, such additional first polarity electrodes further extend to and are exposed along mounting surface 398b at areas generally adjacent to the side surfaces 396a and 396b. This electrode configuration enables the formation of a first portion of plated termination material in accordance with the presently disclosed plating technology to form a first portion of plated deposition 400 that provides substantial coverage over at least five of six surfaces of the resultant MLC. More particularly, surfaces 398a, 396a and 396b are generally completely covered and surfaces 394a and 394b are substantially covered. Each second polarity electrode 392 has a portion that extends to and is exposed along the mounting surface 398b such that a second portion 402 of plated deposition covers and connects respective second polarity electrodes 392. In one embodiment, external anchor tabs 404 are provided on the opposing stack surfaces 394a and 394b such that the second portion 402 of plated deposition wraps from the mounting surface 398b to one or more of opposing stack surfaces 394a, 394b.

The exemplary MLC configuration variously illustrated in FIGS. 32A-32C may be utilized in situations that require a capacitor to be placed in a high frequency signal path. The MLC of FIGS. 32A-32C can thus be employed as a frequency coupling device where the termination portion 400 provides an associated ground plane that offers capacitive functionality as well as a feature for electrically guarding the component area.

Several examples and test results will now be presented for a plurality of multilayer capacitors terminated with a direct electrolytic plating process in accordance with the presently disclosed technology.

In a first example, a lot of 200 components with part number "NT054015-24" (0306 size) two-terminal LGA-type multilayer capacitor (AVX Corp.) were subjected to cleaning and direct copper electrolytic plating steps as previously described. The average thickness of the directly electroplated copper portions was about 21±2.88 microns. The average capacitance was measured to be about 1.022 microFarads, the average dissipation factor (DF) was measured to be about 6.983%, and the average insulation resistance (IR) was measured at about 1.48 Gigaohms. One-hundred of the two-hundred components were subjected to an annealing step (where the components were heated to a temperature of about six-hundred degrees Celsius) and then to a termination adhesion peel test to determine the adhesion strength of the plated terminations, and every component passed this test. The other one-hundred components were subjected to a termination adhesion peel test without being annealed, and every component in this group also passed the peel test. Fifty of the annealed parts and fifty of the non-annealed parts were then subjected to a terminated thermal shock dip test, a stress test whereby the parts are plunged in solder, and no part in either fifty-part group failed.

With further reference to this first example, the lot of two-hundred parts with direct copper electroplating were then subjected to additional electroplating to form respective layers of nickel (Ni) and then tin (Sn) over the initial thin-film copper. After these subsequent plating steps, each part passed the same termination adhesion peel test. Termination strength was also measured by a shear test. Annealed components withstood an average force of about 11.4 pounds and non-annealed components withstood an average force of about 13.2 lbs. Ten parts were then subjected to a second annealing step, which was found to negatively affect the termination integrity for some components. As such, annealing may be more helpful in some embodiments, if at all, only after plating of the initial copper (or other) layer.

A second example tested a lot of 200 components with part number "NT054015-24" (0306 size) two-terminal LGA-type multilayer capacitor (AVX Corp.). These components were subjected to cleaning and direct nickel electrolytic plating steps as previously described. The average thickness of the directly electroplated nickel portions was about 13.2±1.9 microns. One-hundred of the two-hundred components were subjected to an annealing step (where the components were heated to a temperature of about six-hundred degrees Celsius) and then to a termination adhesion peel test to determine the adhesion strength of the plated terminations, and every component passed this test. The other one-hundred components were subjected to a termination adhesion peel test without being annealed, and every component in this group also passed the peel test. The components were then subjected to additional electrolytic plating to form tin (Sn) over the nickel (Ni) portions. The average thickness of the plated tin portions was about 7.4±1.9 microns. These components were also subjected to termination adhesion peel test, and all parts passed. In an electrical check of the components, the average capacitance was measured to be about 1.024 microFarads, the average dissipation factor (DF) was measured to be about 6.951%, and the average insulation resistance (IR) was measured at about 1.61 Gigaohms. Termination strength was also measured by a shear test, and ten tested components withstood an average force of about 9.97 pounds.

It should be appreciated that the monolithic component embodiments illustrated in and discussed with reference to the present figures are provided merely as examples of the disclosed technology, including intermediate aspects thereof. In some of the examples, four or more general columns of electrodes are depicted, but a fewer or greater number of electrode columns are possible, depending on the desired component configuration. Furthermore, many different variations of the exemplary electrode configurations presented herein may be implemented, and thus such examples should not be limiting to the type of structures with which the subject plated termination technology may be employed. It is possible to form plated terminations along any selected portion of any selected component side in accordance with the disclosed technology.

It should be appreciated that internal anchor tabs and external anchor tabs may selectively be used for different termination preferences to provide different sizes of side terminations or wrap-around terminations. IDC embodiments displayed and described herein that feature both internal and external anchor tabs may, for instance, only utilize internal anchor tab features when wrap-around terminations are not preferred for a particular application. Different combinations, geometries, or sizes of both internal and external anchor tabs with existing exposed electrode tabs on a variety of different multilayer components can yield numerous potential termination schemes for a device.

While the present subject matter has been described in detail with respect to specific embodiments thereof, it will be appreciated that those skilled in the art, upon attaining an understanding of the foregoing may readily adapt the present technology for alterations to, variations of, and equivalents to such embodiments. Accordingly, the scope of the present disclosure is by way of example rather than by way of limitation, and the subject disclosure does not preclude inclusion of such modifications, variations, and/or additions to the present subject matter as would be readily apparent to one of ordinary skill in the art.

What is claimed:

1. A multilayer electronic component, comprising:
a plurality of dielectric layers;
a plurality of respective first and second polarity internal electrode layers interleaved among said plurality of dielectric layers to form a stacked monolithic assembly generally characterized by six component surfaces including a mounting surface, a surface opposing said mounting surface, first and second opposing stack surfaces, and first and second opposing end surfaces, wherein selected portions of said plurality of internal electrode layers extend to and are initially exposed in respective groups along said mounting surface with each electrode layer generally perpendicular to said mounting surface;
a portion of plated termination material formed over selected respective groups of the exposed portions of said plurality of internal electrode layers;
a solder dam layer applied over said mounting surface and formed to expose one or more predetermined areas of plated termination material; and
a plurality of solder preforms attached to respective selected ones of the one or more predetermined areas of plated termination material.

2. The multilayer electronic component of claim 1, further comprising respective portions of a solder barrier material formed over selected of the one or more predetermined areas of plated termination material before application of the solder preforms.

3. The multilayer electronic component of claim 2, further comprising respective portions of a flash material formed over the respective portions of solder barrier material before application of the solder preforms.

4. The multilayer electronic component of claim 3, wherein said plated termination material comprises copper, said solder barrier material comprises nickel and said flash material comprises gold.

5. The multilayer electronic component of claim 1, wherein said plated termination layer comprises a thin-film layer of electrochemical deposit.

6. The multilayer electronic component of claim 5, wherein said electrochemical deposit comprises one of nickel and copper.

7. The multilayer electronic component of claim 1, further comprising a plurality of internal anchor tabs selectively interleaved among said plurality of dielectric layers and extending to and initially exposed in said respective groups along said mounting surface.

8. The multilayer electronic component of claim 1, wherein a portion of each said first polarity internal electrode layer extends to and is initially exposed along said first end surface of said stacked monolithic assembly; and wherein a portion of each said second polarity internal electrode layer extends to and is initially exposed along said second end surface of said stacked monolithic assembly; and wherein said multilayer electronic component further comprises at least one portion of plated termination material formed over the exposed portions of first polarity internal electrodes exposed along said first end surface and at least one portion of plated termination material formed over the exposed portions of second polarity internal electrodes exposed along said second end surface.

9. The multilayer electronic component of claim 1, wherein a portion of each said first polarity internal electrode layer extends to and is initially exposed along said surface opposing said mounting surface; wherein respective portions of each said second polarity internal electrode layer extend to and are initially exposed along said first and second opposing end surfaces of said stacked monolithic assembly; and wherein said multilayer electronic component further comprises at least one portion of plated termination material formed over the exposed portions of first polarity internal electrodes exposed along said surface opposing said mounting surface and at least one portion of plated termination material formed over the exposed portions of second polarity internal electrodes exposed along said first and second opposing end surfaces.

10. The multilayer electronic component of claim 9, wherein said stacked monolithic assembly comprises respective first polarity external electrode layers provided on the first and second opposing stack surfaces and wherein at least one portion of terminal material selectively covers exposed portions of said first polarity internal and external electrode layers exposed along said mounting surface, said surface opposing said mounting surface and said first and second opposing stack surfaces.

11. The multilayer electronic component of claim 10, wherein one continuous portion of termination material covers all exposed portions of said first polarity electrode layers.

12. The multilayer electronic component of claim 10, further comprising respective portions of a barrier material plated over each portion of plated termination material not covered by said solder dam layer.

13. The multilayer electronic component of claim 12, wherein said plated termination material comprises copper and said barrier material comprises nickel.

14. The multilayer electronic component of claim 12, wherein said respective portions of plated termination material substantially cover selected surfaces of the stacked monolithic assembly to facilitate heat dissipation and signal isolation for the electronic component.

15. A multilayer electronic component, comprising:
a plurality of dielectric layers;
a plurality of respective first and second polarity electrode layers interleaved among said plurality of dielectric layers to form a stacked monolithic assembly, wherein one first polarity electrode layer is provided on a first stack surface of the stacked monolithic assembly and one second polarity electrode is provided on a second stack surface opposite said first stack surface, wherein said monolithic assembly is characterized by said first and second opposing stack surfaces, a first set of opposing end surfaces and a second set of opposing end surfaces, wherein selected first polarity electrode layers extend to and are initially exposed along one end surface in the first set of opposing end surfaces and one end surface in the second set of opposing end surfaces, and wherein selected second polarity electrode layers extend to and are initially exposed along the end surfaces opposing those to which said first polarity electrode layers extend;
one first portion of thin-film plated deposition covering exposed portions of said first polarity electrode layers; and
one second portion of thin-film plated deposition covering exposed portions of said second polarity electrode layers.

16. The multilayer electronic component of claim 15, further comprising respective portions of additional conductive material formed over said respective first and second portions of thin-film plated deposition.

17. The multilayer electronic component of claim 16, wherein said thin-film plated deposition comprises copper, and wherein said additional conductive material comprises nickel.

18. The multilayer electronic component of claim 16, wherein said thin-film plated deposition comprises copper, and wherein said additional conductive material comprises a first layer of nickel and a second layer of tin.

19. The multilayer electronic component of claim 15, wherein said respective portions of thin-film plated deposition substantially cover selected surfaces of the stacked monolithic assembly to facilitate heat dissipation and signal isolation for the electronic component.

20. A multilayer electronic component, comprising:
a plurality of dielectric layers;
a plurality of respective first and second polarity electrode layers interleaved among said plurality of dielectric layers to form a stacked monolithic assembly generally characterized by six component surfaces including a mounting surface, a surface opposing said mounting surface, first and second opposing stack surfaces, and first and second opposing end surfaces, wherein one first polarity electrode layer is provided on each of the first and second opposing stack surfaces, wherein selected portions of the remaining first polarity electrode layers extend to and are exposed along an entire length of each of said first and second opposing end surfaces and said surface opposing said mounting surface, and wherein selected portions of said second polarity electrode layers extend to and are exposed along said mounting surface of said stacked monolithic assembly;
one or more first portions of thin-film plated deposition covering exposed portions of said first polarity electrode layers; and
one or more second portions of thin-film plated deposition covering exposed portions of said second polarity electrode layers.

21. The multilayer electronic component of claim 20, wherein selected of said first polarity electrode layers further extend to and are initially exposed along opposing portions of said mounting surface closest to said first and second opposing end surfaces.

22. The multilayer electronic component of claim 20, wherein one continuous portion of thin-film plated deposition covers all exposed portions of said second polarity electrode layers and is formed to substantially cover the entire area of said first and second opposing end surfaces and said surface opposing said mounting surface.

23. The multilayer electronic component of claim 22, wherein said continuous portion of thin-film plated deposition also substantially covers the first polarity electrode layers covering said first and second opposing stack surfaces, and wherein said continuous portion of thin-film plated deposition also wraps around to said mounting surface to cover exposed portions of said second polarity electrode layers.

24. The multilayer electronic component of claim 20, further comprising at least one external anchor tab provided on first and second opposing stack surfaces such that the one or more second portions of thin-film plated deposition cover the exposed portions of the second polarity electrode layers exposed along said mounting surface and also connect to and wrap around over the external anchor tabs provided on said stack surfaces.

25. The multilayer electronic component of claim 20, further comprising respective portions of additional conductive material formed over said respective first and second portions of thin-film plated deposition.

26. The multilayer electronic component of claim 25, wherein said thin-film plated deposition comprises copper, and wherein said additional conductive material comprises nickel.

27. The multilayer electronic component of claim 26, wherein said thin-film plated deposition comprises copper, and wherein said additional conductive material comprises a first layer of nickel and a second layer of tin.

* * * * *